United States Patent
Yamada et al.

(10) Patent No.: US 10,578,506 B2
(45) Date of Patent: Mar. 3, 2020

(54) PRESSURE SENSOR THAT MEASURES THE PRESSURE WITHIN A COMBUSTION CHAMBER OF AN INTERNAL COMBUSTION ENGINE

(71) Applicant: NGK SPARK PLUG CO., LTD., Nagoya-shi, Aichi (JP)

(72) Inventors: Tatsunori Yamada, Seto (JP); Shunsuke Tsuga, Niwa-gun (JP); Yusuke Fuji, Nagoya (JP); Junki Iwabuchi, Niwa-gun (JP); Daiki Goto, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 121 days.

(21) Appl. No.: 15/743,744

(22) PCT Filed: Jul. 8, 2016

(86) PCT No.: PCT/JP2016/070237
§ 371 (c)(1),
(2) Date: Jan. 11, 2018

(87) PCT Pub. No.: WO2017/010416
PCT Pub. Date: Jan. 19, 2017

(65) Prior Publication Data
US 2018/0202886 A1   Jul. 19, 2018

(30) Foreign Application Priority Data

Jul. 14, 2015  (JP) .................. 2015-140342
Aug. 18, 2015  (JP) .................. 2015-161339
Apr. 20, 2016  (JP) .................. 2016-084836

(51) Int. Cl.
*G01M 15/08* (2006.01)
*G01L 23/18* (2006.01)
(Continued)

(52) U.S. Cl.
CPC ............ *G01L 23/18* (2013.01); *F02B 77/085* (2013.01); *G01L 19/0681* (2013.01);
(Continued)

(58) Field of Classification Search
CPC ..................................................... G01M 15/08
(Continued)

(56) References Cited

U.S. PATENT DOCUMENTS 3,857,287 A   12/1974   Sonderegger et al.
5,488,868 A   2/1996   Ootake et al.
(Continued)

FOREIGN PATENT DOCUMENTS

GB      1363407 A      8/1974
JP      H07-019981 A   1/1995
(Continued)

OTHER PUBLICATIONS

Japan Patent Office, International Search Report issued in corresponding Application No. PCT/JP2016/070237 dated Sep. 27, 2016.
(Continued)

*Primary Examiner* — Eric S. McCall
(74) *Attorney, Agent, or Firm* — Stites & Harbison, PLLC; Jeffrey A. Haeberlin; James R. Hayne

(57) ABSTRACT

A pressure sensor includes: a diaphragm joined to a front side of a housing via a joint portion; a sensor portion; a connection portion connecting the diaphragm to the sensor portion; and a heat receiving portion disposed at the front side of the diaphragm. When: a minimum value of an area of a minimum inclusion region which is a virtual region, which include a cross-section of a portion from the heat receiving portion to the diaphragm and of which an overall length of a contour become minimum on a cross-section perpendicular to the axial line, is defined as a connection area Sn; and an area of a region surrounded by the joint
(Continued)

portion on a projection plane perpendicular to the axial line when the diaphragm and the heat receiving portion are projected onto the projection plane is defined as a diaphragm effective area Sd, (Sn/Sd)≤0.25 is satisfied.

11 Claims, 22 Drawing Sheets

(51) Int. Cl.
| | |
|---|---|
| *G01L 23/08* | (2006.01) |
| *G01L 19/06* | (2006.01) |
| *G01L 23/10* | (2006.01) |
| *F02B 77/08* | (2006.01) |
| *F02F 1/24* | (2006.01) |

(52) U.S. Cl.
CPC .............. *G01L 23/08* (2013.01); *G01L 23/10* (2013.01); *F02F 1/24* (2013.01)

(58) Field of Classification Search
USPC ...................................................... 73/114.18
See application file for complete search history.

(56) References Cited

U.S. PATENT DOCUMENTS

| | | | | |
|---|---|---|---|---|
| 2004/0231425 | A1* | 11/2004 | Mizuno | G01L 23/10 73/715 |
| 2008/0060440 | A1* | 3/2008 | Toyoda | G01L 9/0054 73/715 |
| 2009/0095059 | A1* | 4/2009 | Matsui | G01L 9/006 73/114.18 |
| 2012/0240683 | A1* | 9/2012 | Ooya | G01L 19/04 73/706 |
| 2016/0238485 | A1* | 8/2016 | Takemoto | G01M 15/08 |
| 2016/0299024 | A1* | 10/2016 | Yamada | G01L 23/10 |
| 2017/0343437 | A1* | 11/2017 | Ura | G01L 7/022 |
| 2018/0113045 | A1* | 4/2018 | Sato | G01L 23/10 |
| 2019/0195716 | A1* | 6/2019 | Fukui | G01L 9/0044 |

FOREIGN PATENT DOCUMENTS

| | | |
|---|---|---|
| JP | H07-318448 A | 12/1995 |
| JP | 2017-020894 A | 1/2017 |

OTHER PUBLICATIONS

Japan Patent Office, Written Opinion issued in corresponding Application No. PCT/JP2016/070237 dated Sep. 27, 2016.
European Patent Office, Extended European Search Report issued in corresponding Application No. EP 16 82 4396, dated Feb. 15, 2019.
The State Intellectual Property Office of People's Republic of China, Office Action issued in corresponding Application No. CN 201680041411.2, dated Jul. 23, 2019.

* cited by examiner (A)

(B)

PRESSURE SENSOR THAT MEASURES THE PRESSURE WITHIN A COMBUSTION CHAMBER OF AN INTERNAL COMBUSTION ENGINE

TECHNICAL FIELD

The present disclosure relates to a pressure sensor that measures the pressure within a combustion chamber of an internal combustion engine.

BACKGROUND ART

As a pressure sensor, a sensor is proposed which includes: a metal shell mounted on an engine head; a pressure receiving member including a diaphragm and a pressure receiving rod; a cap screw screwed into the pressure receiving rod; and a piezoelectric sensor interposed between the head of the cap screw and the metal shell. When the diaphragm receives a combustion pressure, the diaphragm is pressed backward, whereby a load is transmitted via the pressure receiving rod to the piezoelectric sensor. The piezoelectric sensor converts a change in the load to a change in electrical output. Here, a heat shielding plate is disposed at the front surface of the diaphragm in order to reduce the amount of thermal deformation of the diaphragm caused by high-temperature combustion gas.

PRIOR ART DOCUMENT

Patent Document

Patent Document 1: Japanese Patent Application Laid-Open (kokai) No. H07-318448
Patent Document 2: Japanese Patent Application Laid-Open (kokai) No. H07-19981

SUMMARY OF THE INVENTION

Problem to be Solved by the Invention

However, in the actual circumstances, a sufficient way to reduce a measurement error by using a member for heat reception such as the heat shielding plate, has not been devised.

The present disclosure discloses a technique that is able to reduce a measurement error by using a member for heat reception.

Means for Solving the Problem

The present disclosure discloses, for example, the following application examples.

Application Example 1

A pressure sensor including: a tubular housing; a diaphragm joined to a front side of the housing via a joint portion, spreading in a direction crossing an axial line of the housing, and configured to bend in accordance with a received pressure; a sensor portion disposed within the housing and having an electrical characteristic which changes in response to the pressure; a connection portion connecting the diaphragm to the sensor portion; and a heat receiving portion disposed at the front side of the diaphragm, connected directly or indirectly to the diaphragm, and configured to receive heat, wherein
when a minimum value of an area of a minimum inclusion region that is a virtual region, which includes a cross-section of a portion from the heat receiving portion to the diaphragm and of which an overall length of a contour is the smallest, on a cross-section perpendicular to the axial line is defined as a connection area $Sn$, and an area of a region surrounded by the joint portion on a projection plane perpendicular to the axial line when the diaphragm and the heat receiving portion are projected onto the projection plane is defined as a diaphragm effective area $Sd$, $(Sn/Sd) \leq 0.25$ is satisfied.

According to this configuration, a measurement error can be reduced by using the heat receiving portion.

Application Example 2

The pressure sensor described in the application example 1, wherein
when an area of the heat receiving portion on the projection plane is defined as a heat receiving area $Sn2$,
$(Sn2/Sd) \geq 0.8$ is satisfied.

According to this configuration, a measurement error can be reduced by using the heat receiving portion.

Application Example 3

The pressure sensor described in the application example 2, wherein
$(Sn2/Sd) \geq 1.0$ is satisfied.

According to this configuration, a measurement error can be further reduced by using the heat receiving portion.

Application Example 4

The pressure sensor described in the application example 2 or 3, wherein
when a minimum distance of a gap between the heat receiving portion and the diaphragm in a direction parallel to the axial line is defined as a minimum distance d,
$d \leq 0.5$ mm is satisfied.

According to this configuration, a measurement error can be further reduced by using the heat receiving portion.

Application Example 5

The pressure sensor described in any one of the application examples 2 to 4, wherein
$(Sn/Sd) \leq 0.1$ is satisfied.

According to this configuration, a measurement error can be further reduced by using the heat receiving portion.

Application Example 6

The pressure sensor described in the application example 1, wherein
the heat receiving portion includes a plate-like heat receiving plate, and
when a thickness of the heat receiving plate is denoted by $t$,
$t \geq 0.21$ mm is satisfied.

According to the above configuration, a measurement error can be reduced by using the heat receiving plate.

Application Example 7

The pressure sensor described in the application example 6, wherein an absolute value of an angle θ formed between a rear side surface of the heat receiving plate and a direction perpendicular to the axial line on a cross-section including the axial line is within 20 degrees.

According to the above configuration, a measurement error can be reduced further.

Application Example 8

The pressure sensor described in the application example 1, wherein the heat receiving portion includes:

a plate portion spreading in the direction crossing the axial line; and a side wall portion projecting from an edge of the plate portion to the front side, the side wall portion is formed over an entirety of the edge of the plate portion, the side wall portion has a plurality of through holes formed so as to be aligned along the edge of the plate portion, a maximum value of lengths, in a direction parallel to the axial line, of the plurality of through holes is not less than 0.3 mm, and when an outer peripheral length of the side wall portion on a cross-section of the side wall portion which is perpendicular to the axial line and does not pass through the plurality of through holes, is defined as an outer peripheral length $C1$, and a sum of lengths of portions corresponding to an outer peripheral surface of the side wall portion on a cross-section of the side wall portion which is perpendicular to the axial line and passes through the through holes, is defined as a wall length $C2$, $(C2/C1) \leq 0.6$ is satisfied.

According to this configuration, when the plate portion of the heat receiving portion receives gas flowing in a combustion chamber, the gas flows through the plurality of through holes of the side wall portion from the inner peripheral side of the side wall portion to the outer peripheral side of the side wall portion. Since the gas flows from the through holes of the side wall portion toward the outer peripheral side as described above, carbon occurring within the combustion chamber can be inhibited from flowing at the outer peripheral side of the side wall portion into the gap between the heat receiving portion and the diaphragm.

Application Example 9

The pressure sensor described in the application example 8, wherein a connection portion between an inner peripheral surface of the side wall portion and a surface, at the front side, of the plate portion is rounded.

According to this configuration, the gas easily flow from the surface, at the front side, of the plate portion to the through holes of the side wall portion, and thus a decrease in the flow rate of the gas flowing from the through holes to the outer peripheral side can be inhibited. Therefore, the carbon can be inhibited from flowing at the outer peripheral side of the side wall portion into the gap between the heat receiving portion and the diaphragm.

Application Example 10

The pressure sensor described in the application example 8 or 9, wherein when, within an angle range, in an arbitrary direction, which has a center on the axial line and has a central angle of 90 degrees, a length of a portion included within the angle range, of the outer peripheral length $C1$, is defined as a partial outer peripheral length $C1a$, and a length of a portion included within the angle range, of the wall length $C2$, is defined as a partial wall length $C2a$, $(C2a/C1a) \leq 0.6$ is satisfied.

According to this configuration, the plurality of through holes are inhibited from being distributed unevenly, that is, being distributed in a specific direction as seen from the axial line, and thus the gas is inhibited from flowing unevenly, that is, flowing in a portion of the entire circumference of the side wall portion from the through holes toward the outer peripheral side. Therefore, the carbon can be appropriately inhibited from flowing at the outer peripheral side of the side wall portion into the gap between the heat receiving portion and the diaphragm.

Application Example 11

The pressure sensor described in any one of the application examples 8 to 10, wherein when, on a plane cross-section, of the side wall portion, including the axial line, among directions from an inner peripheral side toward an outer peripheral side, an angle of a direction perpendicular to the axial line is defined as zero degree, an angle of a direction tilted to the front side is defined as a positive angle, and an angle of a direction tilted to a rear side is defined as a negative angle, an angle of an inner surface, at the rear side, of the through hole is not less than −40 degrees and not greater than 20 degrees.

According to this configuration, by the flow of the gas from the through holes toward the outer peripheral side, the carbon can be inhibited from flowing into the gap between the heat receiving portion and the diaphragm.

The technique disclosed in the present specification can be embodied in various forms, and can be embodied in forms such as a pressure sensor and an internal combustion engine equipped with the pressure sensor.

MODES FOR CARRYING OUT THE INVENTION

A. First Embodiment

A-1. Configuration of Pressure Sensor 10

Figure 1:
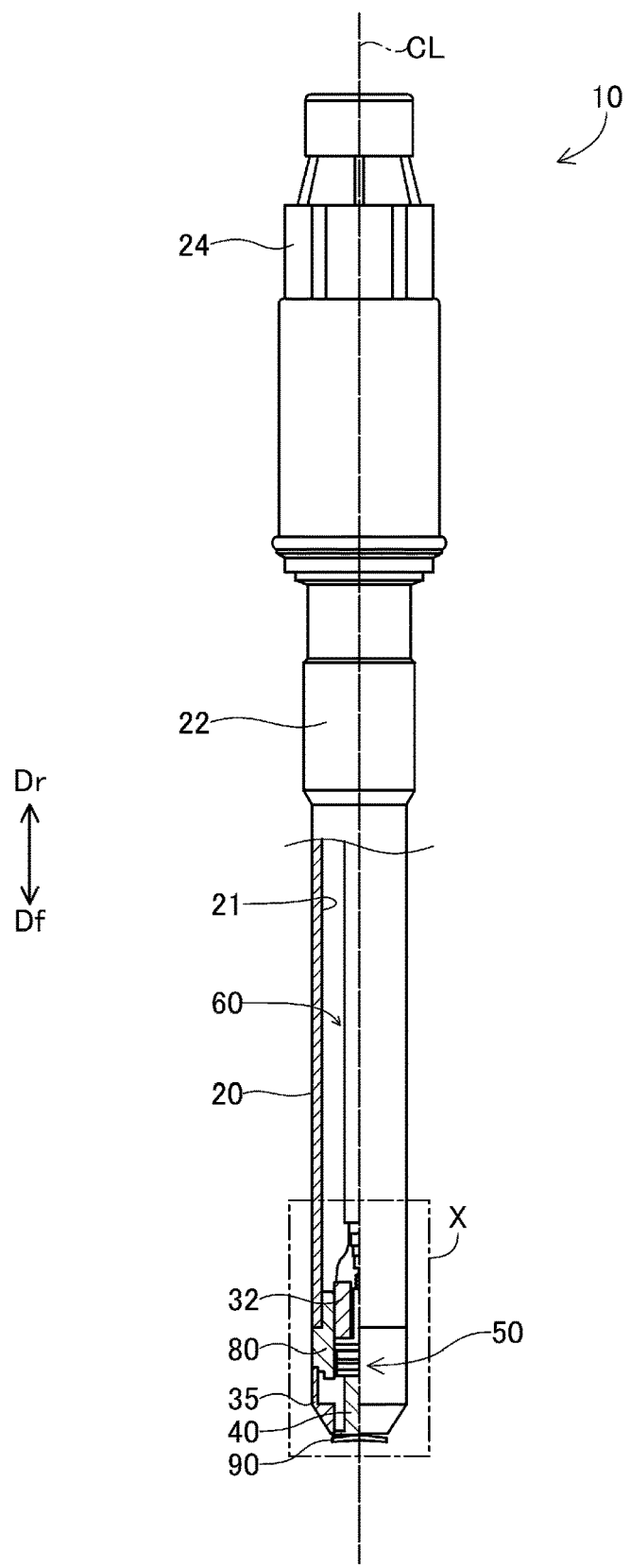
FIG. 1 Explanatory diagram showing a pressure sensor 10 according to a first embodiment.

FIG. 1 is an explanatory diagram showing a pressure sensor 10 according to a first embodiment. The pressure sensor 10 of the present embodiment is mounted on an internal combustion engine and used for detecting the pressure within a combustion chamber of the internal combustion engine. As shown in FIG. 1, the pressure sensor 10 includes a tubular first metal shell 20, a second metal shell 80, a third metal shell 35, a pressure receiving portion 40, a heat receiving portion 90, an element portion 50, and a cable 60 as main components. A central axis CL is the central axis of the pressure sensor 10. Hereinafter, the central axis CL is also referred to as axial line CL, and a direction parallel to the axial line CL is also referred to as "axial direction. The radial direction of a circle having a center on the axial line CL is also referred to merely as a "radial direction", and the circumferential direction of the circle having a center on the axial line CL is also referred to merely as a "circumferential direction". In addition, a direction along the axial line CL from the first metal shell 20 toward the pressure receiving portion 40 is referred to as "front end direction Df", and a direction opposite to the front end direction Df is referred to as "rear end direction Dr". The front end direction Df side is referred to as "front side", and the rear end direction Dr side is referred to as "rear side".

FIG. 1 shows the cross-sectional configuration of the left side, with respect to the axial line CL, of a front side portion of the pressure sensor 10. This cross-section is a plane cross-section (a cross-section taken along a plane) including the axial line CL. In addition, FIG. 1 shows the appearance configuration of the other portion of the pressure sensor 10. In the present embodiment, the axial line CL of the pressure sensor 10 is also the central axis of each of the first metal shell 20, the second metal shell 80, the third metal shell 35, the pressure receiving portion 40, the heat receiving portion 90, and the element portion 50.

Each of the first metal shell 20, the second metal shell 80, and the third metal shell 35 has a tubular shape which extends in the axial direction and whose cross-section perpendicular to the axial line CL (hereinafter, also referred to as transverse cross-section) has an annular shape. In the present embodiment, each of the first metal shell 20, the second metal shell 80, and the third metal shell 35 is formed from stainless steel. However, another material (e.g., steel such as low-carbon steel and various metallic materials) may be adopted.

The first metal shell 20 has an axial hole 21 formed as a through hole having a center on the axial line CL. In addition, a screw portion 22 and a tool engagement portion 24 are provided on a rear-side outer peripheral surface of the first metal shell 20. The screw portion 22 has a thread groove for fixing the pressure sensor 10 to a cylinder head of the internal combustion engine. The tool engagement portion 24 has an outer peripheral shape which comes into engagement with a tool (not shown) used for mounting and dismounting the pressure sensor 10 (e.g., a transverse cross-section thereof has a hexagonal shape).

Figure 2:
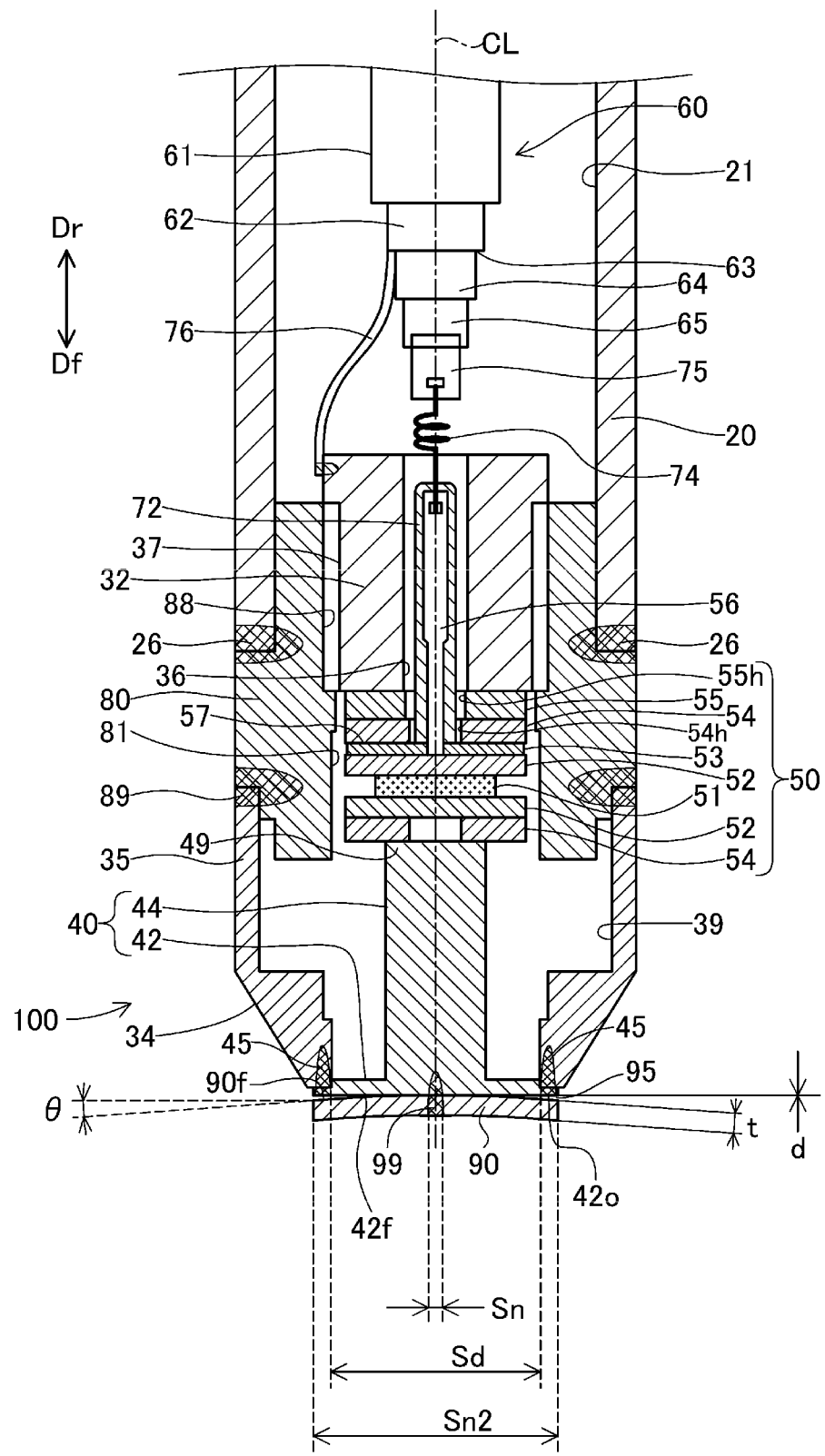
FIG. 2 Cross-sectional view showing, in an enlarged manner, a front end portion of the pressure sensor 10.

FIG. 2 is a cross-sectional view, in an enlarged manner, a front end portion of the pressure sensor 10, specifically, a portion indicated as a region X in FIG. 1. This cross-section is a plane cross-section including the axial line CL. The second metal shell 80 is disposed at the front side of the first metal shell 20 and is joined to the front end of the first metal shell 20 via a joint portion 26. The joint portion 26 is a portion where the first metal shell 20 and the second metal shell 80 are melted during welding (e.g., laser welding) (hereinafter, the joint portion 26 is also referred to as "welded portion 26" or "welding trace 26"). The joint portion 26 is a portion where the first metal shell 20 and the second metal shell 80 are integrated with each other. The joint portion 26 includes a component of the first metal shell 20 and a component of the second metal shell 80. The third metal shell 35 is disposed at the front side of the second metal shell 80 and is joined to the second metal shell 80 via a joint portion 89. The joint portion 89 is a portion where the second metal shell 80 and the third metal shell 35 are melted during welding (e.g., laser welding) (hereinafter, the joint portion 89 is also referred to as "welded portion 89" or "welding trace 89"). The joint portion 89 is a portion where the second metal shell 80 and the third metal shell 35 are integrated with each other. The joint portion 89 includes a component of the second metal shell 80 and a component of the third metal shell 35. A diameter-enlarged portion 34 is formed at a front end portion of the third metal shell 35 so as to be enlarged in diameter from the front side toward the rear side. When the pressure sensor 10 is mounted on the internal combustion engine, the diameter-enlarged portion 34 is in close contact with the cylinder head of the internal combustion engine.

The second metal shell 80 has an axial hole 81 formed as a through hole having a center on the axial line CL. The third metal shell 35 has an axial hole 39 formed as a through hole having a center on the axial line CL. The axial hole 81 of the second metal shell 80 and the axial hole 39 of the third metal shell 35 form a continuous through hole which communicates with the axial hole 21 of the first metal shell 20. Within the axial hole 81 of the second metal shell 80, the element portion 50 and a cap screw 32 are disposed in order from the front side toward the rear side. The pressure receiving portion 40 is disposed within the axial hole 39 of the third metal shell 35.

The pressure receiving portion 40 includes a diaphragm 42 and a rod 44. The diaphragm 42 is a substantially circular film having a center on the axial line CL. An edge 42o, at the outer peripheral side, of the diaphragm 42 is welded to a front end portion of the second metal shell 80 over the entirety thereof (e.g., by means of laser welding). The rod 44 is connected to a central portion of the rear side surface of the diaphragm 42. The rod 44 is a columnar portion having a center on the axial line CL and extends from the diaphragm 42 toward the rear end direction Dr side. The element portion 50 is connected to a rear end portion 49 of the rod 44. The diaphragm 42 and the rod 44 are integrally formed from stainless steel (e.g., by means of forging or machining). However, after the diaphragm 42 and the rod 44 are separately formed, the diaphragm 42 and the rod 44 may be integrated with each other by means of welding or the like. In addition, another material (e.g., steel such as low-carbon steel and various metallic materials) may be adopted.

The heat receiving portion 90 is joined to the front side surface of the diaphragm 42 (e.g., by means of laser welding). The heat receiving portion 90 is a disc-shaped plate-like member having a center on the axial line CL (also referred to as heat receiving plate). When the pressure sensor 10 is seen toward the rear end direction Dr, substantially the entirety of the diaphragm 42 is hidden by the heat receiving portion 90. The heat receiving portion 90 is joined to the diaphragm 42 (further the pressure receiving portion 40) via a joint portion 99. The joint portion 99 is a portion where the heat receiving portion 90 and the diaphragm 42 (further the pressure receiving portion 40) are melted during welding (hereinafter, the joint portion 99 is also referred to a "welded portion 99" or "welding trace 99"). Such a joint portion 99 is a portion where the heat receiving portion 90 and the diaphragm 42 are integrated with each other. In addition, the joint portion 99 includes a component of the heat receiving portion 90 and a component of the diaphragm 42. The joint portion 99 is formed at a central portion of the heat receiving portion 90. The heat receiving portion 90 is formed from stainless steel in the present embodiment, but may be formed from another metal.

The diaphragm 42 closes the axial hole 39 at the front end of the third metal shell 35. The diaphragm 42 is exposed within the combustion chamber of the internal combustion engine, and a surface 42f, at the front end direction Df side, of the diaphragm 42 forms a pressure receiving surface. In the present embodiment, the pressure receiving surface 42f can receive the pressure within the combustion chamber through a gap 95 between the diaphragm 42 and the heat receiving portion 90. In addition, the diaphragm 42 can receive a load corresponding to the pressure within the combustion chamber, through the heat receiving portion 90. Then, the diaphragm 42 deforms in accordance with the pressure within the combustion chamber. The rod 44 is displaced along the axial line CL in accordance with the deformation of the diaphragm 42 thereby to transmit the load corresponding to the pressure received by the diaphragm 42, to the element portion 50 at the rear side of the rod 44. As the thickness of the diaphragm 42 is decreased, the diaphragm 42 more easily deforms. Thus, the sensitivity of the pressure sensor 10 can be increased.

The cap screw 32 is mounted at the rear side of the axial hole 81 of the second metal shell 80. The cap screw 32 has an axial hole 36 formed as a through hole having a center on the axial line CL. An external thread 37 is formed on the outer peripheral surface of the cap screw 32. An internal thread 88 corresponding to the external thread 37 of the cap screw 32 is formed on the inner peripheral surface of a rear side portion of the axial hole 81 of the second metal shell 80. The cap screw 32 is screwed into the axial hole 81 from the rear side of the second metal shell 80. The element portion 50 is interposed between the cap screw 32 and the rod 44 of the pressure receiving portion 40. The cap screw 32 applies a preload to the element portion 50. An appropriate preload can be easily achieved by adjusting the number of rotations of the cap screw 32 made when the cap screw 32 is screwed into the second metal shell 80. Therefore, the accuracy of pressure measurement can be improved. The cap screw 32 is formed from stainless steel. However, another material (e.g., steel such as low-carbon steel and various metallic materials) may be adopted.

The element portion 50 includes two electrodes 52, a piezoelectric element 51 interposed between the two electrodes 52, a presser plate 54 disposed at the front side of the front side electrode 52, and a lead portion 53, a presser plate 54, and an insulating plate 55 which are aligned in order from the rear side electrode 52 toward the rear end direction Dr. As shown in FIG. 2, the presser plate 54, the electrode 52, the piezoelectric element 51, the electrode 52, the lead portion 53, the presser plate 54, and the insulating plate 55 are stacked in this order from the front side toward the rear side. The rear side surface of the insulating plate 55 is supported by the front side surface of the cap screw 32. The rear end portion 49 of the rod 44 is in contact with the front side surface of the front side presser plate 54. The piezoelectric element 51 is connected to the rod 44 via the front side electrode 52 and the front side presser plate 54. The entireties of the rod 44, the front side presser plate 54, and the front side electrode 52 form a connection portion 100 which connects the diaphragm 42 to the piezoelectric element 51.

Figure 3:
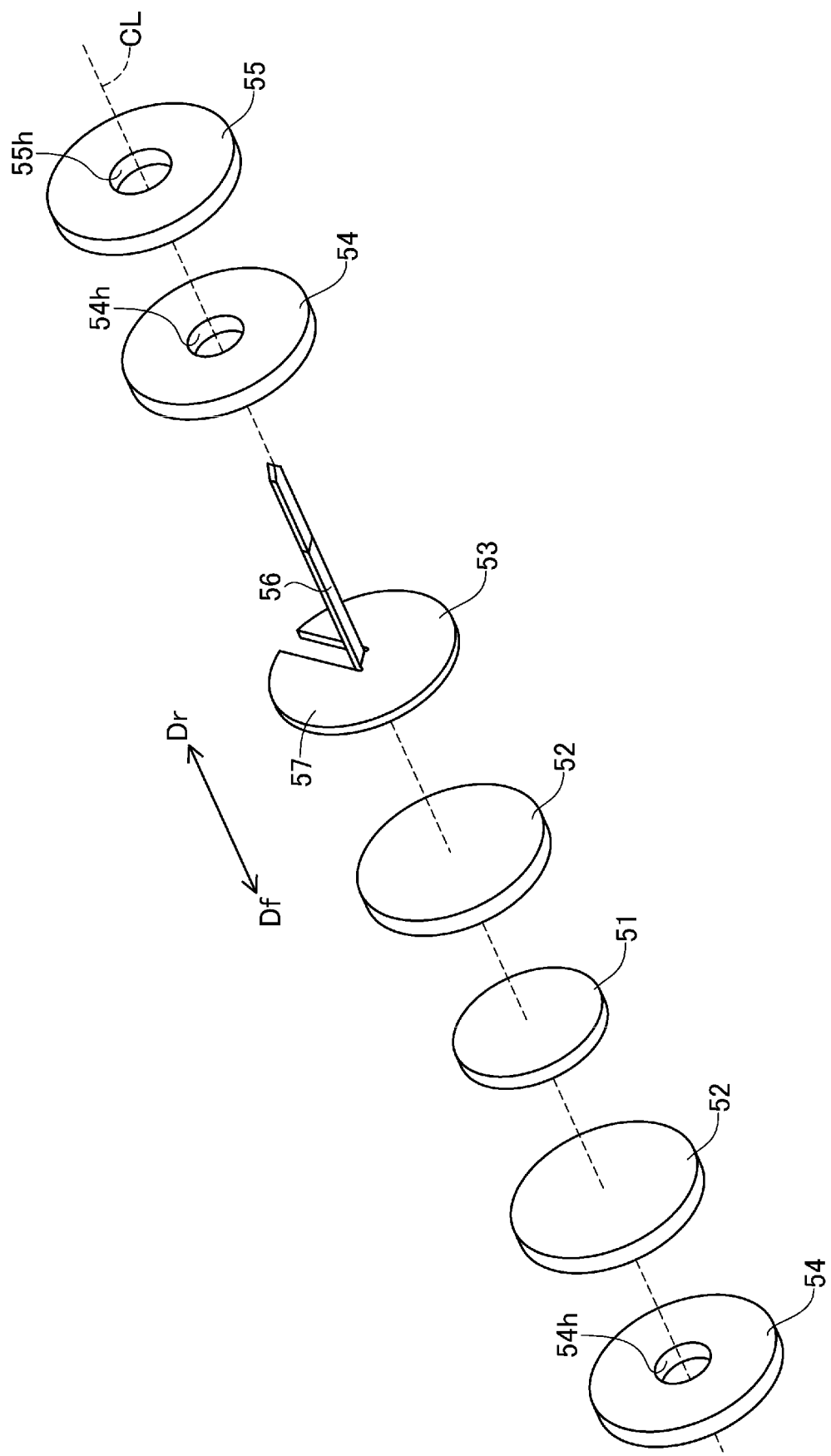
FIG. 3 Exploded perspective view of an element portion 50.

FIG. 3 is an exploded perspective view of the element portion 50. As shown, each of the piezoelectric element 51 and the electrodes 52 is a disc-shaped plate-like member having a center on the axial line CL. Each of the presser plates 54 and the insulating plate 55 is an annular-shaped plate-like member having a center on the axial line CL. The piezoelectric element 51 is formed from crystal in the present embodiment, but a piezoelectric element formed from another material may be adopted. On the piezoelectric element 51, electrical charge occurs in accordance with a load transmitted from the pressure receiving portion 40 (FIG. 2) through the rod 44. The piezoelectric element 51 outputs electrical charge (e.g., an electric signal) corresponding to the load, through the two electrodes 52. The amount of deformation of the diaphragm 42, that is, the pressure within the combustion chamber, can be identified on the basis of the outputted electric signal. As described above, the piezoelectric element 51 has an electrical characteristic which changes in response to the pressure received by the pressure receiving portion 40. Each of the electrodes 52 and the presser plate 54 is formed from stainless steel in the present embodiment, but may be formed from another metal. The insulating plate 55 is a member for insulating the lead portion 53 and the cap screw 32 (FIG. 2) from each other. The insulating plate 55 is formed from alumina in the present embodiment, but may be formed from another type of insulating material.

The lead portion 53 includes: a disc portion 57 which is a substantially disc-shaped plate-like member; and a terminal portion 56 which extends from a central portion of the disc portion 57 toward the rear end direction Dr. The terminal portion 56 projects to the rear end direction Dr side through a through hole 54*h* of the presser plate 54 and a through hole 55*h* of the insulating plate 55 (FIG. 2). The lead portion 53 is formed from stainless steel in the present embodiment, but may be formed from another metal. The lead portion 53 can be produced by punching a shape obtained by combining the disc portion 57 and the terminal portion 56, from a stainless steel plate and then bending a portion that is to be the terminal portion 56.

The lead portion 53 is disposed within the axial hole 81 of the second metal shell 80 (FIG. 2) such that the disc portion 57 is in surface contact with the electrode 52 and the terminal portion 56 extends to the rear side. The terminal portion 56 penetrates the through hole 54*h* at a central portion of the presser plate 54 and the through hole 55*h* at a central portion of the insulating plate 55. A rear side portion of the terminal portion 56 is disposed within the axial hole 36 so as to be spaced apart from the inner wall surface of the axial hole 36 of the cap screw 32.

Each member (other than the insulating plate 55) forming the element portion 50 is disposed within the axial hole 81 of the second metal shell 80 so as to be spaced apart from the inner wall surface of the second metal shell 80. The electrode 52 at the rear side of the piezoelectric element 51 is electrically connected to the lead portion 53 (and further the presser plate 54 in the present embodiment) and is electrically separated from the first metal shell 20, the second metal shell 80, and the third metal shell 35. The electrode 52 at the front side of the piezoelectric element 51 is electrically connected to the third metal shell 35 via the front side presser plate 54, the rod 44, and the diaphragm 42. In the present embodiment, in order to cause a distribution of loads applied to the piezoelectric element 51 to be uniform, the presser plates 54 are disposed not only at the rear side of the piezoelectric element 51 but also at the front side of the piezoelectric element 51.

The cable 60 is disposed within the axial hole 21 of the first metal shell 20. The cable 60 is a member for transmitting the electrical charge on the piezoelectric element 51 to an electric circuit which is for detecting the combustion pressure within the internal combustion engine on the basis of the electrical charge on the piezoelectric element 51 and is not shown. In the present embodiment, noise is reduced by using, as the cable 60, a so-called shield line having a multilayer structure. The cable 60 includes: an internal conductor 65, an insulator 64, a conductive coating 63, an external conductor 62, and a jacket 61 which are disposed from the center thereof toward the outer peripheral side thereof. The internal conductor 65 is composed of a plurality of conducting wires. The radially outer side of the internal conductor 65 is surrounded by the insulator 64. The conductive coating 63 is provided on the outer peripheral surface of the insulator 64. The external conductor 62 which is a net shield is provided at the radially outer side of the conductive coating 63. The outer peripheral surface of the external conductor 62 is covered with the jacket 61. Such a cable including a plurality of coaxially arranged members is referred to as coaxial cable.

As shown in FIG. 2, at a front end portion of the cable 60, the external conductor 62 that is not covered with the jacket 61 is exposed toward the front side from a portion covered with the jacket 61. In addition, the insulator 64 that is not covered with the external conductor 62 is exposed toward the front side from a portion where the external conductor 62 is exposed. Furthermore, the internal conductor 65 that is not covered with the insulator 64 is exposed toward the front side from a portion where the insulator 64 is exposed.

The internal conductor 65 exposed at the front end portion of the cable 60 is connected to the terminal portion 56 of the element portion 50 via a plate conductor 75 and a small-diameter conductor 74. Specifically, the plate conductor 75 is welded to the front end of the internal conductor 65, the rear end of the small-diameter conductor 74 which is wound in a coil shape is welded to the front end of the plate conductor 75, and the front end of the small-diameter conductor 74 is welded to a rear end portion of the terminal portion 56. The plate conductor 75 and the small-diameter conductor 74 can transmit the electrical charge on the piezoelectric element 51 from the terminal portion 56 to the internal conductor 65. As the configuration for connecting the internal conductor 65 to the terminal portion 56, any other configuration can be adopted instead of the configuration using the plate conductor 75 and the small-diameter conductor 74.

A range from the front end of the terminal portion 56 to a position at the rear side with respect to the welded portion connecting the terminal portion 56 to the small-diameter conductor 74, including the entirety of the terminal portion 56 and a front end portion of the small-diameter conductor 74, is covered with a heat-shrinkable tube 72. Accordingly, the reliability of electrical insulation between the terminal portion 56 and the cap screw 32 is enhanced. In producing the pressure sensor 10, integration of the small-diameter conductor 74 and the lead portion 53, which includes the terminal portion 56, by welding and covering with the heat-shrinkable tube 72 are preferably performed prior to overall assembly.

A grounding conductor 76 extending from the front end of the external conductor 62 further to the front side is connected to a front end portion of the external conductor 62. The grounding conductor 76 is composed of a stranded wire formed continuously from the external conductor 62. A front end portion of the grounding conductor 76 is welded to a rear end portion of the cap screw 32. Accordingly, the external conductor 62 is grounded via the grounding conductor 76, the cap screw 32, the second metal shell 80, the third metal shell 35, and the cylinder head of the internal combustion engine.

In producing the pressure sensor 10, the rod 44 is inserted into the axial hole 39 from the front side of the third metal shell 35. The diaphragm 42 and the third metal shell 35 are welded to each other (e.g., by means of laser welding) to form a joint portion 45. The joint portion 45 is a portion where the diaphragm 42 and the third metal shell 35 are melted during welding (hereinafter, the joint portion 45 is also referred to as "welded portion 45" or "welding trace 45"). Such a joint portion 45 is a portion where the diaphragm 42 and the third metal shell 35 are integrated with each other. In addition, the joint portion 45 includes a component of the diaphragm 42 and a component of the third metal shell 35. Moreover, the joint portion 45 joins the diaphragm 42 to the third metal shell 35. The cap screw 32 is screwed into the axial hole 81 from the rear side of the second metal shell 80. At this stage, the cap screw 32 is temporarily fixed to the second metal shell 80. Thereafter, the element portion 50 is inserted into the axial hole 81 from the front side of the second metal shell 80. The terminal portion 56 of the lead portion 53 of the element portion 50 is integrated with the small-diameter conductor 74 and the heat-shrinkable tube 72 in advance. Then, the small-diameter conductor 74 is inserted from the front side of the axial hole 36 of the cap screw 32 and pulled out from the rear side of the axial hole 36. The rear side surface of the insulating plate 55 is supported by the front side surface of the cap screw 32. After these, the third metal shell 35 is placed at the front side of the second metal shell 80. Accordingly, the element portion 50 is interposed between the cap screw 32 and the rod 44. Then, the third metal shell 35 and the second metal shell 80 are welded to each other to form the joint portion 89. Thereafter, a preload is applied to the element portion 50 by rotating the cap screw 32 relative to the second metal shell 80. The preload can be adjusted by adjusting the number of rotations of the cap screw 32.

Then, the rear end of the small-diameter conductor 74 pulled out from the rear side of the cap screw 32 (specifically, the axial hole 36), and the front end of the internal conductor 65 are welded to the plate conductor 75. In addition, the front end portion of the grounding conductor 76 and the rear end portion of the cap screw 32 are welded to each other. Furthermore, the cable 60 is passed into the axial hole 21 of the first metal shell 20, and the front end of the first metal shell 20 and the second metal shell 80 are welded to each other to form the joint portion 26. Thereafter, a molten rubber is injected into the axial hole 21 of the first metal shell 20 to fill the axial hole 21 with a rubber layer (not shown), whereby the pressure sensor 10 is completed. By forming the rubber layer, the waterproofness of the inside of the pressure sensor 10 is improved, and the vibration-damping properties thereof are also enhanced. Instead of the molten rubber, a molten resin may be injected into the axial hole 21.

As the order of assembling the second metal shell 80, the third metal shell 35, the element portion 50, and the cap screw 32, other various orders can be adopted instead of the above-described order. For example, an order may be adopted in which the diaphragm 42 is welded to the third metal shell 35, the second metal shell 80 is welded to the third metal shell 35, the element portion 50 is inserted into the axial hole 81 from the rear side of the second metal shell 80, and the cap screw 32 is screwed into the axial hole 81 from the rear side of the second metal shell 80.

A-2. Operation of Pressure Sensor 10

Figure 4:
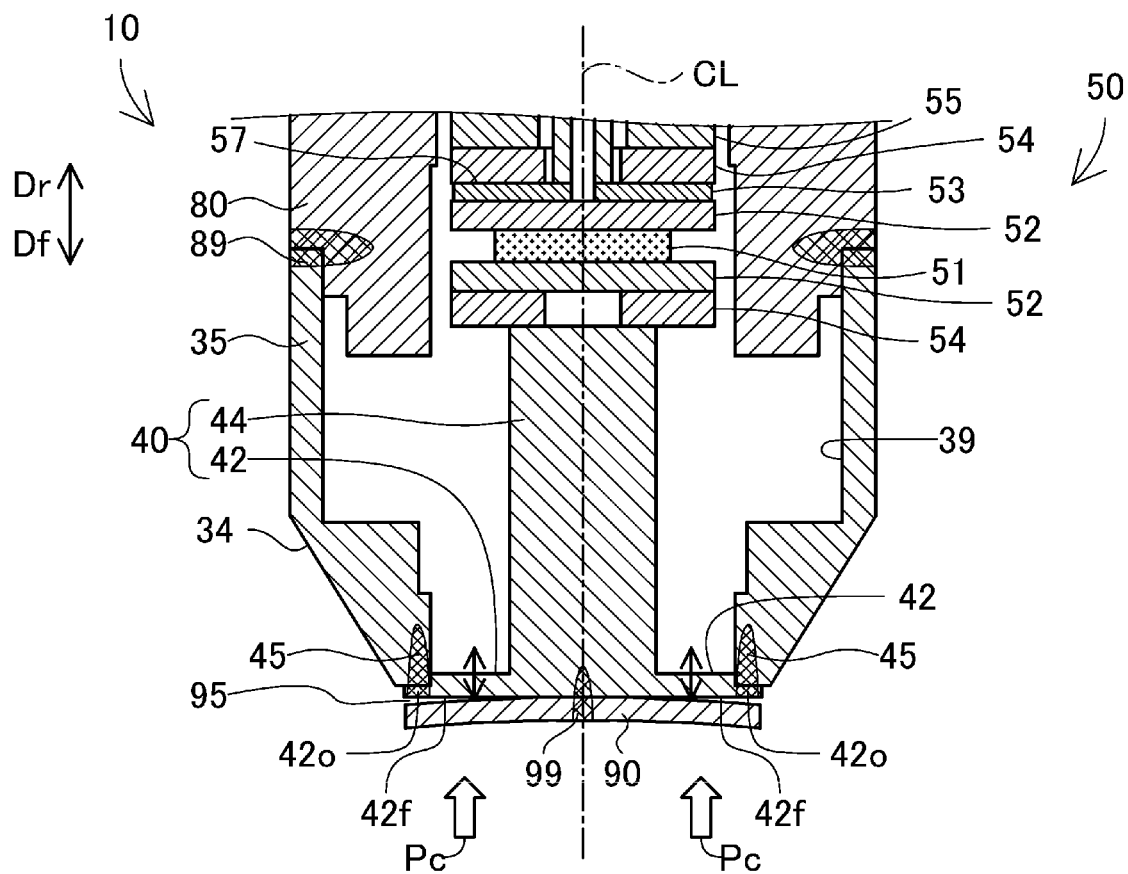
FIG. 4 Explanatory diagram of an operation of the pressure sensor 10.

FIG. 4 is an explanatory diagram of an operation of the pressure sensor 10. The drawing shows a plane cross-section, including the axial line CL, of a front side portion of the pressure sensor 10. The pressure receiving surface 42f of the diaphragm 42 can receive a pressure Pc within the combustion chamber through the gap 95 between the diaphragm 42 and the heat receiving portion 90. In addition, the diaphragm 42 can receive a load corresponding to the pressure Pc, through the heat receiving portion 90. The diaphragm 42 bends (deforms) in accordance with the pressure Pc within the combustion chamber. In the embodiment in FIG. 4, the diaphragm 42 bends in the axial direction. The rod 44 is displaced substantially parallel to the axial line CL in accordance with the bending (deformation) of the diaphragm 42. Accordingly, the rod 44 transmits the load corresponding to the pressure Pc, to the element portion 50.

In addition, the heat receiving portion 90 is disposed at the front side with respect to the diaphragm 42, that is, at the combustion chamber side. Instead of the diaphragm 42, the heat receiving portion 90 can receive heat from the combustion chamber. For example, heat generated by combustion of fuel can be transmitted to the front side surface of the heat receiving portion 90 via gas within the combustion chamber. In addition, high-temperature combustion gas can come into contact with the front side surface of the heat receiving portion 90. In this manner, the temperature of the heat receiving portion 90 (particularly, the front side surface thereof) can be increased. Since the diaphragm 42 is disposed at the rear side of the heat receiving portion 90, the diaphragm 42 is unlikely to receive heat from the combustion chamber as compared to the heat receiving portion 90. Therefore, thermal expansion of the diaphragm 42 is inhibited.

Figure 5:
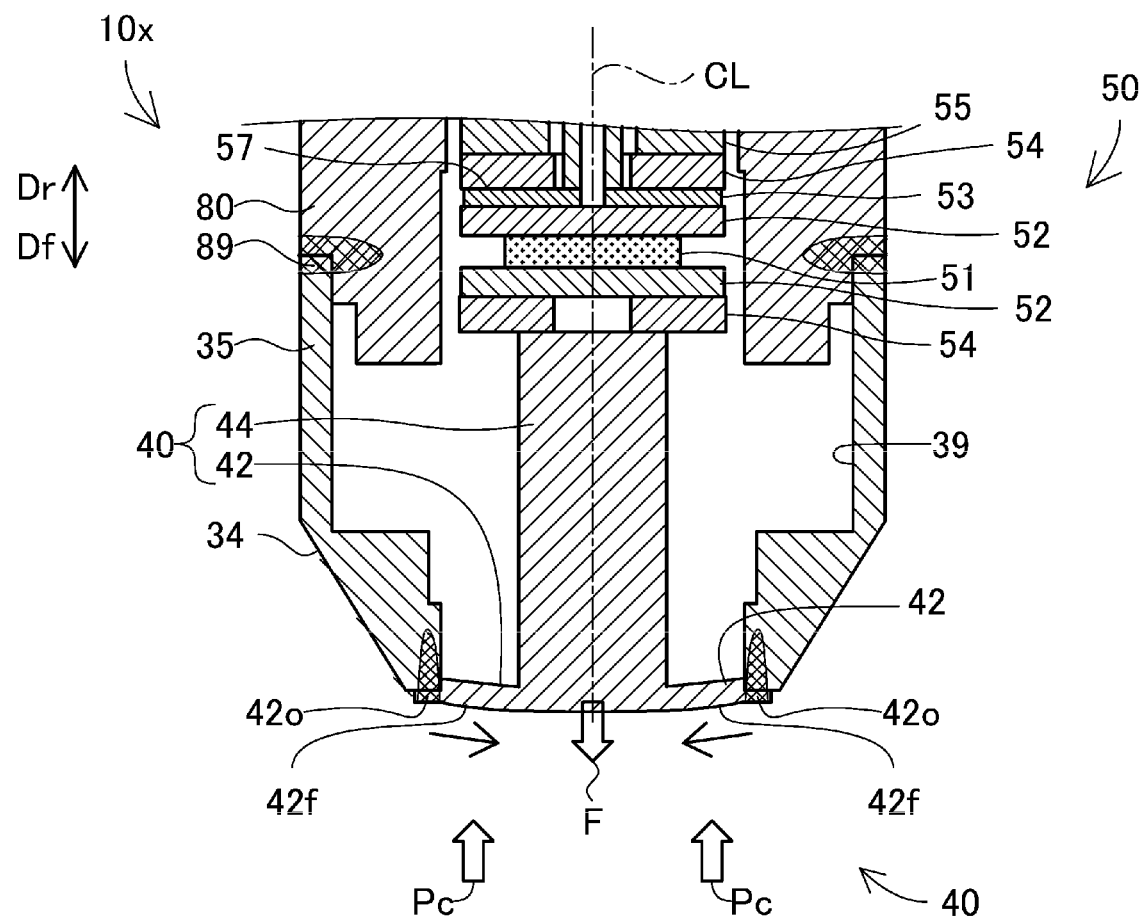
FIG. 5 Explanatory diagram of an operation of a pressure sensor 10x of a reference example.

FIG. 5 is an explanatory diagram of an operation of a pressure sensor 10x of a reference example. The drawing shows a plane cross-section, including the axial line CL, of a front side portion of the pressure sensor 10x. The only difference from the pressure sensor 10 of the embodiment in FIG. 4 is that the heat receiving portion 90 is omitted. The configuration of the other portion of the pressure sensor 10x is the same as the configuration of the corresponding portion of the pressure sensor 10 of the embodiment.

The pressure receiving surface 42f of the diaphragm 42 receives the pressure Pc within the combustion chamber, similarly to the pressure receiving surface 42f of the embodiment in FIG. 4. In addition, since the heat receiving portion 90 is omitted in the reference example in FIG. 5, unlike the embodiment in FIG. 4, a portion, at the front end direction Df side, of the diaphragm 42 (e.g., the pressure receiving surface 42o) receives heat from the combustion chamber. Thus, the portion, at the front end direction Df side, of the diaphragm 42 can thermally expand locally. In the reference example, the edge 42o, at the outer peripheral side, of the diaphragm 42 is joined to the third metal shell 35. Therefore, the diaphragm 42 attempts to stretch toward the inner peripheral side (axial line CL side) due to thermal expansion thereof. In this case, the thermal expansion of the diaphragm 42 can apply a force parallel to the axial line CL, to the rod 44. For example, in the reference example in FIG. 5, thermal expansion of the pressure receiving surface 42f of the diaphragm 42 applies a force F in the front end direction Df to the rod 44. Accordingly, the load applied to the element portion 50 is reduced. As described above, in the pressure sensor 10x of the reference example, the load applied to the element portion 50 can greatly vary depending on the temperature of the combustion gas, so that an error of a signal from the element portion 50 becomes large.

In the embodiment shown in FIG. 4, thermal expansion of the diaphragm 42 is inhibited by the heat receiving portion 90. Therefore, in the first embodiment, an error of a signal from the element portion 50 can be reduced as compared to the reference example in FIG. 5.

A-3. Details of Configuration of Vicinities of Heat Receiving Portion 90 and Diaphragm 42

Here, as shown in FIG. 2, the thickness (plate thickness) of the heat receiving portion 90, which is a plate-like member, is denoted by t. When the thickness t of the heat receiving portion 90 is large, the volume of the heat receiving portion 90 is larger than that in the case where the thickness t is small, and thus the amount of heat (heat capacity) that can be absorbed by the heat receiving portion 90 is increased. As a result, as the thickness of the heat receiving portion 90 is increased, heat from the combustion chamber is more unlikely to be transmitted to the diaphragm 42. Thus, thermal expansion of the diaphragm 42 can be inhibited further and consequently an error of a signal from the element portion 50 can be reduced.

As shown in FIG. 2, the minimum distance in the axial direction between the heat receiving portion 90 and the diaphragm 42 is denoted by d. The minimum distance d can be said to be the minimum distance of the gap 95 between the heat receiving portion 90 and the diaphragm 42 in the direction parallel to the axial line CL. In the embodiment in FIG. 2, the pressure receiving surface 42f of the diaphragm 42 and the rear side surface of the heat receiving portion 90 are joined directly to each other. Therefore, the minimum distance d is zero. In the case where the minimum distance d is small, high-temperature combustion gas is unlikely to flow into the gap 95, as compared to the case where the minimum distance d is large. Therefore, as the minimum distance d is decreased, thermal expansion of the diaphragm 42 can be inhibited further and consequently an error of a signal from the element portion 50 can be reduced. For example, the minimum distance d is preferably not greater than 0.5 mm and particularly preferably not greater than 0.3 mm.

Furthermore, as shown in FIG. 2, on the cross-section including the axial line CL, an angle formed between a rear side surface 90f (i.e., the surface opposing the pressure receiving surface 42f of the diaphragm 42) of the heat receiving portion 90 and a direction perpendicular to the axial line is denoted by θ. In the example in FIG. 2, the rear side surface 90f of the heat receiving portion 90 is slightly curved. Thus, the angle θ is 0 degree at the position of intersection with the axial line CL, and increases as the distance from the axial line CL increases toward the radially outer side. When the angle θ is small, high-temperature combustion gas is unlikely to flow into the gap 95 as compared to the case where the angle θ is large. Therefore, the absolute value of the angle θ is preferably within 20 degrees. When the absolute value of the angle θ is within 20 degrees, high-temperature combustion gas can be inhibited from flowing into the gap 95, so that the amount of heat transmitted to the diaphragm can be reduced further. As a result, thermal expansion of the diaphragm 42 can be inhibited further and consequently an error of a signal from the element portion 50 can be reduced.

Next, an effective area Sd of the diaphragm 42, a connection area Sn, and a heat receiving area Sn2 of the heat receiving portion 90 of the first embodiment will be described.

Figure 6:
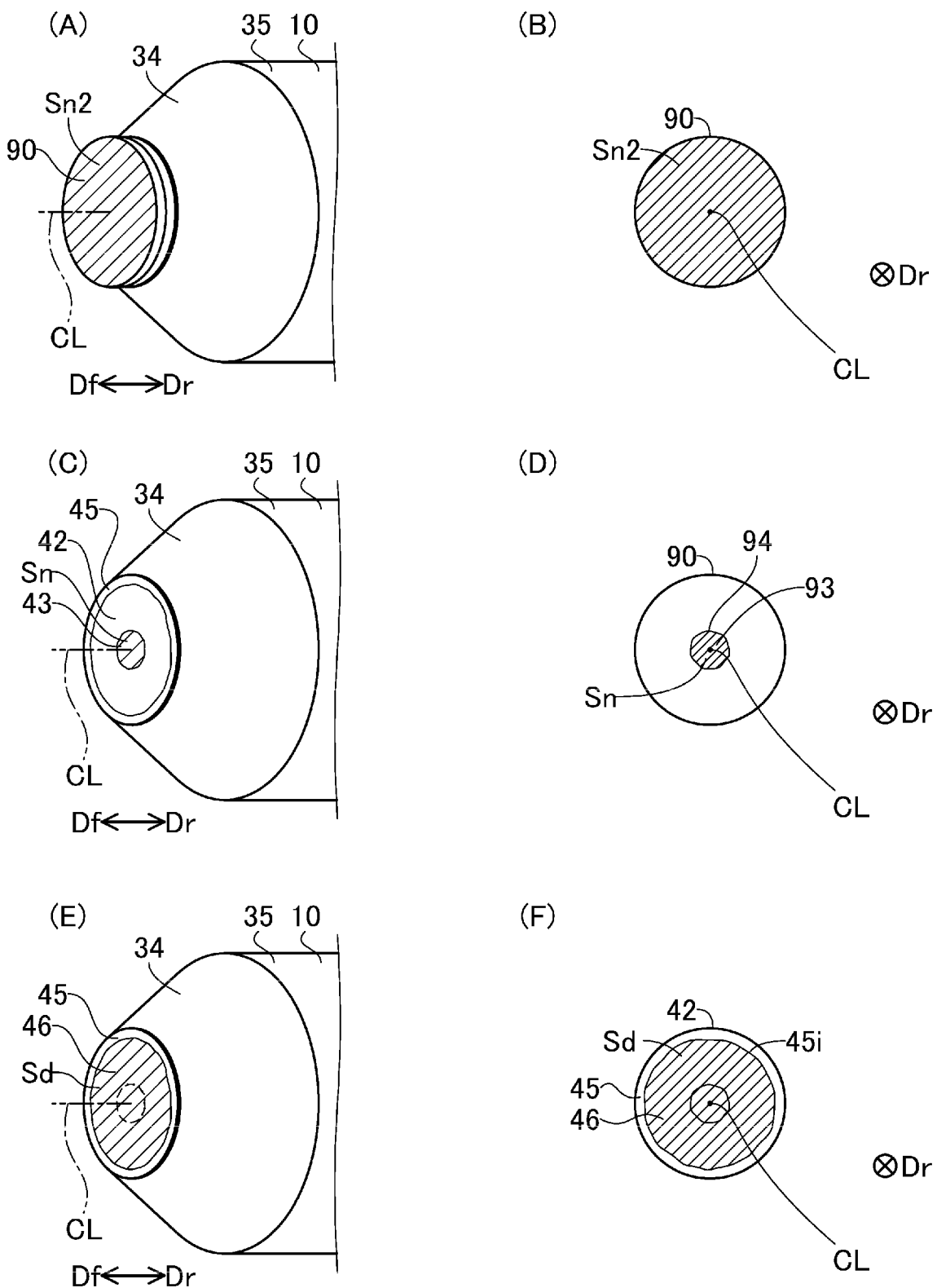
FIG. 6 Explanatory diagrams of parameters of the pressure sensor 10 of the first embodiment.

FIG. 6 shows explanatory diagrams of the parameters Sn2, Sn, and Sd of the pressure sensor 10 of the first embodiment. FIG. 6(A), FIG. 6(C), and FIG. 6(E) show perspective views of a front end portion of the pressure sensor 10, FIG. 6(B) and FIG. 6(D) show projection views obtained by projecting the heat receiving portion 90 onto a projection plane perpendicular to the axial line CL, and FIG. 6(F) shows a projection view obtained by projecting the diaphragm 42 onto the projection plane perpendicular to the axial line CL. FIG. 6(C) and FIG. 6(E) show a state where the heat receiving portion 90 is removed from the pressure receiving portion 40.

FIG. 6(A) and FIG. 6(B) show the heat receiving area Sn2. In each drawing, a region corresponding to the heat receiving area Sn2 is hatched. The heat receiving area Sn2 is the area of the entirety of the heat receiving portion 90 in the projection view of FIG. 6(B). In the first embodiment, the area of the surface, at the front end direction Df side, of the heat receiving portion 90 corresponds to the heat receiving area Sn2. The heat receiving area Sn2 indicates the area of a region where heat from the combustion chamber can be received instead of the diaphragm 42. When the heat receiving area Sn2 is large, heat from the combustion chamber is unlikely to be transmitted to the diaphragm 42 as compared to the case where the heat receiving area Sn2 is small. Therefore, as the heat receiving area Sn2 increases, thermal expansion of the diaphragm 42 is further inhibited, that is, an error of a signal from the element portion 50 reduces.

FIG. 6(C) and FIG. 6(D) show the connection area Sn. In each drawing, a region corresponding to the connection area Sn is hatched. The connection area Sn is the minimum value of the area of a minimum inclusion region that is a virtual region which includes the cross-section of a portion (hereinafter, also referred to as target portion) from the heat receiving portion 90 to the diaphragm 42 on a cross-section perpendicular to the axial line CL and of which the overall length of the contour is the smallest. In other words, the connection area Sn is the area of the minimum inclusion region at a specific axial position. The specific axial position is the position at which the minimum inclusion region on the cross-section perpendicular to the axial line CL is the smallest, among the axial positions in the range from the heat receiving portion 90 to the diaphragm 42. The minimum inclusion region on a specific cross-section is a virtual region which includes the target portion and of which the overall length of the contour is the smallest, on the specific cross-section. The minimum inclusion region is also referred to as convex hull. The minimum inclusion region is a single continuous region. The area of such a minimum inclusion region can change in accordance with the axial position of the cross-section. The connection area Sn is the minimum value of the area of the minimum inclusion region which can change in accordance with the position of the cross-section as described above. In the present embodiment, the portion from the heat receiving portion 90 to the diaphragm 42 includes the heat receiving portion 90, the diaphragm 42, and a portion which connects the heat receiving portion 90 to the diaphragm 42.

In the first embodiment, the heat receiving portion 90 is directly connected to the diaphragm 42 by the joint portion 99. Thus, the portion which connects the heat receiving portion 90 to the diaphragm 42 is a portion of the joint portion 99 between the rear side surface of the heat receiving portion 90 and the front side surface of the diaphragm 42. In the first embodiment, the connection area Sn, that is, the minimum area of the minimum inclusion region, is the area of the minimum inclusion region including the cross-section of the joint portion 99 on the cross-section including the connection surface between the heat receiving portion 90 and the diaphragm 42 (i.e., the rear side surface of the heat receiving portion 90 and the front side surface of the diaphragm 42), among the cross-sections from the heat receiving portion 90 to the diaphragm 42. The projection view of FIG. 6(D) shows a connection portion 93, joined to the diaphragm 42, on the rear side surface of the heat receiving portion 90. The connection portion 93 corresponds to a cross-section of the joint portion 99 (FIG. 2) which joins the heat receiving portion 90 to the diaphragm 42. The area of a minimum inclusion region 94 including the connection portion 93 is the connection area Sn. In the first embodiment, the shape of the connection portion 93 is substantially circular. Thus, the shape of the minimum inclusion region 94 is substantially the same as the shape of the connection portion 93, and the connection area Sn is substantially equal to the area of the connection portion 93 (i.e., the cross-sectional area of the joint portion 99). A connection portion 43 in FIG. 6(C) is a portion, corresponding to the connection portion 93, of the diaphragm 42.

The heat receiving portion 90 can thermally expand (i.e., can deform) upon reception of heat from the combustion chamber. When the connection portion 93, connected to the diaphragm 42, of the heat receiving portion 90 is large, that is, when the connection area Sn is large, deformation of the heat receiving portion 90 is easily transmitted to the diaphragm 42. When the diaphragm 42 deforms due to deformation of the heat receiving portion 90, an unintended load can be applied to the element portion 50 due to the deformation of the diaphragm 42. Therefore, as the connection area Sn decreases, an error of a signal from the element portion 50 reduces.

FIG. 6(E) and FIG. 6(F) show the diaphragm effective area Sd (hereinafter, also referred to merely as "effective area Sd"). In each drawing, a region corresponding to the effective area Sd is hatched. The effective area Sd is the area of a region 46 surrounded by the joint portion 45 in the projection view of FIG. 6(F). Here, as an inner peripheral contour 45i of the joint portion 45 (i.e., a contour 45i of the region 46), the inner peripheral contour of the joint portion 45 on a surface connected to the third metal shell 35, of the surface of the diaphragm 42, is adopted. For example, in the embodiment in FIG. 2 and FIG. 6(F), the inner peripheral contour of the joint portion 45 on the rear side surface of the diaphragm 42 corresponds to the contour 45i of the region 46.

In the first embodiment, the joint portion 45 which joins the diaphragm 42 to the third metal shell 35 has an annular shape in the projection view of FIG. 6(F). Therefore, the portion, within the region 46 surrounded by the joint portion 45, of the diaphragm 42 can deform in accordance with the pressure within the combustion chamber.

When a ratio (Sn2/Sd) of the heat receiving area Sn2 of the heat receiving portion 90 relative to the effective area Sd of the diaphragm 42 is high, the proportion of the portion, of the diaphragm 42, hidden at the rear side of the heat receiving portion 90 is high, so that heat from the combustion chamber is unlikely to be transmitted to the diaphragm 42. Therefore, as the ratio (Sn2/Sd) increases, thermal expansion of the diaphragm 42 is further inhibited, and consequently a pressure error Ep can be reduced. Thus, from the standpoint of reducing the pressure error Ep, the ratio (Sn2/Sd) is, for example, preferably not less than 0.8, further preferably not less than 0.9, and particularly preferably not less than 1. However, when the ratio Sn2/Sd is high, the heat receiving portion 90 is likely to come into contact with a hole, for mounting the pressure sensor 10, of the cylinder head of the internal combustion engine. Therefore, the upper limit of the ratio Sn2/Sd is preferably determined such that the heat receiving portion 90 does not come into contact with the mounting hole of the cylinder head, and, for example, the ratio Sn2/Sd is preferably not greater than 1.2.

A-4. First Evaluation Test

For the pressure sensor 10 of the first embodiment, 12 types of samples among which the thickness t of the heat receiving portion 90 and a ratio (Sn/Sd) of the above connection area Sn relative to the above effective area Sd are different, were produced, and a first evaluation test was conducted. Specifically, the total 12 types of samples of all combinations ((4×3) combinations) in each of which the thickness t of the heat receiving portion 90 is any of 0.1 mm, 0.2 mm, 0.21 mm, and 0.3 mm and the ratio (Sn/Sd) is any of 0.24 mm, 0.25 mm, and 0.26 mm as shown in Table 1, were produced.

TABLE 1

| | | Thickness t of heat receiving portion (mm) | | | |
|---|---|---|---|---|---|
| | | 0.1 | 0.2 | 0.21 | 0.3 |
| Sn/Sd | 0.24 | B | A | A | A |
| | 0.25 | B | B | A | A |
| | 0.26 | B | B | B | A |

Samples having different ratios (Sn/Sd) were produced by: fixing the effective area Sd as 16 mm$^2$; and changing the connection area Sn by changing the dimension of the joint portion 99. In each sample, the heat receiving portion 90 having a heat receiving area Sn2 of 16 mm$^2$ was used. Therefore, in each sample, the ratio (Sn2/Sd) of the heat receiving area Sn2 relative to the effective area Sd is 1. In addition, in each sample, the minimum distance d was set to 0 as shown in FIG. 2.

In the first evaluation test, a sample sensor and a pressure sensor which is a target (also referred to as "target sensor") were mounted to the same cylinder (i.e., the combustion chamber) of an internal combustion engine. Then, by operating the internal combustion engine, the waveform of a pressure was obtained from each of the sample sensor and the target sensor. An in-line 4-cylinder natural aspiration internal combustion engine having a displacement of 1.3 L was used as the internal combustion engine. The internal combustion engine was operated under a condition in which the maximum pressure within the combustion chamber was 20 MPa.

Figure 7:
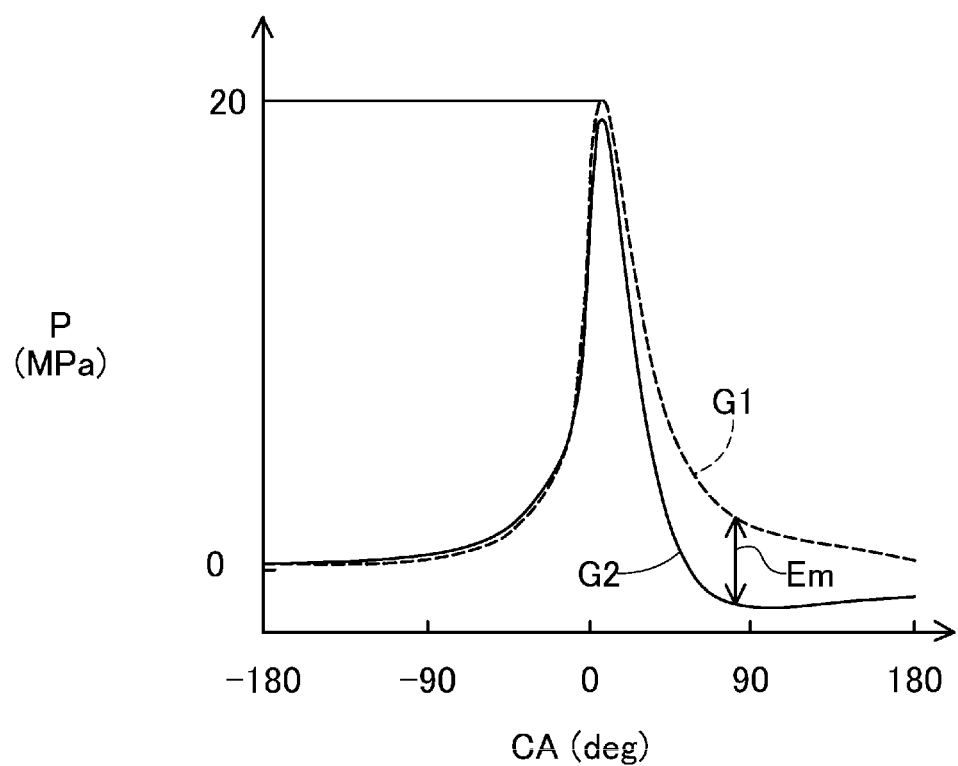
FIG. 7 Graph showing an example of the waveform of a pressure measured by each pressure sensor in a first evaluation test.

FIG. 7 is a graph showing an example of the waveform of the pressure measured by each pressure sensor in the first evaluation test. The horizontal axis indicates a crank angle CA, and the vertical axis indicates the pressure (the unit is kPa). A crank angle CA of zero degree indicates TDC (Top Dead Center). In the graph, a reference graph G1 and a sample graph G2 are shown. The reference graph G1 indicates the pressure measured by the target sensor. The sample graph G2 indicates the pressure measured by the pressure sensor sample.

As shown, a pressure G2 measured by the pressure sensor sample was different from a pressure G1 measured by the target pressure sensor in some cases (in the example in FIG. 7, the crank angle CA was within the range from zero degree to 180 degrees). The target pressure sensor was adjusted in advance so as to be able to measure a pressure with sufficiently favorable accuracy. In the present evaluation test, the pressure G2 of the sample and the pressure G1 of the target were measured over five cycles. The difference between the two pressures G1 and G2 at the same time was calculated. A maximum value Em (FIG. 7) of the difference was identified in each cycle. Then, the average of the five maximum differences Em was calculated as the pressure error Ep of the sample pressure sensor.

Then, the sample in which the absolute value of the pressure error Ep was not greater than 2% of 20 MPa, that is, 400 kPa was evaluated as "A", and the sample in which the absolute value of the pressure error Ep exceeded 400 kPa was evaluated as "B".

The evaluation results are as shown in Table 1. Among the 4 types of samples in which the ratio (Sn/Sd) is 0.24, the sample in which the thickness t of the heat receiving portion 90 is 0.1 mm, was evaluated as "B", and the samples in each of which the thickness t of the heat receiving portion 90 is not less than 0.2 mm, that is, 0.2 mm, 0.21 mm, or 0.3 mm, were evaluated as "A".

Among the 4 types of samples in which the ratio (Sn/Sd) is 0.25, the samples in each of which the thickness t of the heat receiving portion 90 is not greater than 0.2 mm, that is, 0.1 mm or 0.2 mm, were evaluated as "B", and the samples in each of which the thickness t of the heat receiving portion 90 is not less than 0.21 mm, that is, 0.21 mm or 0.3 mm, were evaluated as "A".

Among the 4 types of samples in which the ratio (Sn/Sd) is 0.26, the samples in each of which the thickness t of the heat receiving portion 90 is not greater than 0.21 mm, that is, 0.1 mm, 0.2 mm, or 0.21 mm, were evaluated as "B", and the sample in which the thickness t of the heat receiving portion 90 is 0.3 mm, was evaluated as "A".

From the above results, it was found that the pressure error Ep can be sufficiently reduced when the thickness t of the heat receiving portion 90 is not less than 0.21 mm (t≥0.21 mm) and the ratio (Sn/Sd) is not greater than 0.25 ((Sn/Sd)≤0.25).

The reason is as follows. As described above, as the thickness t of the heat receiving portion 90 increases, thermal expansion of the diaphragm 42 is further inhibited, and thus the pressure error Ep reduces. As the proportion of the connection area Sn relative to the effective area Sd of the diaphragm 42 decreases, that is, as the ratio (Sn/Sd) decreases, the influence of deformation of the heat receiving portion 90 on deformation of the diaphragm 42 reduces, and thus the pressure error Ep reduces. Therefore, it is thought that the pressure error Ep can be sufficiently reduced in a range where the thickness t of the heat receiving portion 90 is relatively large and the ratio (Sn/Sd) is relatively low, specifically, in a range that satisfies t≥0.21 mm and (Sn/Sd) ≤0.25. It is thought that the thickness t is more preferably in a larger range, for example, t≥0.3 mm. In addition, it is thought that the ratio (Sn/Sd) is more preferably in a lower range, for example, (Sn/Sd)≤0.24.

B. Second Embodiment

Figure 8:
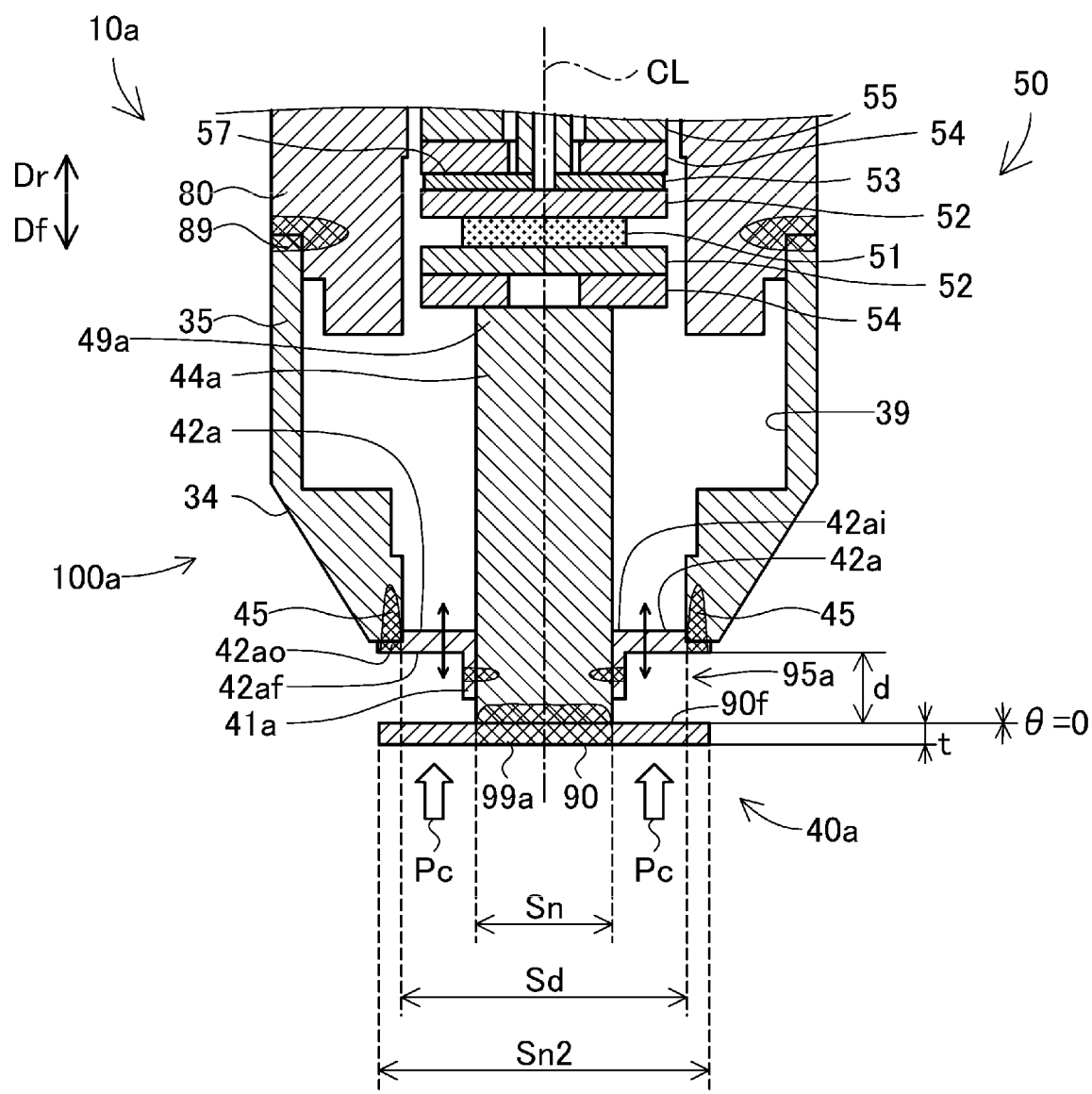
FIG. 8 Explanatory diagram of a pressure sensor 10a of a second embodiment.

FIG. 8 is an explanatory diagram of a pressure sensor 10a of a second embodiment. The drawing shows a plane cross-section, including the axial line CL, of a front side portion of the pressure sensor 10a similarly to FIG. 4. The only difference from the first embodiment in FIG. 4 is that a rod 44a extends to the front end direction Df side through a diaphragm 42a and the heat receiving portion 90 is joined to a front end portion of the rod 44a. The configuration of the other portion of the pressure sensor 10a is the same as the configuration of the corresponding portion of the pressure sensor 10 of the first embodiment.

In the second embodiment, a pressure receiving portion 40a includes the rod 44a, the diaphragm 42a, and a fixing portion 41a. The diaphragm 42a is an annular-shaped film having a center on the axial line CL. An edge 42ao, at the outer peripheral side, of the diaphragm 42a is welded to the front end portion of the third metal shell 35 over the entirety thereof (e.g., by means of laser welding). The joint portion 45 which joins the diaphragm 42a to the third metal shell 35 is a portion melted during welding. The fixing portion 41a is connected to an edge 42ai, at the inner peripheral side, of the diaphragm 42a. The fixing portion 41a is a cylindrical portion having a center on the axial line CL and extends from the edge 42ai of the diaphragm 42a toward the front end direction Df side. The fixing portion 41a and the diaphragm 42a are integrally formed from stainless steel (e.g., by means of forging or machining). However, after the fixing portion 41a and the diaphragm 42a are separately formed, the fixing portion 41a and the diaphragm 42a may be integrated with each other by means of welding or the like. In addition, another material (e.g., steel such as low-carbon steel and various metallic materials) may be adopted.

The rod 44a is inserted into through holes, at the inner peripheral side, of the fixing portion 41a and the diaphragm 42a. The rod 44a is a columnar member having a center on the axial line CL. The rear end surface of the rod 44a is in contact with the front side surface of the front side presser plate 54 of the element portion 50. The front end portion of the rod 44a projects from the fixing portion 41a to the front side. The rod 44a is formed from stainless steel in the present embodiment, but may be formed from another metal.

The fixing portion 41a and the rod 44a are welded over the entire circumference thereof (e.g., by means of laser welding). In this manner, the diaphragm 42a is connected to the rod 44a via the fixing portion 41a. The piezoelectric element 51 is connected to the rod 44a via the front side electrode 52 and the front side presser plate 54. The entireties of the fixing portion 41a, the rod 44a, the front side presser plate 54, and the front side electrode 52 form a connection portion 100a which connects the diaphragm 42a to the piezoelectric element 51.

The heat receiving portion 90 is joined to the front end surface of the rod 44a (e.g., by means of laser welding). The heat receiving portion 90 is joined to the rod 44a via a joint portion 99a. The joint portion 99a is a portion where the heat receiving portion 90 and the rod 44a are melted during welding (hereinafter, the joint portion 99a is also referred to as "welded portion 99a" or "welding trace 99a"). Such a joint portion 99a is a portion where the heat receiving portion 90 and the rod 44a are integrated with each other. In addition, the joint portion 99a includes a component of the heat receiving portion 90 and a component of the rod 44a. As described above, in the second embodiment, the heat receiving portion 90 is connected to the diaphragm 42a via the rod 44a and the fixing portion 41a. The joint portion 99a is formed at the central portion of the heat receiving portion 90. In the second embodiment, the joint portion 99a is formed over the entirety of the front end surface of the rod 44a. The heat receiving portion 90 is formed from stainless steel in the present embodiment, but may be formed from another metal.

When the pressure sensor 10a is seen toward the rear end direction Dr, substantially the entirety of the diaphragm 42a is hidden by the heat receiving portion 90. Similarly to the first embodiment, instead of the diaphragm 42a, the heat receiving portion 90 can receive heat from the combustion chamber. Since the diaphragm 42a is disposed at the rear side of the heat receiving portion 90, the diaphragm 42a is unlikely to receive heat from the combustion chamber as compared to the heat receiving portion 90. Therefore, thermal expansion of the diaphragm 42a is inhibited. In the second embodiment, an error of a signal from the element portion 50 can be reduced as compared to the reference example in FIG. 5.

B-2. Details of Configuration of Vicinities of Heat Receiving Portion 90 and Diaphragm 42a Also in the second embodiment, as shown in FIG. 8, the thickness (plate thickness) of the heat receiving portion 90, which is a plate-like member, is denoted by t. In addition, as shown in FIG. 8, a minimum distance in the axial direction between the heat receiving portion 90 and the diaphragm 42a is denoted by d. In the second embodiment in FIG. 8, unlike the first embodiment in FIG. 2, the heat receiving portion 90 is disposed at a position away in the front end direction Df from a pressure receiving surface 42af which is a surface, at the front end direction Df side, of the diaphragm 42a. In the second embodiment, the minimum distance d of a gap 95a between the pressure receiving surface 42af and the heat receiving portion 90 in the direction parallel to the axial line CL is the distance between a surface, at the rear end direction Dr side, of the heat receiving portion 90 and the pressure receiving surface 42af of the diaphragm 42a. Similarly to the first embodiment, for example, the minimum distance d is preferably not greater than 0.5 mm and particularly preferably not greater than 0.3 mm.

Furthermore, as shown in FIG. 8, in the cross-section including the axial line CL, an angle formed between the rear side surface 90f (i.e., the surface opposing the pressure receiving surface 42af of the diaphragm 42a) of the heat receiving portion 90 and the direction perpendicular to the axial line is denoted by 0. In the example in FIG. 8, the rear side surface 90f of the heat receiving portion 90 is a surface perpendicular to the axial line CL. Thus, the angle θ is zero. Similarly to the first embodiment, the absolute value of the angle θ is preferably within 20 degrees. If so, high-temperature combustion gas is inhibited from flowing into the gap 95a, so that thermal expansion of the diaphragm 42a can be further inhibited and consequently an error of a signal from the element portion 50 can be reduced.

Next, the effective area Sd of the diaphragm 42a, the connection area Sn, and the heat receiving area Sn2 of the heat receiving portion 90 of the second embodiment will be described.

Figure 9:
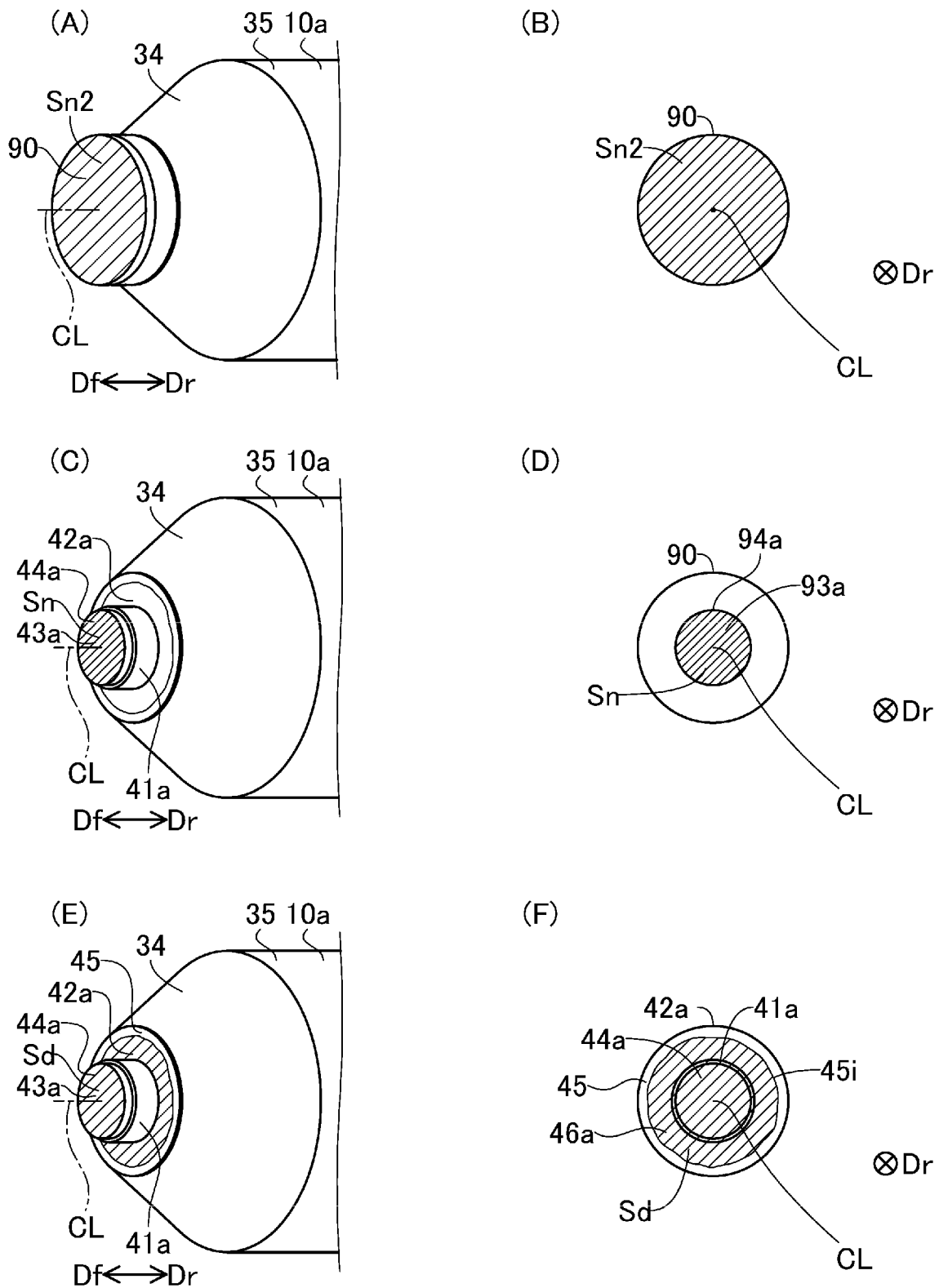
FIG. 9 Explanatory diagrams of parameters of the pressure sensor 10a (FIG. 8) of the second embodiment.

FIG. 9 shows explanatory diagrams of the parameters Sn2, Sn, and Sd of the pressure sensor 10a (FIG. 8) of the second embodiment. FIG. 9(A), FIG. 9(C), and FIG. 9(E) show perspective views of a front end portion of the pressure sensor 10a, FIG. 9(B) and FIG. 9(D) show projection views obtained by projecting the heat receiving portion 90 onto a projection plane perpendicular to the axial line CL, and FIG. 9(F) shows a projection view obtained by projecting the diaphragm 42a onto the projection plane perpendicular to the axial line CL. FIG. 9(C) and FIG. 9(E) show a state where the heat receiving portion 90 is removed from the rod 44a.

FIG. 9(A) and FIG. 9(B) show the heat receiving area Sn2. In each drawing, a region corresponding to the heat receiving area Sn2 is hatched. The heat receiving area Sn2 is the area of the entirety of the heat receiving portion 90 in the projection view of FIG. 9(B). In the second embodiment, the area of the surface, at the front end direction Df side, of the heat receiving portion 90 corresponds to the heat receiving area Sn2. Similarly to the first embodiment, also in the second embodiment, as the heat receiving area Sn2 increases, thermal expansion of the diaphragm 42a is further inhibited, that is, an error of a signal from the element portion 50 reduces.

FIG. 9(C) and FIG. 9(D) show the connection area Sn. In each drawing, a region corresponding to the connection area Sn is hatched. In the second embodiment, the heat receiving portion 90 (FIG. 8) is connected indirectly to the diaphragm 42a via the rod 44a and the fixing portion 41a (the heat receiving portion 90 and the rod 44a are connected directly to each other by the joint portion 99a). A portion from the heat receiving portion 90 to the diaphragm 42a includes the heat receiving portion 90, the diaphragm 42a, and a portion which connects the heat receiving portion 90 to the diaphragm 42a. The portion which connects the heat receiving portion 90 to the diaphragm 42a includes a portion of the joint portion 99a between the rear side surface of the heat receiving portion 90 and the front side surface of the rod 44a, a portion of the rod 44a from a portion connected to the fixing portion 41a to a portion connected to the heat receiving portion 90, and the fixing portion 41a. In the second embodiment, the connection area Sn, that is, the minimum area of the minimum inclusion region, is the area of the minimum inclusion region on a specific cross-section on which the area of the minimum inclusion region is the smallest, among the cross-sections perpendicular to the axial line CL in the axial range from the heat receiving portion 90 to the diaphragm 42a. Specifically, the connection area Sn is the area of the minimum inclusion region on a cross-section between the rear side surface of the heat receiving portion 90 and the front end of the fixing portion 41a. The projection view of FIG. 9(D) shows a connection portion 93a, connected to the rod 44a, on the rear side surface of the heat receiving portion 90. The connection portion 93a corresponds to a cross-section of the joint portion 99a (FIG. 8) which joins the heat receiving portion 90 to the rod 44a. In the second embodiment, the shape of the connection portion 93a is the same as the cross-sectional shape of the rod 44a. Thus, the area of a minimum inclusion region 94a including the connection portion 93a is the connection area Sn. In the second embodiment, the shape of the connection portion 93a (i.e., the cross-sectional shape of the rod 44a) is substantially circular. Thus, the shape of the minimum inclusion region 94a is substantially the same as the shape of the connection portion 93a, and the connection area Sn is substantially equal to the area of the connection portion 93a (i.e., the cross-sectional area of the joint portion 99a and further the cross-sectional area of the rod 44a). A connection portion 43a in FIG. 9(C) is a portion, corresponding to the connection portion 93a, of the rod 44a.

Similarly to the first embodiment, also in the second embodiment, the heat receiving portion 90 can thermally expand (i.e., can deform) upon reception of heat from the combustion chamber. When the connection portion 93a of the heat receiving portion 90 is large, that is, when the connection area Sn is large, deformation of the heat receiving portion 90 is easily transmitted to the diaphragm 42a. Therefore, as the connection area Sn decreases, an error of a signal from the element portion 50 reduces.

FIG. 9(E) and FIG. 9(F) show the diaphragm effective area Sd (effective area Sd). In each drawing, a region corresponding to the effective area Sd is hatched. The effective area Sd is the area of a region 46a surrounded by the joint portion 45 in the projection view of FIG. 9(F). Here, as an inner peripheral contour 45i of the joint portion 45 (i.e., a contour 45i of the region 46a), the inner peripheral contour of the joint portion 45 on a surface connected to the third metal shell 35, of the surface of the diaphragm 42a, is adopted. For example, in the second embodiment in FIG. 8 and FIG. 9(F), the inner peripheral contour of the joint portion 45 on the rear side surface of the diaphragm 42a corresponds to the contour 45i of the region 46a.

In the second embodiment, the joint portion 45 which joins the diaphragm 42a to the third metal shell 35 has an annular shape in the projection view of FIG. 9(F). Therefore, the portion, within the region 46 surrounded by the joint portion 45, of the pressure receiving portion 40a (i.e., the diaphragm 42a, the fixing portion 41a, and the rod 44a) can deform in accordance with the pressure within the combustion chamber. The effective area Sd is the area of the entirety of the region 46 surrounded by the joint portion 45.

Also in the second embodiment, similarly to the first embodiment, preferably, the thickness t of the heat receiving portion 90 is not less than 0.21 mm (t≥0.21 mm) and the ratio (Sn/Sd) is not greater than 0.25 ((Sn/Sd)≤0.25). If so, the pressure error Ep can be sufficiently reduced.

C. Evaluation Test

An evaluation test using samples of the pressure sensor 10 in FIG. 2 and the pressure sensor 10a in FIG. 8 will be described. In the evaluation test, errors of measurement results of pressures by the pressure sensor 10 and 10a were evaluated. A plurality of types of samples having different combinations of the minimum distance d between the heat receiving portion 90 and the diaphragm 42 or 42a, the effective area Sd of the diaphragm 42 or 42a, the connection area Sn, and the heat receiving area Sn2 of the heat receiving portion 90, were evaluated as the samples of the pressure sensors 10 and 10a.

Figure 10:
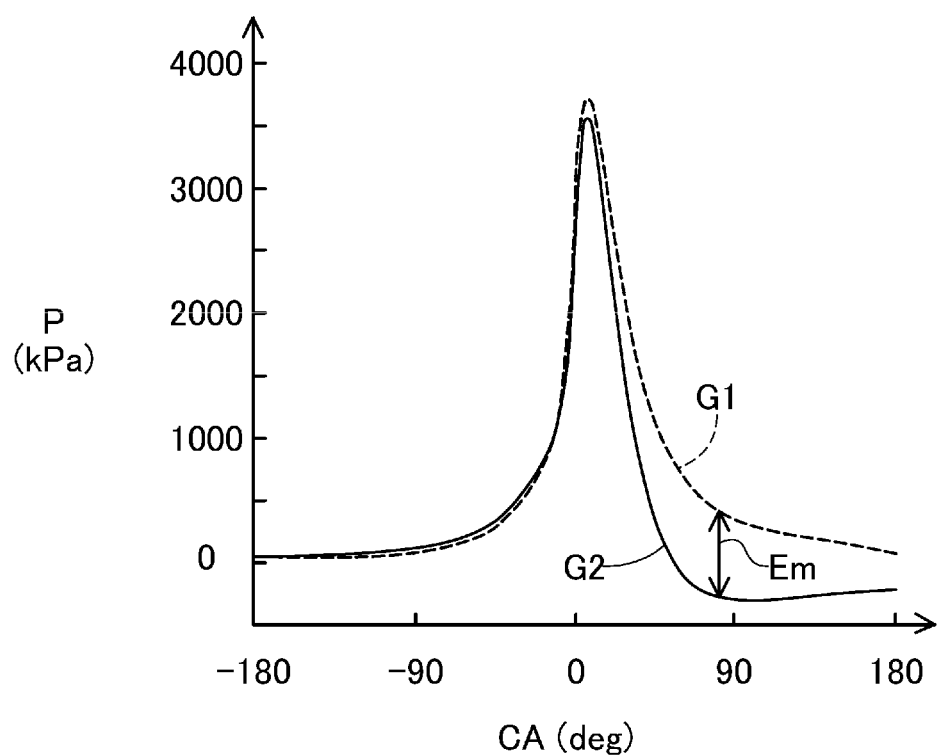
FIG. 10 Graph showing an example of the waveform of a pressure measured by each pressure sensor in a second evaluation test.

FIG. 10 is a graph showing an example of the waveform of the pressure measured by each pressure sensor in the second evaluation test. The horizontal axis indicates the crank angle CA, and the vertical axis indicates the pressure (the unit is kPa). A crank angle CA of zero degree indicates TDC (Top Dead Center). In the graph, a reference graph G1 and a sample graph G2 are shown. The reference graph G1 indicates the pressure measured by a pressure sensor that is a target (also referred to as "target sensor"). The sample graph G2 indicates the pressure measured by a pressure sensor sample.

In the second evaluation test, the sample sensor and the target sensor were mounted to the same cylinder (i.e., the combustion chamber) of an internal combustion engine. Then, by operating the internal combustion engine, the waveform of a pressure was obtained from each of the sample sensor and the target sensor. An in-line 4-cylinder natural aspiration internal combustion engine having a displacement of 1.3 L was used as the internal combustion engine. The internal combustion engine was operated under a condition in which the rotation rate was 1500 rpm and the axis torque was 40 Nm.

As shown, a pressure G2 measured by the pressure sensor sample was different from a pressure G1 measured by the target pressure sensor in some cases (in the example in FIG. 10, the crank angle CA was within the range from zero degree to 180 degrees). When a difference occurs between the pressure G2 of the sample and the pressure G1 of the target, any pressure G2 of the sample tended to be smaller than the pressure G1 of the target. The target pressure sensor was adjusted in advance so as to be able to measure a pressure with sufficiently favorable accuracy. In this second evaluation test, the pressure G2 of the sample and the pressure G1 of the target were measured over five cycles. The difference between the two pressures G1 and G2 at the same time was calculated. A maximum value Em (FIG. 10) of the difference was identified in each cycle. Then, the average of the five maximum differences Em was calculated as the pressure error Ep of the sample pressure sensor.

Figure 11:
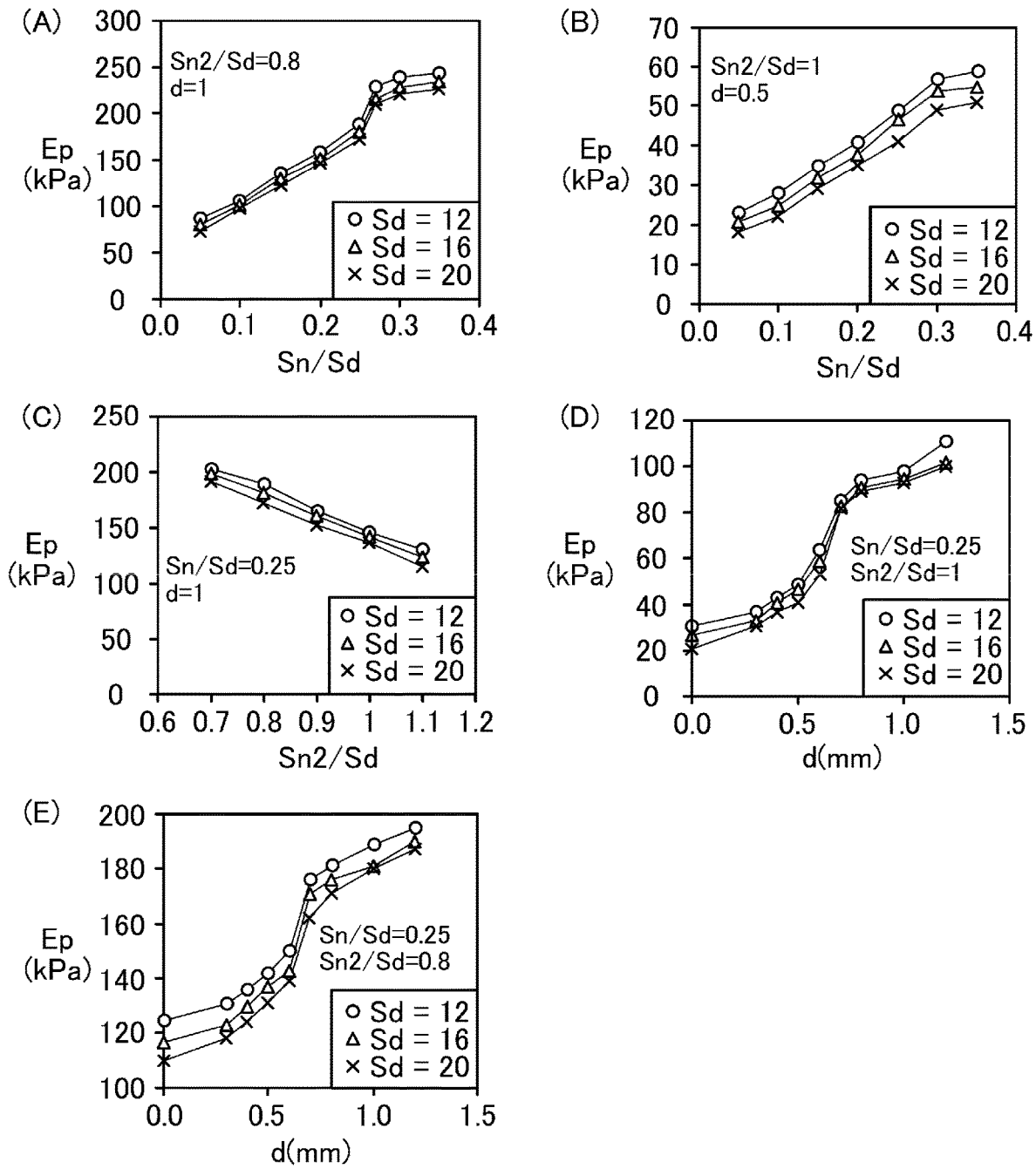
FIG. 11 Graphs showing the results of the second evaluation test.

FIG. 11(A) is a graph showing the results of the second evaluation test. The horizontal axis indicates the ratio Sn/Sd, and the vertical axis indicates the pressure error Ep (the unit is kPa). One data point in each graph indicates the pressure error Ep of one sample. A plurality of samples in FIG. 11(A) were samples of the pressure sensor 10a (e.g., FIG. 8) of the second embodiment. Regarding the plurality of samples in FIG. 11(A), the ratio Sn/Sd was distributed within the range of not less than 0.05 and not greater than 0.35. The effective area Sd was any of 12 mm$^2$, 16 mm$^2$, and 20 mm$^2$. The effective area Sd was adjusted by adjusting the inner diameter of the front end portion of the third metal shell 35 and the outer diameter of the diaphragm 42a (the same applies to a plurality of samples in other graphs described later). The ratio Sn2/Sd was 0.8, and the minimum distance d was 1 mm.

As shown in FIG. 11(A), the pressure error Ep reduced as the ratio Sn/Sd decreased. The reason is that the influence of deformation of the heat receiving portion 90 on deformation of the diaphragm 42a reduces as the proportion of the connection area Sn relative to the effective area Sd of the diaphragm 42a decreases.

As shown in FIG. 11(A), when the ratio Sn/Sd was not greater than 0.25, a favorable pressure error Ep of not greater than 200 kPa was able to be achieved. The ratios Sn/Sd that achieved the pressure error Ep of not greater than 200 kPa were 0.05, 0.1, 0.15, 0.2, and 0.25. A preferable range of the ratio Sn/Sd (a range of not less than a lower limit and not greater than an upper limit) may be determined by using the above five values. Specifically, an arbitrary value among the above five values may be adopted as the upper limit of the preferable range of the ratio Sn/Sd. For example, the ratio Sn/Sd is preferably not greater than 0.25 and particularly preferably not greater than 0.1. In addition, an arbitrary value that is not greater than the upper limit, among these values, may be adopted as the lower limit. For example, the ratio Sn/Sd may be not less than 0.05.

Since the influence of deformation of the heat receiving portion 90 on deformation of the diaphragm 42a reduces as the ratio Sn/Sd decreases, the ratio Sn/Sd may be less than 0.05 which is the minimum value among the above five values. However, when the ratio Sn/Sd is low, the heat receiving portion 90 easily comes off from the pressure sensor. Therefore, the ratio Sn/Sd is preferably greater than zero, and is preferably determined so as to be able to achieve such connection strength that the heat receiving portion 90 does not come off from the pressure sensor 10.

FIG. 11(B) is a graph showing the results of the second evaluation test of another plurality of samples. The horizontal axis indicates the ratio Sn/Sd, and the vertical axis indicates the pressure error Ep (the unit is kPa). The plurality of samples in FIG. 11(B) were samples of the pressure sensor 10a (e.g., FIG. 8) of the second embodiment. Regarding the plurality of samples in FIG. 11(B), the ratio Sn/Sd was distributed within the range of not less than 0.05 and not greater than 0.35. The effective area Sd was any of 12 mm$^2$, 16 mm$^2$, and 20 mm$^2$. Unlike the plurality of samples in FIG. 11(A), the ratio Sn2/Sd was 1, and the minimum distance d was 0.5 mm.

As shown in FIG. 11(B), the pressure error Ep reduced as the ratio Sn/Sd decreased. In addition, regardless of the ratio Sn/Sd, the pressure error Ep was not greater than 60 kPa. As described above, the plurality of samples in FIG. 11(B) were able to achieve a favorable pressure error Ep as compared to the plurality of samples in FIG. 11(A). The reason is that the ratio Sn2/Sd and the minimum distance d were adjusted to more preferable values (the details will be described later).

FIG. 11(C) is a graph showing the results of the second evaluation test of another plurality of samples. The horizontal axis indicates the ratio Sn2/Sd, and the vertical axis indicates the pressure error Ep (the unit is kPa). The plurality of samples in FIG. 11(C) were samples of the pressure sensor 10a (e.g., FIG. 8) of the second embodiment. Regarding the plurality of samples in FIG. 11(C), the ratio Sn2/Sd was distributed within the range of not less than 0.7 and not greater than 1.1. The effective area Sd was any of 12 mm$^2$, 16 mm$^2$, and 20 mm$^2$. The ratio Sn/Sd was 0.25, and the minimum distance d was 1 mm. The ratio Sn/Sd was within the above preferable range. The minimum distanced was the same as in the plurality of samples in FIG. 11(A).

In the samples in which ratio Sn2/Sd=1.1, the outer diameter of the heat receiving portion 90 (FIG. 8) was equal to the outer diameter of the diaphragm 42a. The reason why the ratio Sn2/Sd is greater than 1 is that the area of the joint portion 45 is removed from the diaphragm effective area Sd. In the samples in which the ratio Sn2/Sd is not greater than 1, the outer diameter of the heat receiving portion 90 was smaller than the outer diameter of the diaphragm 42a.

As shown in FIG. 11(C), the pressure error Ep reduced as the ratio Sn2/Sd increased. The reason is as follows. When the ratio Sn2/Sd is high, the proportion of the portion, of the diaphragm 42a, hidden at the rear side of the heat receiving portion 90 is high, so that heat from the combustion chamber is unlikely to be transmitted to the diaphragm 42a. Therefore, as the ratio Sn2/Sd increases, thermal expansion of the diaphragm 42a is further inhibited, and consequently the pressure error Ep can be reduced.

As shown in FIG. 11(C), when the ratio Sn2/Sd was not less than 0.8, a favorable pressure error Ep of not greater than 200 kPa was able to be achieved. The ratios Sn2/Sd that achieved the pressure error Ep of not greater than 200 kPa were 0.8, 0.9, 1, and 1.1. A preferable range of the ratio Sn2/Sd (a range of not less than a lower limit and not greater than an upper limit) may be determined by using the above four values. Specifically, an arbitrary value among the above four values may be adopted as the lower limit of the preferable range of the ratio Sn2/Sd. For example, the ratio Sn2/Sd is preferably not less than 0.8 and particularly preferably not less than 1. In addition, an arbitrary value that is not less than the lower limit, among these values, may be adopted as the upper limit. For example, the ratio Sn2/Sd may be not greater than 1.1.

Since the diaphragm 42a is more unlikely to receive heat from the combustion chamber as the ratio Sn2/Sd increases, the ratio Sn2/Sd may be greater than 1.1 which is the maximum value among the above four values. However, when the ratio Sn2/Sd is high, the heat receiving portion 90 is likely to come into contact with the hole, for mounting the pressure sensor 10a, of the cylinder head of the internal combustion engine. Therefore, the upper limit of the ratio Sn2/Sd is preferably determined such that the heat receiving portion 90 does not come into contact with the mounting hole of the cylinder head, and, for example, the ratio Sn2/Sd is preferably not greater than 1.2.

FIG. 11(D) and FIG. 11(E) are graphs showing the results of the second evaluation test of another plurality of samples. The horizontal axis indicates the minimum distance d, and the vertical axis indicates the pressure error Ep (the unit is kPa). Regarding the plurality of samples in FIG. 11(D) and FIG. 11(E), the minimum distanced was any of 0.0, 0.3, 0.4, 0.5, 0.6, 0.7, 0.8, 1.0, and 1.2 (mm). The effective area Sd was any of 12 mm$^2$, 16 mm$^2$, and 20 mm$^2$. A plurality of the samples in which the minimum distance d is 0.0 mm were samples of the pressure sensor 10 (e.g., FIG. 2) of the first embodiment. A plurality of the samples in which the minimum distance d is larger than 0.0 mm were samples of the pressure sensor 10a (e.g., FIG. 8) of the second embodiment.

In addition, the ratio Sn/Sd was common among the plurality of samples in FIG. 11(D) and FIG. 11(E) and was 0.25. The ratio Sn/Sd was within the above preferable range. The ratio Sn2/Sd was 1 in FIG. 11(D) and was 0.8 in FIG. 11(E). These ratios Sn2/Sd were within the above preferable range.

As shown in FIG. 11(D) and FIG. 11(E), any of the samples achieved a favorable pressure error Ep of not greater than 200 kPa. In addition, as shown in FIG. 11(D) and FIG. 11(E), the pressure error Ep reduced as the minimum distance d decreased. The reason is as follows. As the minimum distance d decreases, high-temperature combustion gas is more unlikely to flow into the gap 95 or 95a. Therefore, as the minimum distance d decreases, thermal expansion of the diaphragm 42a is further inhibited, and consequently the pressure error Ep can be reduced.

In addition, in FIG. 11(D) and FIG. 11(E), the pressure error Ep greatly changes between the range of d≥0.7 and the range of d≤0.5. When the minimum distance d was not greater than 0.5 mm as described above, the pressure error Ep was able to be significantly improved. However, the minimum distance d may exceed 0.5 mm.

The preferable range of each of the ratio Sn2/Sd, the ratio Sn/Sd, and the minimum distance d has been described above. The preferable ranges of these three types of parameters can be satisfied together. Therefore, a configuration in which one or more types of parameters selected arbitrarily from the three types of parameters fall within the preferable range of the respective parameters, is preferably adopted as the configuration of the pressure sensor. For example, as in some of the plurality of samples in FIG. 11(A) and FIG. 11(B), a configuration in which (Sn2/Sd)≥0.8 and (Sn/Sd) 0.25 may be adopted. Furthermore, one or more arbitrary conditions selected from the following three conditions may be satisfied.

| | |
|---|---|
| $(Sn2/Sd) \geq 1.0$ | Condition 1: |
| $d \leq 0.5$ mm | Condition 2: |
| $(Sn/Sd) \leq 0.1$ | Condition 3: |

The effective areas Sd of the diaphragms 42 and 42a that achieved a favorable pressure error Ep (e.g., a pressure error Ep of not greater than 200 kPa) were 12 mm$^2$, 16 mm$^2$, and 20 mm$^2$. The preferable range of the effective area Sd (a range of not less than a lower limit and not greater than an upper limit) may be determined by using the above three values. Specifically, an arbitrary value among the above three values may be adopted as the lower limit of the preferable range of the effective area Sd. For example, the effective area Sd may be not less than 12 mm$^2$. In addition, an arbitrary value that is not less than the lower limit, among these values, may be adopted as the upper limit. For example, the effective area Sd may be not greater than 20 mm$^2$. As shown in FIG. 11(A) to FIG. 11(E), the difference in pressure error Ep is small among a plurality of samples among which the effective area Sd is different but the other conditions are the same. That is, the dependence of the pressure error Ep on the effective area Sd is small. Therefore, the effective area Sd may be less than 12 mm$^2$, and may be greater than 20 mm$^2$.

D. Third Embodiment

Figure 12:
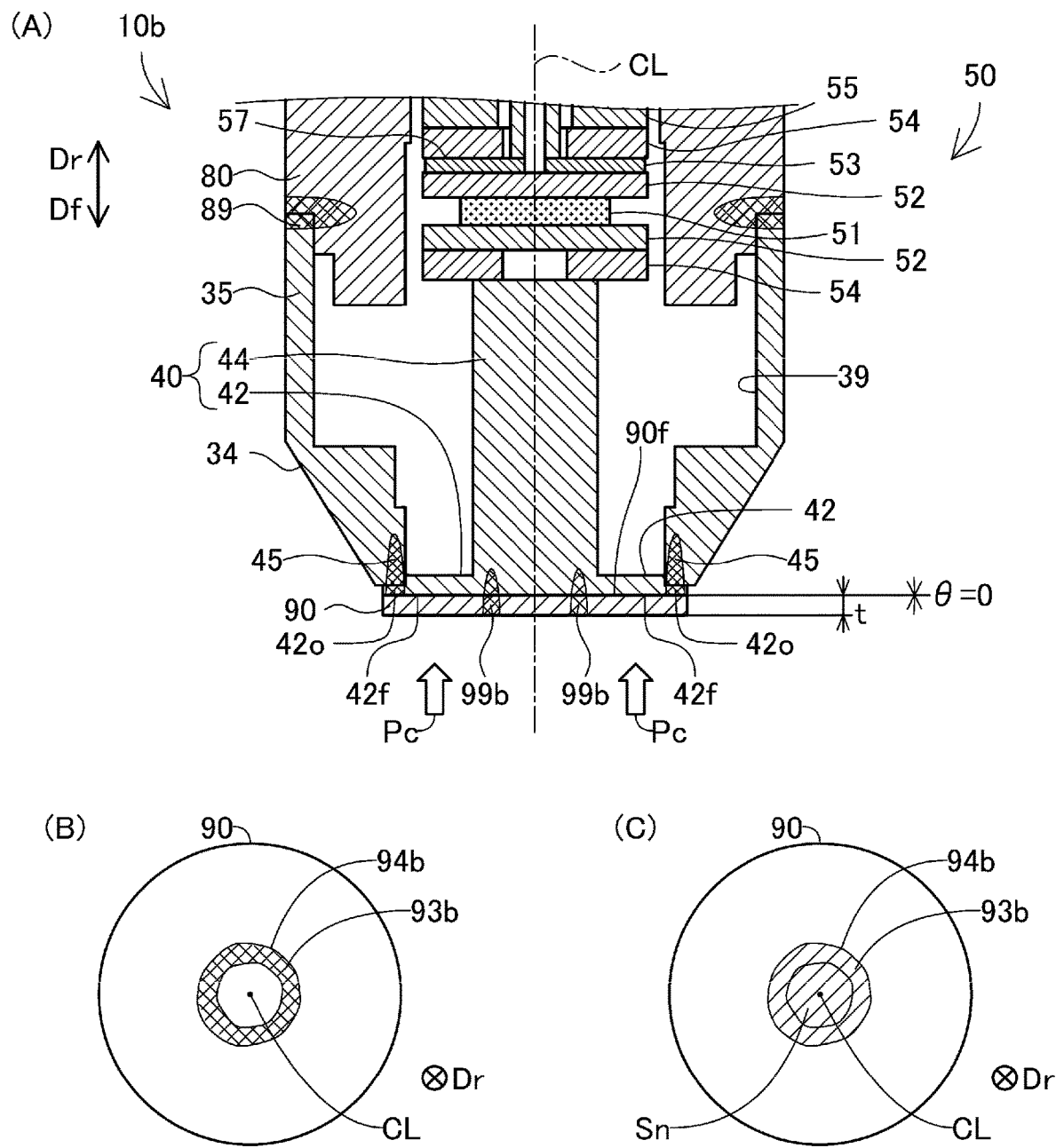
FIG. 12 Explanatory diagrams of a pressure sensor 10b of a third embodiment.

FIG. 12 shows explanatory diagrams of a pressure sensor 10b of a third embodiment. FIG. 12(A) shows a plane cross-section, including the axial line CL, of a front side portion of the pressure sensor 10b, and FIG. 12(B) and FIG. 12(C) show projection views obtained by projecting the heat receiving portion 90 onto a projection plane perpendicular to the axial line CL. The only difference from the first embodiment shown in FIG. 4 is that a joint portion 99b which joins the heat receiving portion 90 to the diaphragm 42 has an annular shape when seen toward the axial direction. The joint portion 99b is a portion where the heat receiving portion 90 and the diaphragm 42 (further the pressure receiving portion 40) are melted during welding (hereinafter, the joint portion 99b is also referred to as "welded portion 99b" or "welding trace 99b"). Such a joint portion 99b is a portion where the heat receiving portion 90 and the diaphragm 42 are integrated with each other. In addition, the joint portion 99b includes a component of the heat receiving portion 90 and a component of the diaphragm 42. The configuration of the other portion of the pressure sensor 10b is the same as the configuration of the corresponding portion of the pressure sensor 10 of the first embodiment.

FIG. 12(B) shows a connection portion 93b and the contour of a minimum inclusion region 94b including the connection portion 93b. The connection portion 93b is a portion, joined to the diaphragm 42, of the rear side surface of the heat receiving portion 90. In the drawing, the connection portion 93b is hatched. In the third embodiment, the connection portion 93b corresponds to the cross-section of the joint portion 99b on the rear side surface of the heat receiving portion 90. As described above, a portion, connected to the diaphragm 42, of the heat receiving portion 90 (here, the joint portion 99b) may be an annular portion having a hole.

Here, when the heat receiving portion 90 thermally expands, deformation of a portion, surrounded by the annular joint portion 99b, of the heat receiving portion 90 is easily transmitted to the diaphragm 42 through the joint portion 99b. The connection area Sn indicates the minimum area of a portion of the heat receiving portion of which deformation is easily transmitted as described above. In the third embodiment, the area of the minimum inclusion region 94b including the connection portion 93b is preferably adopted as the connection area Sn. In the third embodiment, the shape of the outer peripheral contour of the connection portion 93b is substantially circular, and thus the shape of the contour of the minimum inclusion region 94b is substantially the same as the shape of the outer peripheral contour of the connection portion 93b. As in the present embodiment, when a cross-section at a specific position among the axial positions in the range from the heat receiving portion to the diaphragm has an annular shape as with, for example, the cross-section of the joint portion 99b, the minimum inclusion region on the cross-section at this specific position is a region surrounded by the outer contour (outer edge) of this annular cross-section. In FIG. 12(C), a region corresponding to the connection area Sn is hatched. The ratio Sn/Sd calculated by using such a connection area Sn is preferably within the above preferable range. Accordingly, a favorable pressure error Ep is inferred to be able to be achieved.

Also in the third embodiment, a favorable pressure error Ep is inferred to be able to be achieved by adopting a configuration in which the thickness t of the heat receiving portion 90, the angle θ of the heat receiving portion 90, and one or more types of parameters selected arbitrarily from the ratio Sn2/Sd, the ratio Sn/Sd, and the minimum distance d are within the above preferable ranges of the respective parameters.

For example, also in the third embodiment, similarly to the first and second embodiments, preferably, the thickness t of the heat receiving portion 90 is not less than 0.21 mm (t≥0.21 mm) and the ratio (Sn/Sd) is not greater than 0.25 ((Sn/Sd)≤0.25). If so, the pressure error Ep can be sufficiently reduced.

In the embodiment in FIG. 12, the heat receiving portion 90 is connected directly to the diaphragm 42 by the joint portion 99b. Therefore, the minimum distance d is zero. In addition, the rear side surface 90f of the heat receiving portion 90 is perpendicular to the axial line CL. Therefore, the angle θ formed between the rear side surface 90f of the heat receiving portion 90 and the direction perpendicular to the axial line CL is 0.

E. Fourth Embodiment

Figure 13:
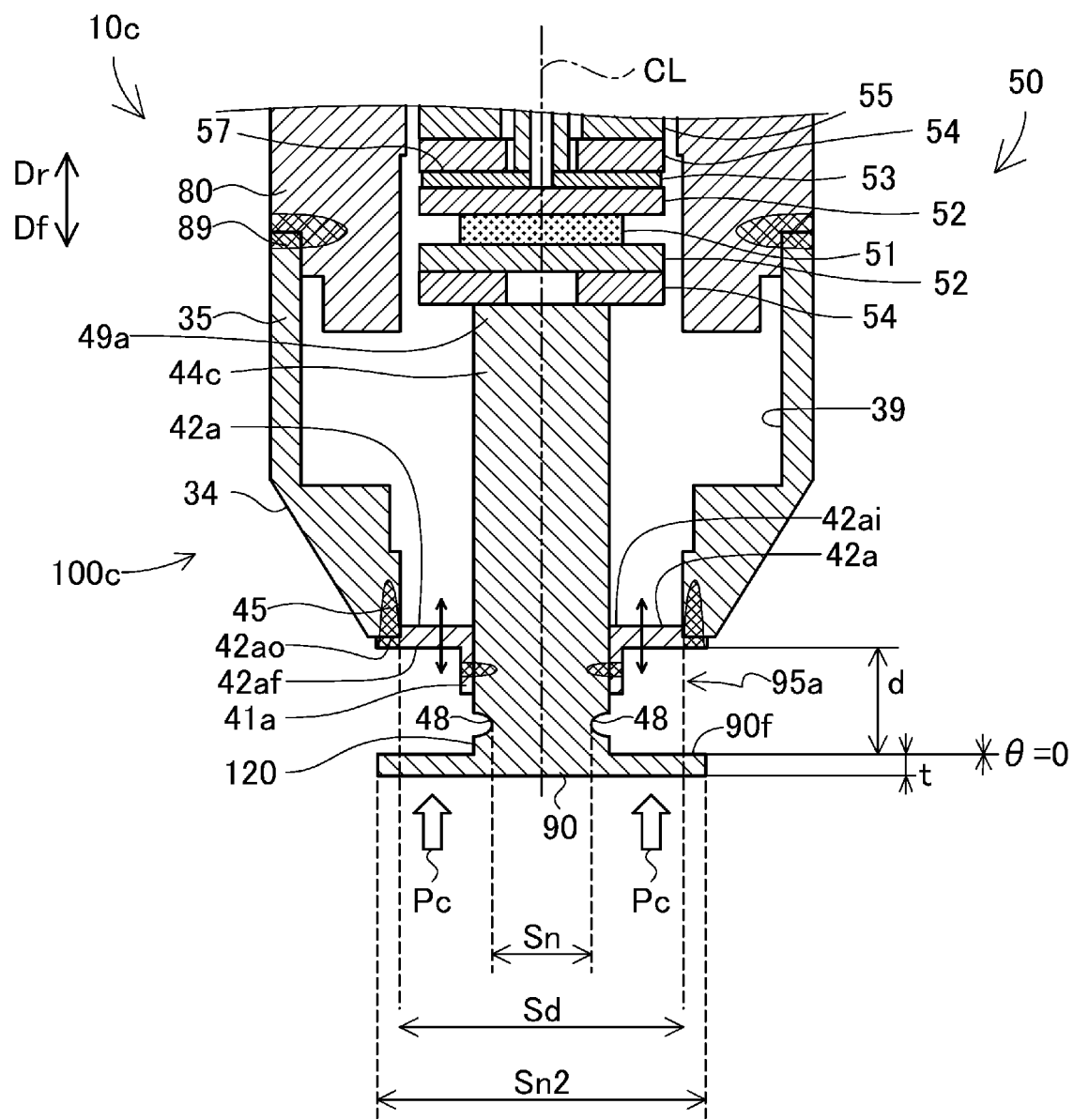
FIG. 13 Explanatory diagram of a pressure sensor 10c of a fourth embodiment.

FIG. 13 is an explanatory diagram of a pressure sensor 10c of a fourth embodiment. The drawing shows a plane cross-section, including the axial line CL, of a front side portion of the pressure sensor 10c. The difference from the second embodiment shown in FIG. 8 is that a heat receiving portion 90 and a rod 44c are formed by one member 120 (referred to as "heat receiving rod 120"). The configuration of the other portion of the pressure sensor 10c is the same as the configuration of the corresponding portion of the pressure sensor 10a of the second embodiment.

The heat receiving rod 120 includes the heat receiving portion 90 and the rod 44c connected to the rear side of the heat receiving portion 90. The shape of the heat receiving portion 90 is the same as the shape of the heat receiving portion 90 in FIG. 8. The shape of the rod 44c is a shape in which a small-diameter portion 48 having a small outer diameter is formed locally in a column having a center on the axial line CL. Similarly to the rod 44a in FIG. 8, the rod 44c is inserted into the through holes, at the inner peripheral side, of the fixing portion 41a and the diaphragm 42a and welded to the fixing portion 41a. The small-diameter portion 48 is located between the heat receiving portion 90 and the fixing portion 41a. The heat receiving rod 120 is integrally formed as one member (e.g., by means of forging or machining). In addition, the heat receiving rod 120 is formed from stainless steel in the present embodiment, but may be formed from another metal.

The piezoelectric element 51 is connected to the rod 44c via the front side electrode 52 and the front side presser plate 54. The entireties of the fixing portion 41a, the rod 44c, the front side presser plate 54, and the front side electrode 52 form a connection portion 100c which connects the diaphragm 42a to the piezoelectric element 51.

In the fourth embodiment, the heat receiving portion 90 is connected indirectly to the diaphragm 42a via the rod 44c and the fixing portion 41a. A portion from the heat receiving portion 90 to the diaphragm 42a includes the heat receiving portion 90, the diaphragm 42a, and a portion which connects the heat receiving portion 90 to the diaphragm 42a. The portion which connects the heat receiving portion 90 to the diaphragm 42a includes a portion of the rod 44c from a portion connected to the fixing portion 41a to a portion connected to the heat receiving portion 90, and the fixing portion 41a. In the fourth embodiment, the cross-section on which the area of the minimum inclusion region is the smallest, among the cross-sections perpendicular to the axial line CL at the axial positions from the heat receiving portion 90 to the diaphragm 42a, is a cross-section passing through a portion of the small-diameter portion 48 at which the outer diameter of the small-diameter portion 48 is the smallest. The connection area Sn, that is, the minimum area of the minimum inclusion region, is the area of the minimum inclusion region on the cross-section of the minimum outer diameter portion of the small-diameter portion 48 of the rod 44c (not shown). When the connection area Sn is small as described above, deformation of the heat receiving portion 90 is unlikely to be transmitted to the diaphragm 42a, so that an error of a signal from the element portion 50 reduces.

The heat receiving area Sn2, the effective area Sd, and the minimum distance d are calculated similarly to the second embodiment in FIG. 8. Also in the fourth embodiment, a favorable pressure error Ep is inferred to be able to be achieved by adopting a configuration in which the thickness t of the heat receiving portion 90, the angle θ of the heat receiving portion 90, and one or more types of parameters selected arbitrarily from the ratio Sn2/Sd, the ratio Sn/Sd, and the minimum distance d are within the above preferable ranges of the respective parameters.

For example, also in the fourth embodiment, similarly to the first to third embodiments, preferably, the thickness t of the heat receiving portion 90 is not less than 0.21 mm (t≥0.21 mm) and the ratio (Sn/Sd) is not greater than 0.25 ((Sn/Sd)≤0.25). If so, the pressure error Ep can be sufficiently reduced.

The small-diameter portion 48 may be omitted. In this case, the connection area Sn is the area of the minimum inclusion region including the cross-section of a portion of the rod 44c between the rear side surface of the heat receiving portion 90 and the front end of the fixing portion 41a.

In the fourth embodiment, the rear side surface 90f of the heat receiving portion 90 is perpendicular to the axial line CL. Therefore, the angle θ formed between the rear side surface 90f of the heat receiving portion 90 and the direction perpendicular to the axial line CL is 0.

F. Fifth Embodiment

F1. Configuration of Pressure Sensor 10d

Figure 14:
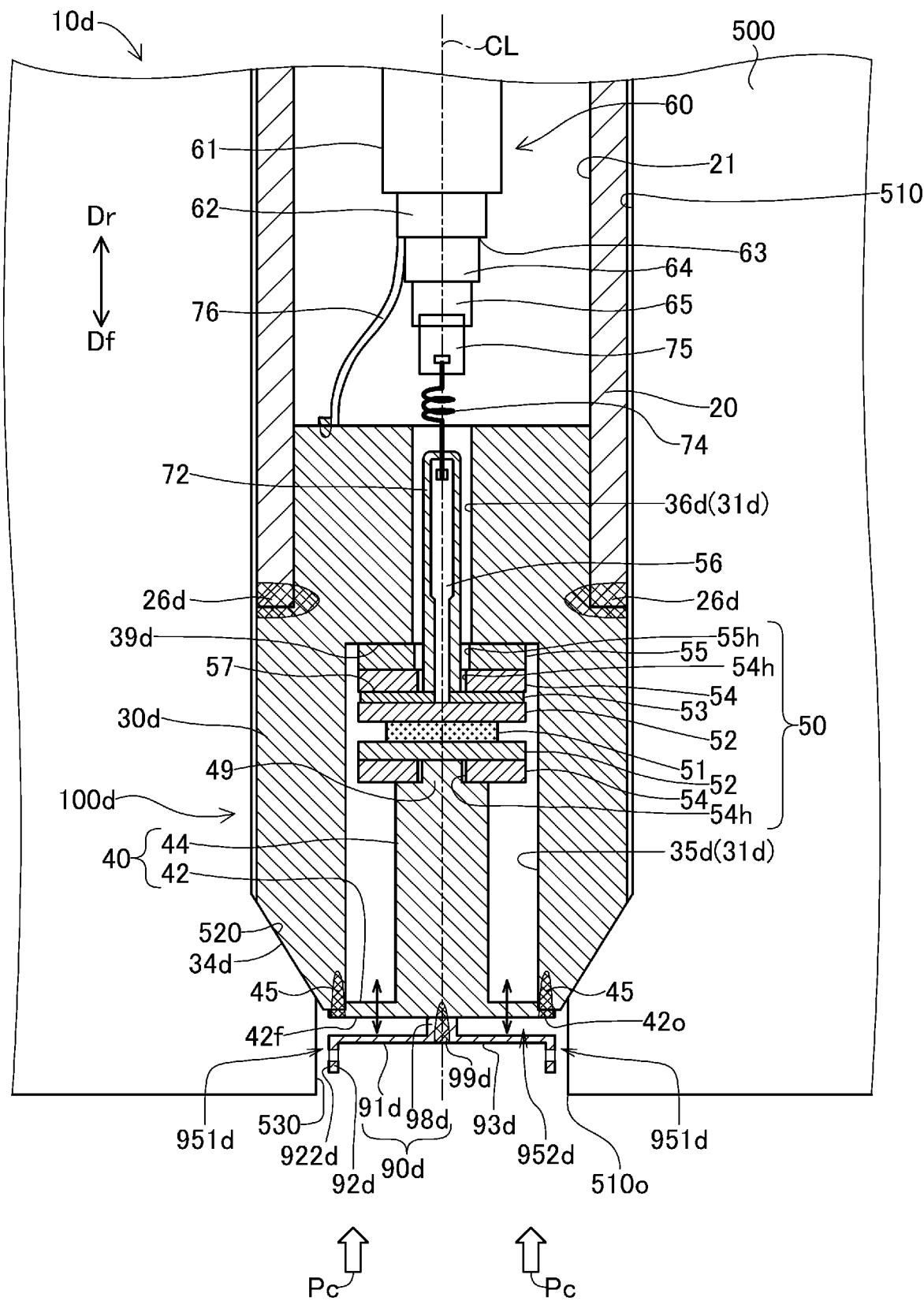
FIG. 14 Cross-sectional view showing, in an enlarged manner, a front end portion of a pressure sensor 10d of a fifth embodiment.

FIG. 14 is an explanatory diagram of a pressure sensor 10d of a fifth embodiment. The cross-section thereof is a plane cross-section including the axial line CL. In the pressure sensor 10d, a member composed of the second metal shell 80, the third metal shell 35, and the cap screw 32 in the pressure sensor 10 in FIG. 1 is formed by one front end metal shell 30d. The front end metal shell 30d is disposed at the front side of the first metal shell 20 and joined to the front end of the first metal shell 20 via a joint portion 26d. The joint portion 26d is a portion where the first metal shell 20 and the front end metal shell 30d are melted during welding (e.g., laser welding) thereof. A diameter-enlarged portion 34d is formed at a front end portion of the front end metal shell 30d so as to be enlarged in diameter from the front side toward the rear side. When the pressure sensor 10d is mounted on an internal combustion engine, the diameter-enlarged portion 34d is in close contact with a sealing surface 520 of a mounting hole 510 in a cylinder head 500 of the internal combustion engine. In addition, the front end metal shell 30d has an axial hole 31d formed as a through hole having a center on the central axis CL. The axial hole 31d includes a large inner diameter portion 35d and a small inner diameter portion 36d which is connected to the rear side of the large inner diameter portion 35d and has an inner diameter smaller than the inner diameter of the large inner diameter portion 35d. A step portion 39d is provided between the large inner diameter portion 35d and the small inner diameter portion 36d. The step portion 39d forms a surface which faces to the front end direction Df side. Within the axial hole 31d, a pressure receiving portion 40 and an element portion 50 which are the same as the pressure receiving portion 40 and the element portion 50 in FIG. 1 are disposed in order from the front side toward the rear side. The pressure receiving portion 40 is welded to the front end portion of the front end metal shell 30d (e.g., by means of laser welding) and closes the axial hole 31d at the front end of the front end metal shell 30d.

The configurations of the first metal shell 20, the pressure receiving portion 40, the element portion 50, the cable 60, etc. are the same as in the pressure sensor 10 in FIG. 2. Thus, in FIG. 14, the corresponding components are designated by the same reference numerals as in FIG. 2, and the detailed description thereof is omitted. The entireties of the rod 44 and the front side presser plate 54 and the front side electrode 52 of the element portion 50 form a connection portion 100d which connects the diaphragm 42 to the piezoelectric element 51.

Figure 15:
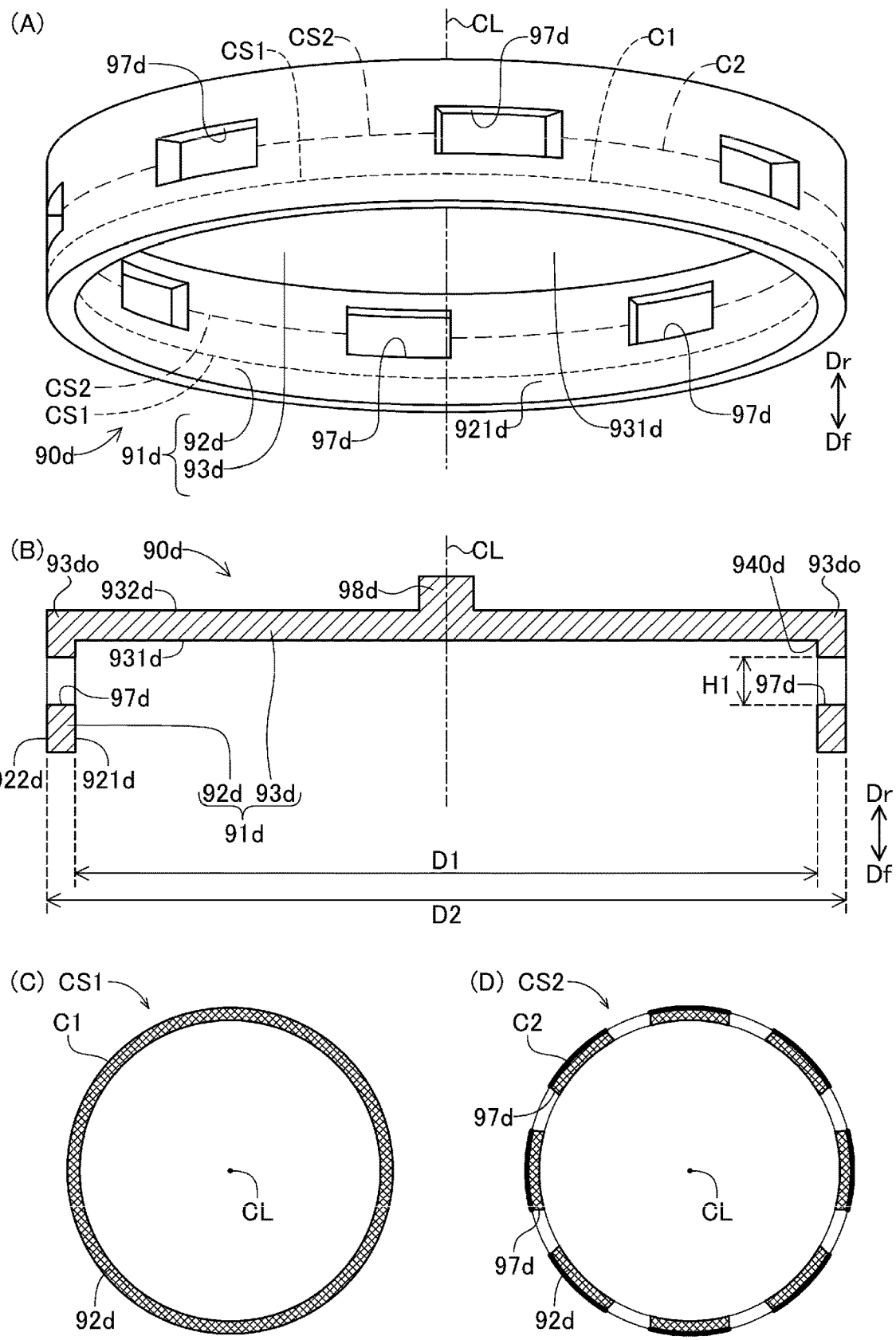
FIG. 15 Explanatory diagrams of a heat receiving portion 90d of the fifth embodiment.

A heat receiving portion 90d is joined to the front side surface of the diaphragm 42 (e.g., by means of laser welding). FIG. 15 shows explanatory diagrams of the heat receiving portion 90d. FIG. 15(A) shows a perspective view of the heat receiving portion 90d, and FIG. 15(B) shows a plane cross-section, including the axial line CL, of the heat receiving portion 90d. The heat receiving portion 90d includes: a disc-shaped plate portion 93d having a center on the axial line CL; a cylindrical side wall portion 92d which projects from an edge 93do, at the outer peripheral side, of the plate portion 93d toward the front end direction Df side; and a columnar leg portion 98d which projects from a central portion of the plate portion 93d toward the rear end direction Dr side. Hereinafter, the entireties of the side wall portion 92d and the plate portion 93d are also referred to as "main portion 91d". The outer diameter of the leg portion 98d is smaller than the outer diameter of the main portion 91d.

The side wall portion 92d is formed over the entirety of the edge 93do of the plate portion 93d. The side wall portion 92d has a plurality of through holes 97d formed so as to be aligned along the edge 93do of the plate portion 93d (i.e., aligned along the circumferential direction thereof). In the present embodiment, each through hole 97d is a substantially rectangular hole surrounded by two inner surfaces perpendicular to the axial line CL and two inner surfaces parallel to the axial line CL.

A size H1 in FIG. 15(B) is the axial size of the through hole 97d and is the maximum value of the lengths (i.e., the sizes), in the direction parallel to the axial line CL, of the plurality of through holes 97d. The axial size of one through hole 97d is the maximum value of the length of a line segment connecting two points on the inner surface of the one through hole 97d when a straight line parallel to the axial line CL passes through the two points. The size H1 is the maximum value of the axial size of each of the plurality of through holes 97d. In the embodiment in FIG. 15(B), the through holes 97d extend along the radial direction. Therefore, the size H1 is the same as the length of each through hole 97d in the direction parallel to the axial line CL.

FIG. 15(C) and FIG. 15(D) show cross-sections, perpendicular to the axial line CL, of the side wall portion 92d. FIG. 15(C) shows a first cross-section CS1 which does not pass through the plurality of through holes 97d, and FIG. 15(D) shows a second cross-section CS2 which passes through the plurality of through holes 97d.

An outer peripheral length C1 shown in FIG. 15(C) is the length of the outer periphery of the side wall portion 92d on the first cross-section CS1. In the present embodiment, the shape of the side wall portion 92d is substantially a cylinder extending along the axial line CL. Thus, the outer peripheral length C1 is equal to the circumference of a circle calculated from an outer diameter D2 of the heat receiving portion 90d.

A wall length C2 shown in FIG. 15(D) is the sum of the lengths of portions corresponding to the outer peripheral surface of the side wall portion 92d on the second cross-section CS2. In FIG. 15(D), the wall length C2 is the sum of the lengths of portions shown by thick lines. The wall length C2 is a remainder obtained by subtracting the circumferential lengths of the through holes 97$d$ from the outer peripheral length C1. In the fifth embodiment, the plurality of through holes 97$d$ are arranged so as to be distributed evenly along the circumferential direction.

The side wall portion 92$d$, the plate portion 93$d$, and the leg portion 98$d$ are integrally formed from stainless steel (e.g., by means of forging or machining). After two portions of the side wall portion 92$d$, the plate portion 93$d$, and the leg portion 98$d$ or these three portions are separately formed, these portions may be integrated with each other by means of welding or the like. In addition, another material (e.g., steel such as low-carbon steel and various metallic materials) may be adopted.

As shown in FIG. 14, the heat receiving portion 90$d$ is joined to the diaphragm 42 (further the pressure receiving portion 40) via a joint portion 99$d$. The joint portion 99$d$ is a portion where the heat receiving portion 90$d$ and the diaphragm 42 (further the pressure receiving portion 40) are melted during welding (e.g., laser welding) thereof. The joint portion 99$d$ is formed at a central portion of the heat receiving portion 90$d$.

In addition, as shown, the heat receiving portion 90$d$ is disposed within the mounting hole 510 of the cylinder head 500. Specifically, the heat receiving portion 90$d$ is located within a portion 530, at the front end direction Df side, of the mounting hole 510 (also referred to as "front end portion 530"). An outer peripheral surface 922$d$ of the side wall portion 92$d$ opposes the inner peripheral surface of the front end portion 530 of the mounting hole 510.

The element portion 50 includes the two electrodes 52, the piezoelectric element 51 interposed between the two electrodes 52, the presser plate 54 disposed at the front side of the front side electrode 52, and the lead portion 53, the presser plate 54, and the insulating plate 55 which are aligned in order from the rear side electrode 52 toward the rear end direction Dr. As shown in FIG. 14, the presser plate 54, the electrode 52, the piezoelectric element 51, the electrode 52, the lead portion 53, the presser plate 54, and the insulating plate 55 are stacked in this order from the front side toward the rear side. The rear side surface of the insulating plate 55 is supported by the step portion 39$d$ of the front end metal shell 30$d$. The rear end portion 49 of the rod 44 is in contact with the front side surface of the front side presser plate 54. As described later, the presser plate 54 has a through hole 54$h$ having a center on the axial line CL. The rear end portion 49 of the rod 44 has a projection inserted into the through hole 54$h$. The rear end surface of the projection is in contact with the front side surface of the front side electrode 52. The piezoelectric element 51 is connected to the rod 44 via the front side electrode 52 and the front side presser plate 54. The entireties of the rod 44, the front side presser plate 54, and the front side electrode 52 form the connection portion 100$d$ which connects the diaphragm 42 to the piezoelectric element 51.

In producing the pressure sensor 10$d$, the element portion 50 is inserted into the axial hole 31$d$ (specifically, the large inner diameter portion 35$d$) from the front side of the front end metal shell 30$d$. The terminal portion 56 of the lead portion 53 of the element portion 50 is integrated with the small-diameter conductor 74 and the heat-shrinkable tube 72 in advance. Then, the small-diameter conductor 74 is inserted from the front side of the small inner diameter portion 36$d$ of the front end metal shell 30$d$ and pulled out from the rear side of the small inner diameter portion 36$d$.

Furthermore, the pressure receiving portion 40 is placed at the front side of the element portion 50. Then, the edge 42$o$ of the diaphragm 42 and the front end metal shell 30$d$ are welded to each other to form the joint portion 45. The length of the rod 44 is determined in advance such that an appropriate preload is to be applied to the element portion 50. Thereafter, the heat receiving portion 90$d$ is welded to the diaphragm 42 to form the joint portion 99$d$.

Then, the rear end of the small-diameter conductor 74 pulled out from the rear side of the front end metal shell 30$d$ (specifically, the small inner diameter portion 36$d$), and the front end of the internal conductor 65 are welded to the plate conductor 75. In addition, the front end portion of the grounding conductor 76 and a rear end portion of the front end metal shell 30$d$ are welded to each other. Furthermore, the cable 60 is passed into the axial hole 21 of the first metal shell 20, and the front end of the first metal shell 20 and the rear end of the front end metal shell 30$d$ are welded to each other to form the joint portion 26$d$. Thereafter, a molten rubber is injected into the axial hole 21 of the first metal shell 20 to fill the axial hole 21 with a rubber layer (not shown), whereby the pressure sensor 10$d$ is completed. By forming the rubber layer, the waterproofness of the inside of the pressure sensor 10$d$ is improved, and the vibration-damping properties thereof are also enhanced. Instead of the molten rubber, a molten resin may be injected into the axial hole 21.

In the fifth embodiment shown in FIG. 14, thermal expansion of the diaphragm 42 is inhibited by the heat receiving portion 90$d$. Therefore, in the fifth embodiment, an error of a signal from the element portion 50 can be reduced as compared to the reference example in FIG. 5.

F2. Through Holes 97$d$ of Side Wall Portion 92$d$

F2-1. Simulation

Figure 16:
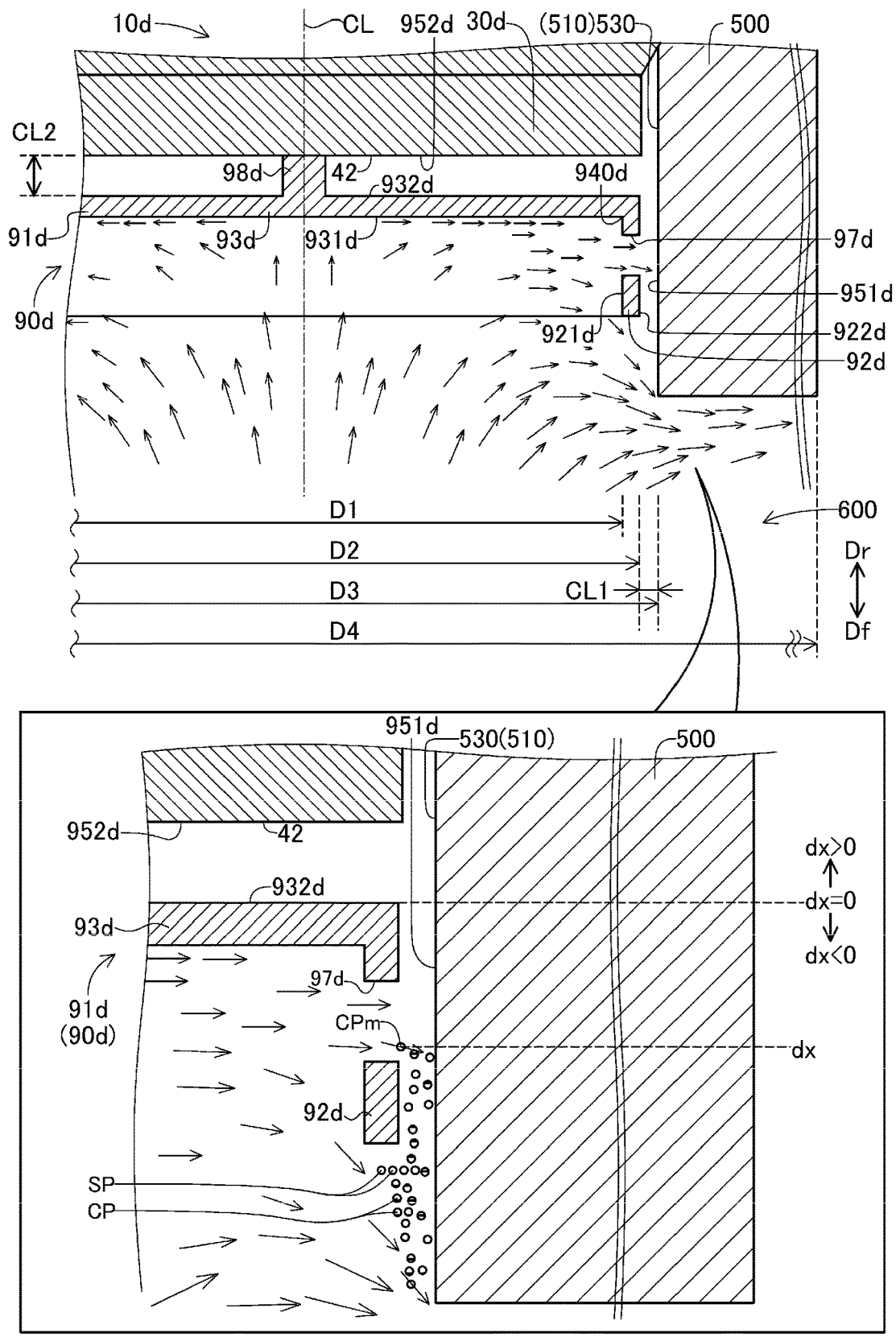
FIG. 16 Schematic diagrams of a model used in a simulation of the fifth embodiment.
Figure 17:
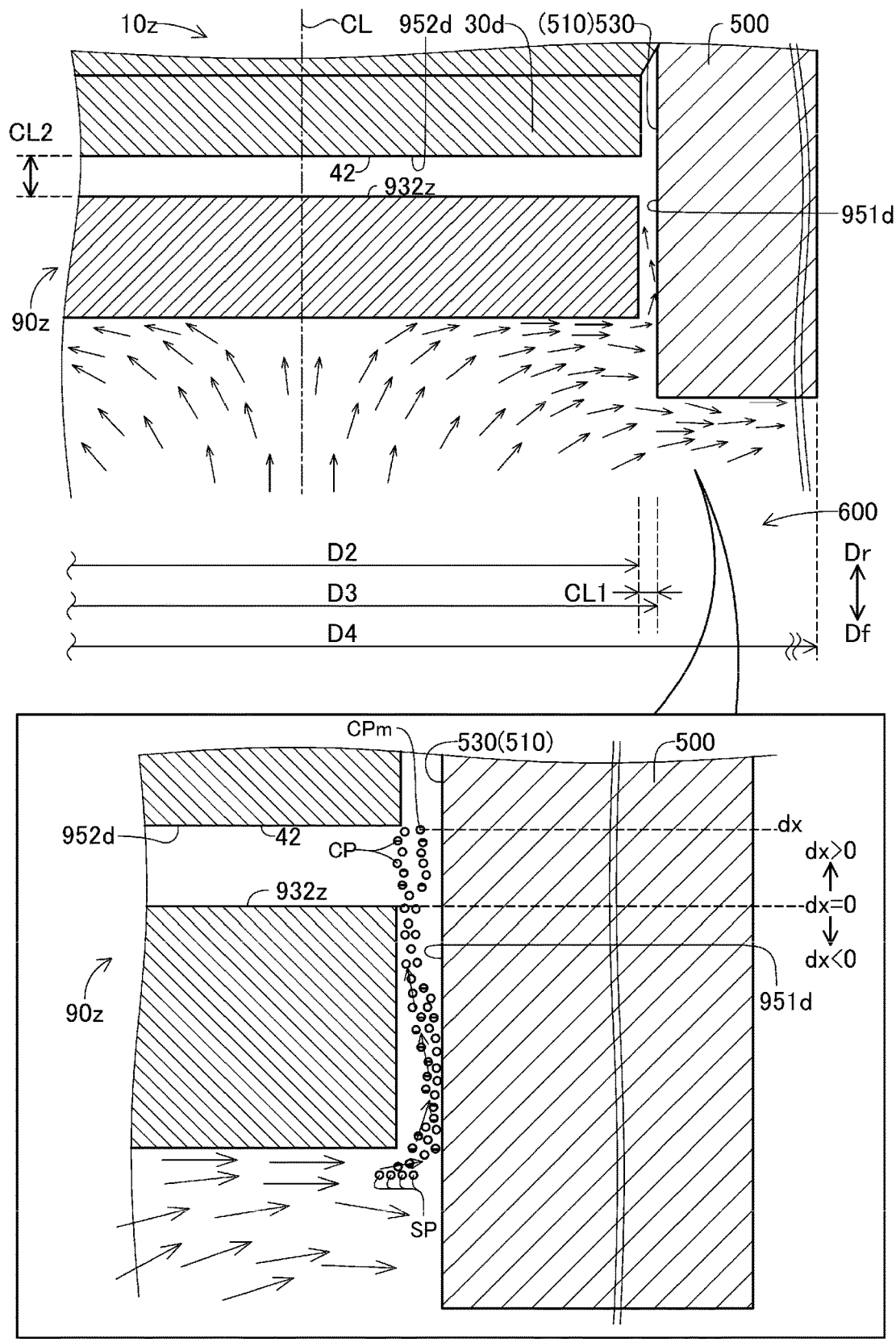
FIG. 17 Schematic diagrams of a model used in the simulation of the fifth embodiment.

A simulation is performed for considering a relationship between the through holes 97$d$ of the side wall portion 92$d$ of the heat receiving portion 90$d$ and flow of gas. FIG. 16 and FIG. 17 are schematic diagrams of models used in the simulation. FIG. 16 shows a model of the pressure sensor 10$d$ of the fifth embodiment, and FIG. 17 shows a model of a pressure sensor 10$z$ of a reference example. Each drawing shows a portion of a plane cross-section including the axial line CL. The plane cross-section of FIG. 16 shows a plane cross-section which passes through the through holes 97$d$. Small arrows in the drawing indicate a direction in which the gas flows. The flow of the gas shown indicates the results of the simulation by a finite element method. In the drawing, a direction in which the gas flows in a gap 952$d$ between the heat receiving portion 90$d$ and the diaphragm 42 is not shown.

FIG. 16 shows a plane cross-section, including the axial line CL, a portion of each of the front end portion 530 of the mounting hole 510 of the cylinder head 500 and the front end metal shell 30$d$, the diaphragm 42, and the heat receiving portion 90$d$ of the pressure sensor 10$d$. The diaphragm 42 and the front end metal shell 30$d$ are simplified into one filled member. In the simulation, each dimension shown is set to the following value.

Inner diameter D1 of side wall portion 92$d$=7.85 mm
Outer diameter D2 of side wall portion 92$d$=8.45 mm
Inner diameter D3 of front end portion 530 of mounting hole 510=9 mm
Outer diameter D4 of cylinder head 500=20 mm
First clearance CL1=0.275 mm
Second clearance CL2=0.5 mm The first clearance CL1 is the distance of a gap 951$d$ between the side wall portion 92$d$ of the heat receiving portion 90$d$ and the front end portion 530 in the radial direction. The second clearance CL2 is the distance of the gap 952d between the plate portion 93d of the heat receiving portion 90d and the diaphragm 42 in the direction parallel to the axial line CL.

In the pressure sensor 10z of the reference example shown in FIG. 17, the heat receiving portion 90d in FIG. 16 is replaced with a heat receiving portion 90z of the reference example. The configuration of the other portion of the model of the reference example is the same as the configuration of the corresponding portion of the model of the embodiment in FIG. 16. The heat receiving portion 90z is a disc-shaped plate portion having a center on the axial line CL and is different from the heat receiving portion 90d in that the side wall portion 92d is not included. An outer diameter D2 of the heat receiving portion 90z is equal to the outer diameter D2 of the heat receiving portion 90d in FIG. 16. The thickness of the heat receiving portion 90z in the direction parallel to the axial line CL is equal to the thickness of the main portion 91d in FIG. 16.

In the respective models in FIG. 16 and FIG. 17, the above parameters D2, D3, D4, CL1, and CL2 are common. The front side of the cylinder head 500 is assumed to be a combustion chamber 600. The combustion chamber 600 and gaps between the respective members 500, 90d, 90z, 42, and 30d are assumed to be filled with standard air. No gas is assumed to move so as to pass by the outer surfaces of the respective members 500, 90d, 90z, 42, and 30d. A pressure of up to 16 MPa is applied from the combustion chamber 600 toward the rear end direction Dr. Change of air flow with time due to the application of the pressure is simulated.

As shown in FIG. 16, in the model of the embodiment, the gas flows from the combustion chamber 600 toward the rear end direction Dr. Then, near the heat receiving portion 90d, the direction of the gas flow changes to the radially outer side. In particular, in the model of the embodiment, at the inner peripheral side of the side wall portion 92d, the gas flows along a surface 931d, at the front end direction Df side, of the plate portion 93d toward the radially outer side. Then, the gas flows out from the through hole 97d to the gap 951d between the side wall portion 92d and the cylinder head 500.

Meanwhile, within a combustion chamber, carbon can occur as a result of combustion of fuel. By such carbon flowing into a gap between a member for heat reception and a diaphragm, a problem occurs in some cases. For example, carbon adheres to the diaphragm to change the characteristics of the diaphragm in some cases.

The lower part of FIG. 16 shows an enlarged view of the vicinity of the gap 951d. Positions CP in the drawing indicate an example of positions through which carbon particles pass (hereinafter, carbon particles are also referred to merely as "particles"). Positions SP indicate start positions of carbon particles. In the simulation, carbon particles are placed onto four start positions SP. The particles placed at the start positions SP move to other positions by the gas flow. In the simulation, placement of particles onto the start positions SP is repeated a plurality of times, and change of the position of each particle with time is calculated. In the simulation, the particle size of each carbon particle is set to $1 \times 10^{-9}$ m, and the density of each carbon particle is set to 2 kg/m³.

Specifically, the four start positions SP are located near an end portion, at the front end direction Df side, of the side wall portion 92d of the heat receiving portion 90d. The four start positions SP are aligned along the radial direction at an interval of 0.1 mm. The two start positions SP at the inner peripheral side are located at the front end direction Df side of the side wall portion 92d, and the two start positions SP at the outer peripheral side are located at the front end direction Df side of the gap 951d. These four start positions SP are located within the front end portion 530 of the mounting hole 510 of the cylinder head 500. In the simulation, 100 particles are evenly distributed and placed onto such four start positions SP within 0.1 ms from start of the application of the pressure (in the present simulation, one particle is placed every 0.001 ms). The 100 particles are evenly distributed and placed onto the four start positions SP.

A deepest position CPm in the drawing is the position closest to the rear end direction Dr side, among a plurality of positions through which the particles pass. An inflow distance dx is the distance in the direction parallel to the axial line CL from a surface 932d, at the rear end direction Dr side, of the plate portion 93d of the heat receiving portion 90d to the deepest position CPm, and indicates the inflow distance of the carbon particles. The "dx=0" indicates that the deepest position CPm of the carbon particles is the same as the position of the surface 932d; "dx>0" indicates that the deepest position CPm of the carbon particles is a position at the rear end direction Dr side with respect to the surface 932d; and "dx<0" indicates that the deepest position CPm of the carbon particles is a position at the front end direction Df side with respect to the surface 932d.

As shown in FIG. 16, in the model of the embodiment, the gas flows out from the through hole 97d to the gap 951d. The gas flowing out from the through hole 97d to the gap 951d serves as an air curtain for inhibiting the carbon particles from passing through the gap 951d. In this manner, by the gas flowing in the through hole 97d, the carbon particles are inhibited from flowing through the gap 951d to the gap 952d.

As shown in FIG. 17, in the model of the reference example, the gas flows from the combustion chamber 600 toward the rear end direction Dr. Then, near the heat receiving portion 90z, the direction of the gas flow changes to the radially outer side. Unlike the model of the embodiment in FIG. 16, the gas flows in the gap 951d between the outer peripheral surface of the heat receiving portion 90z and the cylinder head 500 toward the rear end direction Dr side.

The lower part of FIG. 17 shows an enlarged view of the vicinity of the gap 951d. Also in the simulation of the reference example, carbon particles are placed onto four start positions SP under the same condition as in the simulation of the embodiment in FIG. 16. Unlike the model in FIG. 16, in the model of the reference example, the carbon particles move from the start positions SP through the gap 951d to reach the gap 952d between the heat receiving portion 90z and the diaphragm 42. The deepest position CPm is located at the rear end direction Dr side with respect to a surface 932z, at the rear end direction Dr side, of the heat receiving portion 90z (dx>0). The shape and the position of the surface 932z of the heat receiving portion 90z are the same as the shape and the position of the surface 932d, at the rear end direction Dr side, of the plate portion 93d in FIG. 16, respectively. The inflow distance dx indicates the inflow distance of the carbon particles based on the surface 932z.

Generally, when the carbon particles reach the gap 952d, an error of a signal from the element portion 50 can be large. Specifically, the carbon particles having reached the gap 952d can adhere to the diaphragm 42. When the carbon particles adhere to the diaphragm 42, the physical characteristics of the diaphragm 42 can change. For example, similarly to the case where the thickness of the diaphragm 42 increases, the amount of deformation of the diaphragm 42 in response to the pressure within the combustion chamber can be small. As a result, an error of a signal from the element portion 50 can be large.

Figure 18:
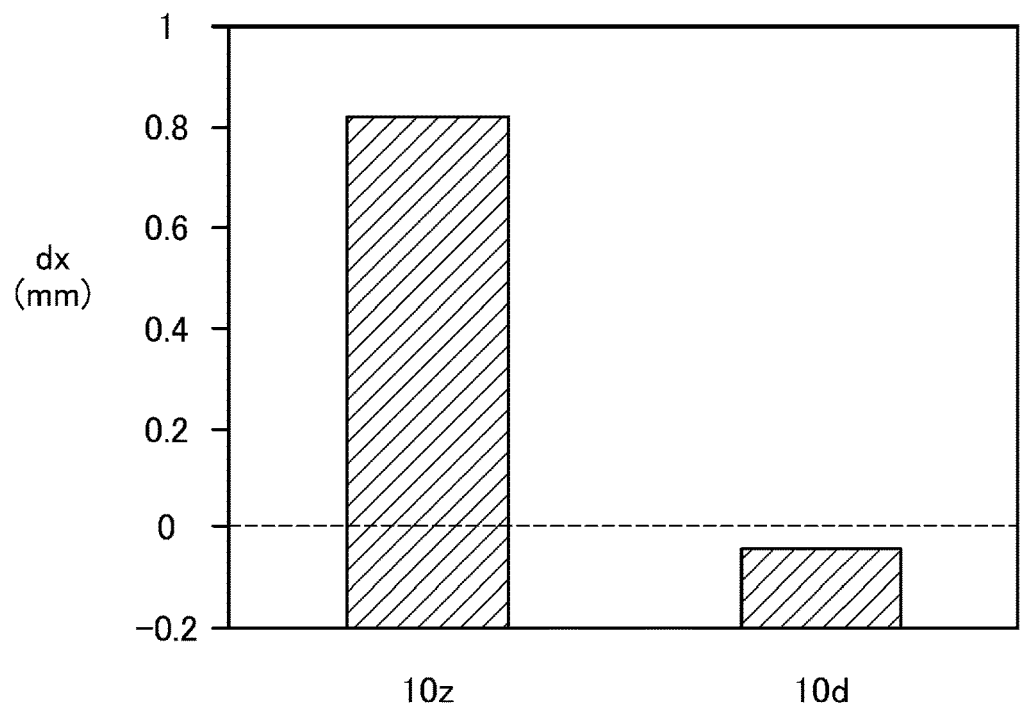
FIG. 18 Graph showing the simulation results of the fifth embodiment.

For inhibiting an error of a signal from the element portion 50, the carbon particles preferably do not reach the gap 952d. For example, the inflow distance dx in FIG. 16 and FIG. 17 is preferably not greater than zero. FIG. 18 is a graph showing the simulation results of the inflow distance dx of each of the pressure sensor 10d of the embodiment in FIG. 16 and the pressure sensor 10z of the reference example in FIG. 17. As shown, the inflow distance dx of the pressure sensor 10d of the embodiment is less than zero. On the other hand, the inflow distance dx of the pressure sensor 10z of the reference example is greater than zero. As described above, since the heat receiving portion 90d includes the plate portion 93d and the side wall portion 92d which projects from the edge of the plate portion 93d toward the front end direction Df side, and the plurality of through holes 97d are formed in the side wall portion 92d so as to be aligned along the edge of the plate portion 93d, carbon can be inhibited from flowing into the rear end direction Dr side of the heat receiving portion 90d (the gap 952d between the heat receiving portion 90d and the diaphragm 42).

F2-2. Size H1 and Ratio C2/C1

Figure 19:
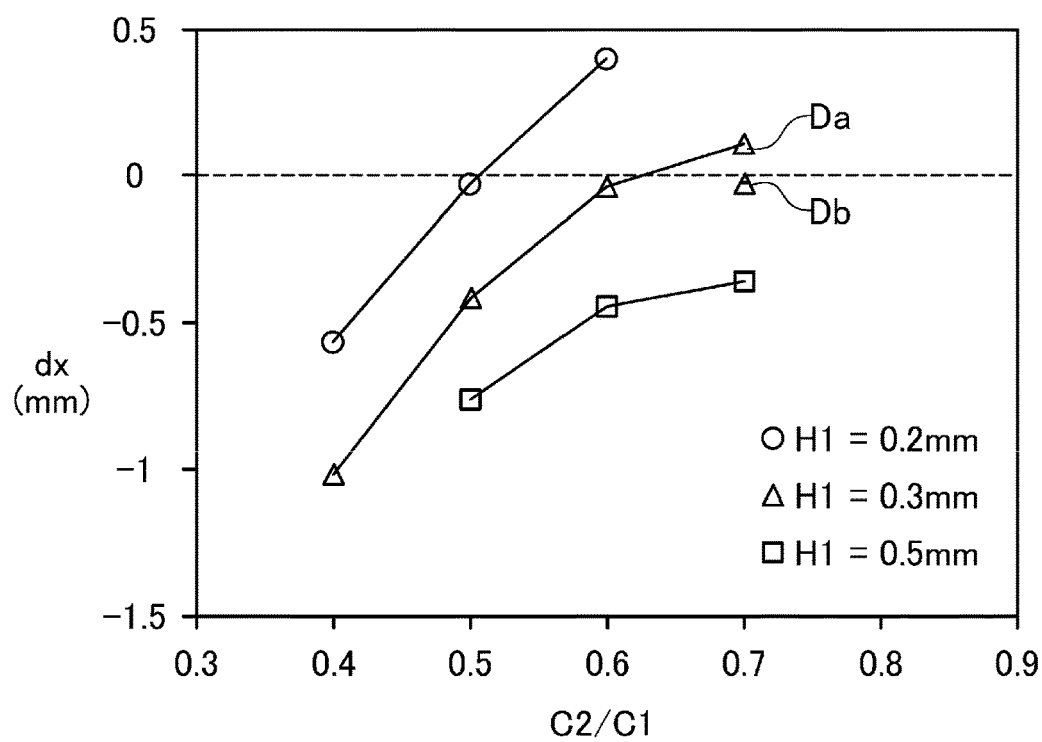
FIG. 19 Graph showing inflow distances dx of a plurality of models of the fifth embodiment.

FIG. 19 is a graph showing inflow distances dx of a plurality of models having different combinations of a ratio of the wall length C2 relative to the outer peripheral length C1 and the size H1 of each through hole 97d. The horizontal axis indicates the ratio (C2/C1), and the vertical axis indicates the inflow distance dx. One data point indicates the simulation result of one type of model. The size H1 is any of 0.2 mm, 0.3 mm, and 0.5 mm. The ratio C2/C1 is any of 0.4, 0.5, 0.6, and 0.7. The ratio C2/C1 is adjusted by adjusting the wall length C2 (i.e., the circumferential length of each through hole 97d. The respective values of the parameters D1, D2, D3, D4, CL1, and CL2 (FIG. 16) are equal to the values in the model described with reference to FIG. 16. In the model of the pressure sensor 10 in FIG. 18, the size H1 is 0.3 mm, and the ratio C2/C1 is 0.6.

As shown in FIG. 19, when the size H1 is the same, the inflow distance dx decreases as the ratio C2/C1 decreases. The reason is inferred as follows. As the ratio C2/C1 decreases, the circumferential length of each through hole 97d increases. As described above, in the gap 951d at the outer peripheral side of the side wall portion 92d, inflow of a carbon is inhibited near the through hole 97d by the gas flowing out from the through hole 97d. Therefore, as the ratio C2/C1 decreases, it is more difficult for the carbon particles to move through the gap 951d to reach the gap 952d.

In addition, when the ratio C2/C1 is the same, the inflow distance dx decreases as the size H1 increases. The reason is inferred as follows. As the size H1 increases, each through hole 97d becomes larger, so that the amount of the gas flowing from the through hole 97d to the gap 951d per unit time increases. Due to the increase in the amount of the gas, inflow of carbon is inhibited. Therefore, as the size H1 increases, it is more difficult for the carbon particles to move through the gap 951d to reach the gap 952d.

As shown in the graph of FIG. 19, the combinations of the size H1 and the ratio C2/C1 that achieve an inflow distance dx of not greater than zero are as follows.

H1=0.2 mm: C2/C1=0.4, 0.5
H1=0.3 mm: C2/C1=0.4, 0.5, 0.6
H1=0.5 mm: C2/C1=0.5, 0.6, 0.7

A preferable range of the size H1 and the ratio C2/C1 may be determined by using the above 8 types of models. For example, a range in which the size H1 is not less than 0.3 mm and the ratio C2/C1 is not greater than 0.6 may be adopted. In addition, a range in which the size H1 is not less than 0.2 mm and the ratio C2/C1 is not greater than 0.5 may be adopted. Moreover, a range in which the size H1 is not less than 0.5 mm and the ratio C2/C1 is not greater than 0.7 may be adopted.

In any of the cases, as the size H1 increases, the amount of the gas flowing from the through hole 97d into the gap 951d can be increased. Thus, as the size H1 increases, the carbon particles are further inhibited from flowing through the gap 951d into the gap 952d. Therefore, as the upper limit of the size H1, an arbitrary value less than the length of the side wall portion 92d of the heat receiving portion 90d in the direction parallel to the axial line CL is inferred to be adoptable.

As the ratio C2/C1 decreases, a portion of the gap 951d through which the carbon particles easily pass (i.e., a portion where there is no through hole 97d) becomes smaller. Thus, as the ratio C2/C1 decreases, the carbon particles are further inhibited from flowing through the gap 951d into the gap 952d. Therefore, as the lower limit of the ratio C2/C1, various values greater than zero are adoptable. Generally, as the ratio C2/C1 decreases, the strength of the side wall portion 92d decreases. Thus, as the lower limit of the ratio C2/C1, a value with which practical strength of the side wall portion 92d can be achieved is preferably adopted.

The preferable range of the size H1 and the ratio C2/C1 is not limited to the configurations of the above models, and is inferred to be applicable to other various configurations. For example, the values of the parameters, such as the inner diameter D1 and the outer diameter D2 of the heat receiving portion 90d, the inner diameter D3 of the front end portion 530 of the mounting hole 510, and the first clearance CL1, may be different from the values in the above model. In this case as well, when the size H1 and the ratio C2/C1 are within the above preferable range, the inflow distance dx is inferred to be able to be decreased as compared to the case where the size H1 and the ratio C2/C1 are out of the preferable range.

F2-3. Connection Portion Between Side Wall Portion 92d and Plate Portion 93d

Figure 20:
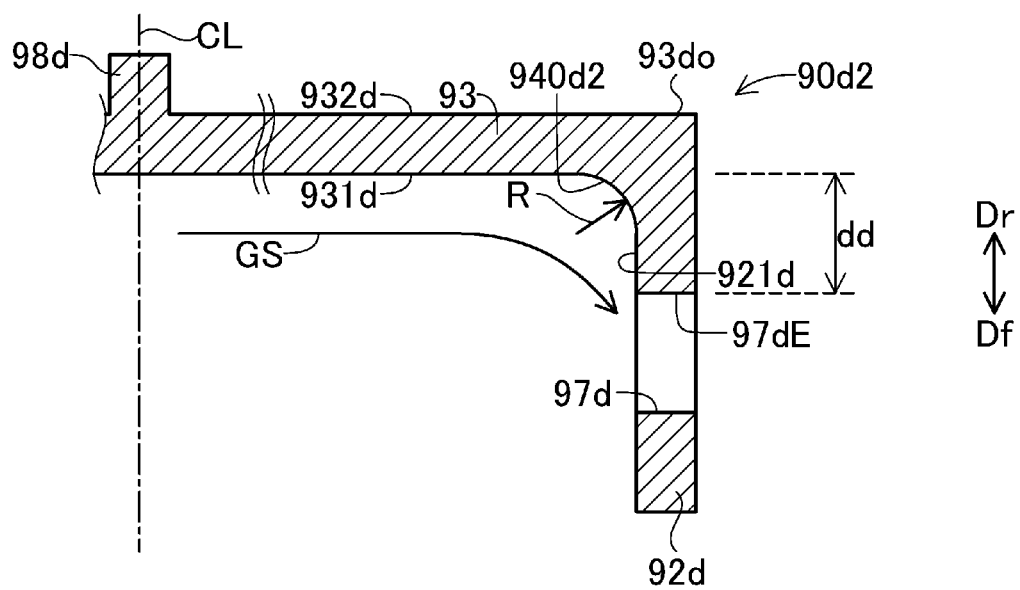
FIG. 20 Explanatory diagram of a heat receiving portion of a sixth embodiment.

FIG. 20 is an explanatory diagram of a heat receiving portion of a sixth embodiment. The drawing shows a portion of a plane cross-section, including the axial line CL, of a heat receiving portion 90d2. The only difference from the heat receiving portion 90d of the fifth embodiment shown in FIG. 15 is that a connection portion 940d2 between a surface 921d, at the inner peripheral side, of the side wall portion 92d and the surface 931d, at the front end direction Df side, of the plate portion 93d is rounded (in the embodiment in FIG. 15, a connection portion 940d between the surface 921d, at the inner peripheral side, of the side wall portion 92d and the surface 931d, at the front end direction Df side, of the plate portion 93d form a right-angle corner). The configuration of the other portion of the heat receiving portion 90d2 is the same as the configuration of the corresponding portion of the heat receiving portion 90d in FIG. 15.

A radius R in the drawing is the radius of a circular arc forming the connection portion 940d2 between the surfaces 921d and 931d (i.e., a corner 940d2 at the inner peripheral side) on the plane cross-section including the axial line CL. The rounded corner 940d2 can smoothly guide gas GS flowing along the surface 931d, at the front end direction Df side, of the plate portion 93d toward the radially outer side, to the through hole 97d. In this manner, the rounded corner 940d2 can inhibit a decrease in the flow rate of the gas flowing out from the through hole 97d to the outer peripheral side.

A data point Db in the graph of FIG. 19 shows the simulation result of a model using the heat receiving portion 90d2 in FIG. 20. This model is obtained by replacing the connection portion 940d (FIG. 16) in the model of the fifth embodiment having H1=0.3 mm and C2/C1=0.7, with the rounded connection portion 940d2 (FIG. 20). The inflow distance dx is small as compared to a data point Da of the model of the first embodiment. As described above, the rounded connection portion 940d2 can inhibit inflow of the carbon particles as compared to the right-angle connection portion 940d. The reason is inferred to be that a decrease in the flow rate of the gas flowing out from the through hole 97d to the outer peripheral side can be inhibited.

The rounded connection portion 940d2 can smoothly guide the gas flowing along the surface 931d, at the front end direction Df side, of the plate portion 93d toward the radially outer side, to the through hole 97d, regardless of the configuration of each portion of the heat receiving portion such as the values of the parameters D1, D2, D3, D4, CL1, CL2, C1, and C2 (FIG. 15 and FIG. 16). Therefore, inflow of the carbon particles is inferred to be able to be inhibited by using the rounded connection portion 940d2, regardless of the configuration of each portion of the heat receiving portion. In any of the cases, the effect of inhibiting inflow of the carbon particles is inferred to be enhanced as the radius R increases. For example, the radius R of the rounded connection portion is preferably not less than 0.2 mm. As the upper limit of the radius R, various values are adoptable. For example, a value which is not greater than a distance dd between an edge 97dE, at the rear end direction Dr side, of the through hole 97d of the side wall portion 92d (FIG. 20) and the surface 931d, at the front end direction Df side, of the plate portion 93d in the direction parallel to the axial line CL, may be adopted.

F2-4. Direction of Through Holes 97d

Figure 21:
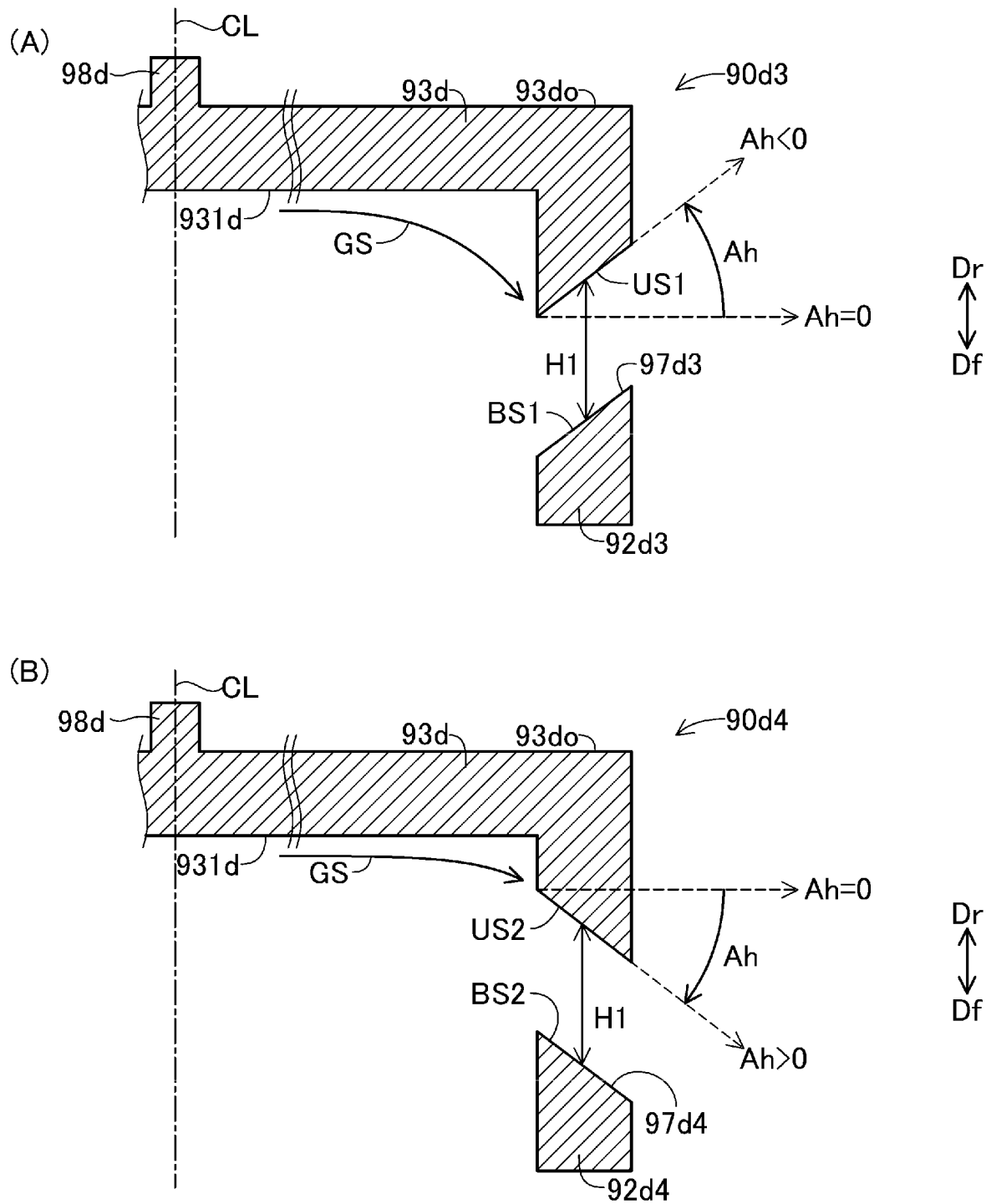
FIG. 21 Explanatory diagrams of heat receiving portions of seventh and eighth embodiments.

FIG. 21 shows explanatory diagrams of other embodiments of the heat receiving portion which are seventh and eighth embodiments. FIG. 21(A) and FIG. 21(B) show portions of plane cross-sections, of heat receiving portions 90d3 and 90d4, which include the axial line CL and pass through through holes 97d3 and 97d4. An angle Ah in each drawing indicates the angle of a direction from the inner peripheral side toward the outer peripheral side relative to the direction perpendicular to the axial line CL. "Ah=0" indicates the direction perpendicular to the axial line CL. "Ah<0" indicates an oblique direction toward the rear end direction Dr (FIG. 21(A)). "Ah>0" indicates an oblique direction toward the front end direction Df (FIG. 21(B)).

In the seventh embodiment in FIG. 21(A), the through hole 97d3 is provided in a side wall portion 92d3 of the heat receiving portion 90d3. The angle Ah of the direction in which the through hole 97d3 extends is less than zero. Specifically, the angle Ah of the direction in which an inner surface US1, at the rear end direction Dr side, of the through hole 97d3 extends is less than zero. Although not shown, the angle Ah of the direction in which an inner surface BS1, at the front end direction Df side, of the through hole 97d3 is equal to the angle Ah of the inner surface US1 at the rear end direction Dr side. The configuration of the other portion of the heat receiving portion 90d3 is the same as the configuration of the corresponding portion of the heat receiving portion 90d shown in FIG. 15.

In the eighth embodiment in FIG. 21(B), the through hole 97d4 is provided in a side wall portion 92d4 of the heat receiving portion 90d4. The angle Ah of the direction in which the through hole 97d4 extends is greater than zero. Specifically, the angle Ah of the direction in which an inner surface US2, at the rear end direction Dr side, of the through hole 97d4 extends is greater than zero. Although not shown, the angle Ah of the direction in which an inner surface BS2, at the front end direction Df side, of the through hole 97d4 is also equal to the angle Ah of the inner surface US2 at the rear end direction Dr side. The configuration of the other portion of the heat receiving portion 90d4 is the same as the configuration of the corresponding portion of the heat receiving portion 90d shown in FIG. 15.

Figure 22:
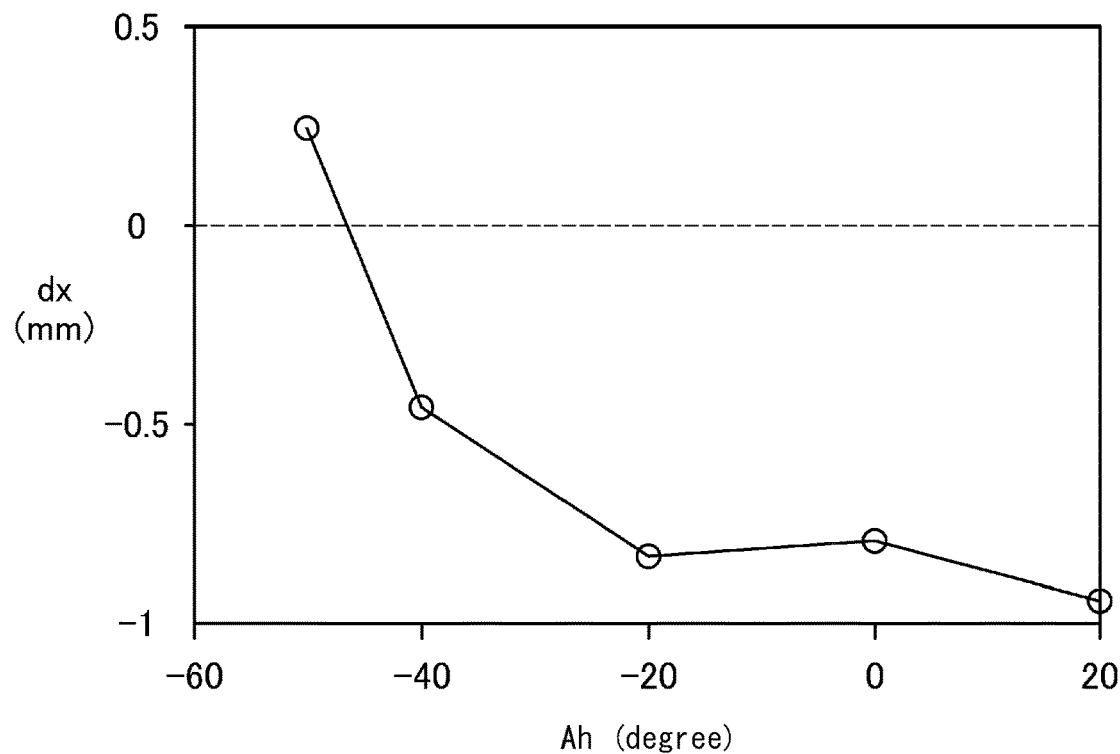
FIG. 22 Graph showing the simulation results of the seventh and eighth embodiments.

FIG. 22 is a graph showing the results of simulations using models of the embodiment in FIG. 21(A) and a model of the embodiment in FIG. 21(B). The horizontal axis indicates the angles Ah of the inner surfaces US1 and US2, at the rear end direction Dr side, of the through holes 97d3 and 97d4, and the vertical axis indicates the inflow distance dx. As the angle Ah, five values, −50, −40, −20, 0, and +20 (degrees) are evaluated. In five types of models, the size H1 of the through hole 97d3 or 97d4 (the maximum values of the lengths (i.e., the sizes) of a plurality of through holes 97d3 or 97d4 in the direction parallel to the axial line CL) is 0.5 mm, and the ratio C2/C1 is 0.6. The configuration of the other portion (e.g., the parameters D1, D2, D3, D4, CL1, and CL2) is the same as the configuration of the corresponding portion of the model described with reference to FIG. 16

As shown in FIG. 22, when the angle Ah is great, the inflow distance dx is smaller than when the angle Ah is small. The reason is inferred as follows. The gas flowing out from the through hole 97d3 or 97d4 to the outer peripheral side easily flows toward the direction of the angle Ah. Therefore, when the angle Ah is great, at the outer peripheral side of the side wall portion 92d3 or 92d4, the gas easily flows toward the front end direction Df side as compared to the case where the angle Ah is small. For example, the gas easily flows in the gap 951d (FIG. 16) from the through hole 97d3 or 97d4 toward the front end direction Df side. Therefore, when the angle Ah is great, the carbon particles can be inhibited from moving at the outer peripheral side of the side wall portion 92d3 or 92d4 (e.g., in the gap 951d (FIG. 16)) toward the rear end direction Dr side, as compared to the case where the angle Ah is small. As a result, the carbon particles can be inhibited from flowing into the gap 952d between the plate portion 93d and the diaphragm 42.

As shown, even when the angle Ah is less than zero, an inflow distance dx less than zero can be achieved. The reason is inferred as follows. A space (including the gap 952d) at the rear end direction Dr side with respect to the gap 951d is smaller than the combustion chamber 600. The amount of the gas that can flow from the through hole 97d3 through the gap 951d to the rear end direction Dr side is only a part of the amount of the gas flowing out from the through hole 97d3 to the gap 951d. Therefore, even when the angle Ah is less than zero, a part of the gas flowing out from the through hole 97d3 can flow in the gap 951d toward the front end direction Df. As a result, the carbon particles can be inhibited from moving in the gap 951d toward the rear end direction Dr side.

The angles Ah that achieve an inflow distance dx of not greater than zero are −40, −20, 0, and +20 (degrees). A preferable range of the angle Ah (a range of not less than a lower limit and not greater than an upper limit) may be determined by using the above four values. Specifically, an arbitrary value among the above four values may be adopted as the lower limit of the preferable range of the angle Ah. For example, the angle Ah is preferably not less than −40 degrees, particularly preferably not less than −20 degrees, and most preferably not less than zero. In addition, an arbitrary value that is not less than the lower limit, among these values, may be adopted as the upper limit. For example, the angle Ah is preferably not greater than +20 degrees.

As the angle Ah increases, the gas flows more easily at the outer peripheral side of the side wall portion 92d3 or 92d4 toward the front end direction Df side. Therefore, the angle Ah may be greater than +20 degrees which is the maximum value among the above four values. However, when the angle Ah is excessively great, it becomes difficult to produce the heat receiving portion. Therefore, the upper limit of the angle Ah is preferably determined such that the heat receiving portion can be easily produced, and, for example, the angle Ah is preferably not greater than 45 degrees.

The preferable range of the angle Ah is not limited to the configurations of the above models, and is inferred to be applicable to other various configurations. For example, the configurations such as the above parameters D1, D2, D3, D4, CL1, CL2, C1, C2, and H1 may be different from the values in the above model. In this case as well, when the angle Ah is within the above preferable range, the inflow distance dx is inferred to be able to be decreased as compared to the case where the angle Ah is out of the preferable range.

F2-5. Distribution of Through Holes in Circumferential Direction

Figure 23:
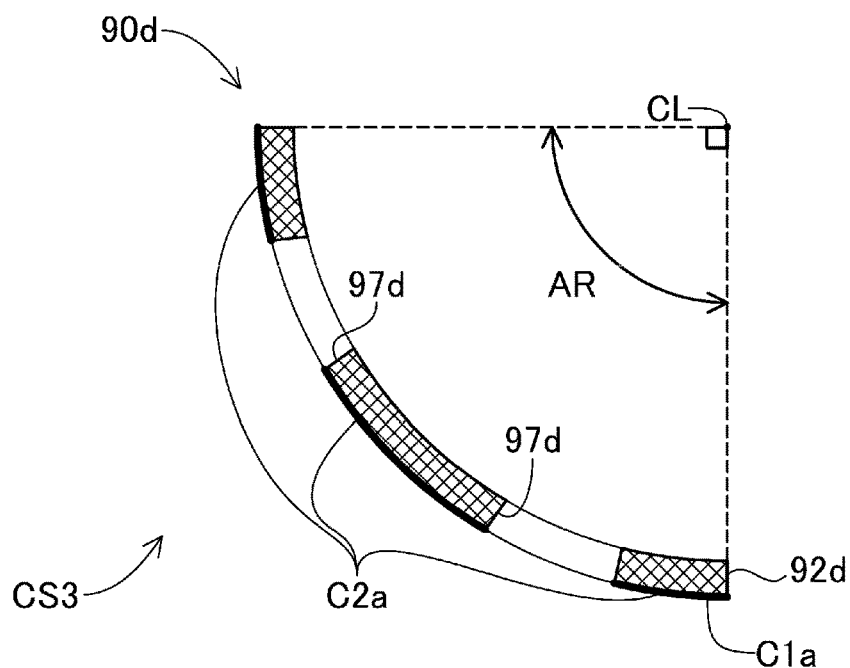
FIG. 23 Explanatory diagram of a portion of a cross-section, perpendicular to an axial line CL, of a side wall portion 92d.

FIG. 23 shows a portion of a cross-section, perpendicular to the axial line CL, of the side wall portion 92d. The drawing shows a portion CS3 (referred to as "partial cross-section CS3") included within an angle range AR having a center on the axial line CL and having a central angle of 90 degrees. The partial cross-section CS3 is a cross-section passing through the through holes 97d. A partial outer peripheral length C1a in the drawing is the length of a portion included in the angle range AR (i.e., the partial cross-section CS3), of the outer peripheral length C1 described with reference to FIG. 15(A) and FIG. 15(C). In the embodiment in FIG. 23, the shape of the side wall portion 92d is substantially cylindrical. Therefore, the partial outer peripheral length C1a is a quarter of the outer peripheral length C1. A partial wall length C2a is the length of a portion included in the angle range AR (i.e., the partial cross-section CS3), of the wall length C2 described with reference to FIG. 15(A) and FIG. 15(D).

For inhibiting inflow of the carbon particles over the entire circumference of the annular gap 951d (FIG. 16) surrounding the axial line CL, the plurality of through holes 97d are preferably distributed evenly along the circumferential direction. For example, within the angle range AR, in any direction, having a center on the axial line CL and having a central angle of 90 degrees, a ratio C2a/C1a is preferably not greater than a predetermined upper limit. According to this configuration, the ratio C2a/C1a is inhibited from being excessively high in some directions as seen from the axial line CL. That is, the gas is inhibited from flowing from the through holes 97d unevenly, that is, in a partial range of the entire circumference of the side wall portion 92d, toward the outer peripheral side. Therefore, a portion in which the carbon particles easily move toward the rear end direction Dr can be inhibited from being formed within the annular gap 951d. As a result, the carbon particles can be inhibited from flowing at the outer peripheral side of the side wall portion 92d into the gap 952d between the heat receiving portion 90d and the diaphragm 42. In each of the models in the simulation described above, the plurality of through holes are evenly distributed along the circumferential direction. Therefore, within the angle range AR in any direction, the ratio C2a/C1a is substantially equal to the ratio C2/C1.

In consideration of the simulation results in FIG. 19, the ratio C2a/C1a is preferably not greater than 0.7, particularly preferably not greater than 0.6, and most preferably not greater than 0.5. As the lower limit of the ratio C2a/C1a, various values greater than zero are adoptable. Here, a value with which practical strength of the side wall portion 92d can be achieved is preferably adopted.

The preferable range of the ratio C2a/C1a is not limited to the embodiment in FIG. 15, and is also applicable to other various configurations (e.g., the embodiments in FIG. 20, FIG. 21(A), and FIG. 21(B)). In any of the cases, when, within the angle range AR, in any direction, having a center on the axial line CL and having a central angle of 90 degrees, the ratio C2a/C1a is within the above preferable range, the inflow distance dx is inferred to be able to be decreased as compared to the case where the ratio C2a/C1a is out of the preferable range.

Figure 24:
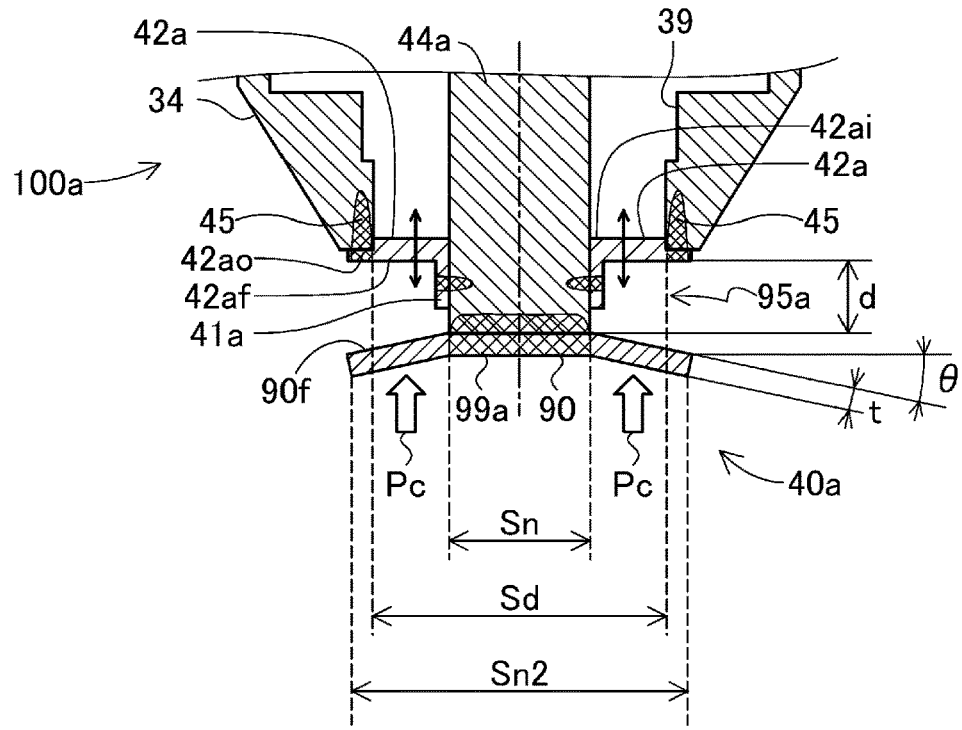
FIG. 24 Diagrams showing modifications of the second embodiment.
Figure 24:
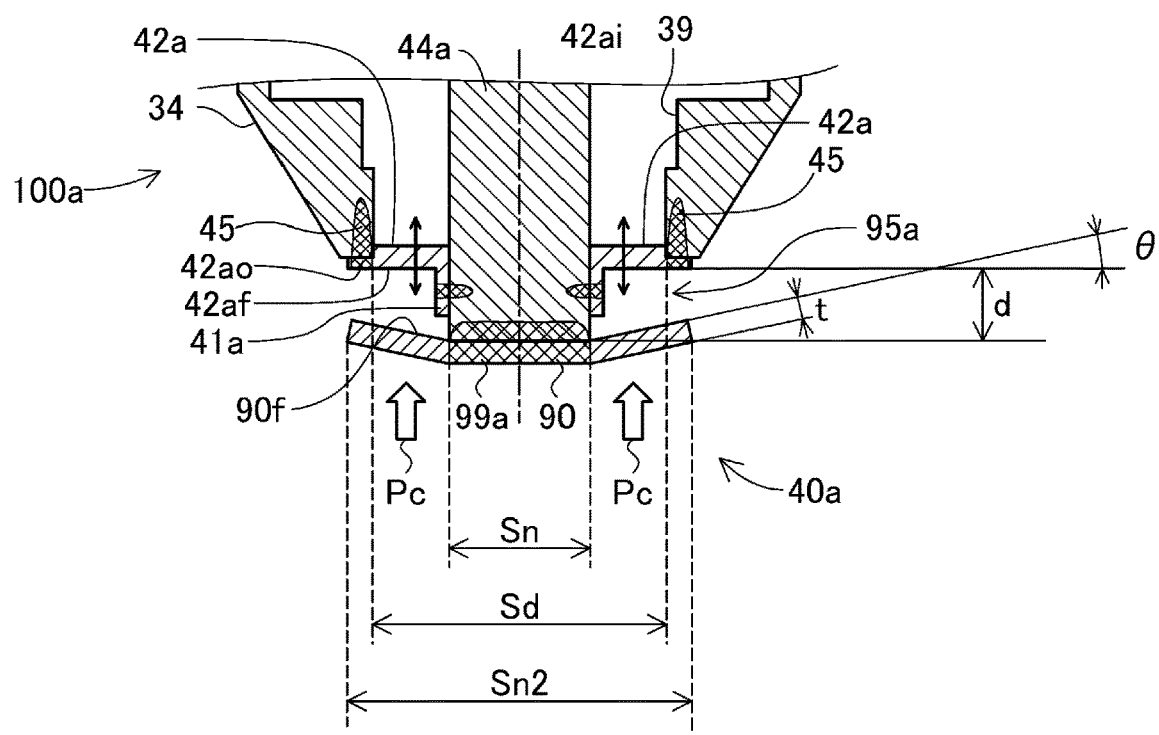

G. Modifications (1) In the above second to fourth embodiments, the angle θ formed between the rear side surface 90f of the heat receiving portion 90 and the direction perpendicular to the axial line CL is 0, but is not limited thereto. FIG. 24 shows diagrams showing modifications of the second embodiment. As shown in FIG. 24(A), on a cross-section including the axial line CL, the rear side surface 90f of the heat receiving portion 90 may be tilted to the front side as the distance to the radially outer side decreases. In this case, the angle θ is preferably within 20 degrees. If so, high-temperature combustion gas can be inhibited from flowing into the gap 95a, so that the amount of heat transmitted to the diaphragm 42a can be reduced further. As a result, thermal expansion of the diaphragm 42a can be inhibited further, and consequently an error of a signal from the element portion 50 can be reduced.

In addition, as shown in FIG. 24(B), on a cross-section including the axial line CL, the rear side surface 90f of the heat receiving portion 90 may be tilted to the rear side as the distance to the radially outer side decreases. In this case as well, the angle θ is preferably within the 20 degrees. If so, even when the heat receiving portion 90 deforms due to its exposure to high-temperature combustion gas, interference between the heat receiving portion 90 and the diaphragm 42a can be inhibited, and consequently an error of a signal from the element portion 50 can be reduced.

(2) In the above first to fourth embodiments, various configurations are adoptable as the configuration for connecting the heat receiving portion to the diaphragm. For example, as in the embodiment in FIG. 2 or FIG. 12, the heat receiving portion 90 and the diaphragm 42 may be connected directly to each other. In addition, as in the embodiment in FIG. 8 or FIG. 13, the heat receiving portion 90 and the diaphragm 42a may be connected indirectly to each other via another component (the rod 44a or 44c and the fixing portion 41a in the example in FIG. 8 or FIG. 13).

In the embodiment in FIG. 2, a spacer may be disposed between the heat receiving portion 90 and the diaphragm 42. For example, a columnar member having a center on the axial line CL may be adopted as the spacer. Here, the entireties of the diaphragm 42 (further the pressure receiving portion 40) and the spacer may be integrally formed as one member (e.g., by means of forging or machining). Alternatively, the entireties of the heat receiving portion 90 and the spacer may be integrally formed as one member (e.g., by means of forging or machining). Such a spacer is disposed at the front side with respect to the diaphragm 42 and can receive heat instead of the diaphragm 42, and thus can be said to be a part of the heat receiving portion. In addition, the joint portion (e.g., the welded portion (welding trace) melted during welding) which joins the heat receiving portion 90 to the diaphragm 42 may be formed so as to extend from the heat receiving portion 90 through the spacer to the diaphragm 42. When seen toward the axial direction, such a joint portion may be formed over the entirety of the spacer, or may be formed at a portion of the spacer instead. When the joint portion is formed at the portion of the spacer, a small gap like the gap 95 in FIG. 2 can be formed between the spacer and the diaphragm connected to each other by the joint portion. In this case, the minimum distance d is zero.

In any of the cases, the heat receiving portion (or the member including the heat receiving portion) may be connected to the diaphragm or another component connected to the diaphragm, by means of welding. As the type of the welding, laser welding may be adopted, or another type of welding (e.g., resistance welding) may be adopted instead. In the case of being joined by means of welding, the joint portion which joins the heat receiving portion (or the member including the heat receiving portion) to the diaphragm (or the other component connected to the diaphragm) is a portion where the two members to be joined by means of welding are melted during welding. Such a joint portion is a portion where the two members to be joined by means of welding are integrated with each other. In addition, the joint portion includes a component of each of the two members to be joined by means of welding. Moreover, as the configuration of such a joint portion, other various configurations are adoptable instead of the configurations of the joint portions 99, 99a, and 99b in FIG. 2, FIG. 8, and FIG. 12. For example, when seen toward the axial direction, a plurality of joint portions spaced apart from each other may be formed. For example, three or four joint portions arranged so as to surround the axial line CL may be formed. When a plurality of joint portions spaced apart from each other are formed, deformation of the heat receiving portion within a region surrounded by the plurality of joint portions is easily transmitted to the diaphragm through the plurality of joint portions, as compared to deformation of the heat receiving portion outside the region surrounded by the plurality of joint portions. Therefore, as the connection area Sn, the area of a minimum inclusion region including the plurality of joint portions can be adopted. For example, in the case where three joint portions are formed, the area of a minimum inclusion region including three cross-sections of the three joint portions and having a substantially triangular shape is adoptable as the connection area Sn. In the case where four joint portions are formed, the area of a minimum inclusion region including four cross-sections of the four joint portions and having a substantially quadrangular shape is adoptable as the connection area Sn.

In any of the cases, the distance between the surface, at the combustion chamber side, of the diaphragm and the heat receiving portion is preferably adopted as the minimum distance d of the gap between the heat receiving portion and the diaphragm in the direction parallel to the axial line.

(3) As the configuration of the connection portion which connects the diaphragm 42 or 42a to the piezoelectric element 51, other various configurations are adoptable instead of the configuration of the connection portion 100 in FIG. 2, the configuration of the connection portion 100a in FIG. 8, and the configuration of the connection portion 100c in FIG. 13. For example, the front side presser plate 54 may be omitted, and the rod 44, 44a, or 44c may be in contact with only the front side electrode 52 among the components of the element portion 50. In addition, the front side presser plate 54 and the front side electrode 52 may be omitted, and the piezoelectric element 51 may be connected directly to the rod 44, 44a, or 44c. In this case, the rod 44, 44a, or 44c serves as an electrode. In addition, in the embodiment in FIG. 8 or FIG. 13, the fixing portion 41a may be omitted, and the diaphragm 42a may be joined directly to the rod 44a or 44c. In addition, in the embodiment in FIG. 8 or FIG. 13, the diaphragm 42a and the rod 44a or 44c may be integrally formed as one member (e.g., by means of forging or machining). In this case as well, the diaphragm 42a can be said to be connected to the rod 44a or 44c.

In any of the cases, preferably, the connection portion includes the rod, the diaphragm is connected directly or indirectly to a first portion of the rod, and the piezoelectric element 51 is connected directly or indirectly to a second portion of the rod at the rear side with respect to the first portion. The reason why the second portion is located at the rear side with respect to the first portion is that the element portion 50 is generally disposed at the rear side with respect to the diaphragm which receives heat within the combustion chamber. Here, as the second portion, connected to the element portion 50 (i.e., the piezoelectric element 51), of the rod, an arbitrary portion of the rod is adoptable instead of a rear end portion of the rod (e.g., the rear end portion 49 in FIG. 2 and a rear end portion 49a in FIG. 8). For example, the element portion 50 (e.g., the electrode 52) may be connected to the outer peripheral surface of the rod. In this case, the electrode 52 and the piezoelectric element 51 may be formed in an annular shape, and the rod may be inserted into the through holes of the electrode 52 and the piezoelectric element 51.

(4) As the configuration of the element portion 50, other various configurations are adoptable instead of the configuration in FIG. 2 and FIG. 3. For example, at least one of the front side presser plate 54 and the rear side presser plate 54 may be omitted. In addition, the terminal portion 56 may be connected directly to the electrode 52. Moreover, the electrode 52 and the piezoelectric element 51 may not be disc-shaped plate-like members arranged on the axial line CL but annular-shaped plate-like members surrounding the axial line CL or members disposed at specific positions away from the axial line CL in the circumferential direction. Generally, the element portion 50 preferably includes the piezoelectric element and is configured to be able to output a signal from the piezoelectric element to the outside of the pressure sensor. Furthermore, as a device having an electrical characteristic which changes in response to the pressure received by the diaphragm, various devices having an electrical characteristic (e.g., a voltage, a resistance value, etc.) which changes in accordance with a load received through the diaphragm and the connection portion are adoptable instead of the piezoelectric element. For example, a strain gauge may be adopted.

(5) As the configuration of the heat receiving portion, various configurations which can receive heat from the combustion chamber instead of the diaphragm are adoptable instead of the configurations such as the heat receiving portions 90 in FIG. 2, FIG. 8, FIG. 12, and FIG. 13. For example, the shape of the heat receiving portion that is seen toward the axial direction may be not circular but rectangular. Generally, the heat receiving portion is preferably a plate-like member which is disposed at the front side of the diaphragm and connected directly or indirectly to the diaphragm. The thickness t of the heat receiving portion is uniform in each of the above embodiments, but may change depending on the position in the radial direction or the position in the circumferential direction, for example. In this case, the average thickness of the portion other than the portion connected to the diaphragm, of the heat receiving portion, is adopted as the thickness t of the heat receiving portion. The average thickness t is preferably not less than 0.21 mm.

(6) In the above embodiments (e.g., FIG. 2 and FIG. 8), the diaphragm 42 or 42a is joined to a tubular housing formed by the second metal shell 80 and the third metal shell 35, and the element portion 50 is housed in the housing. As the configuration of such a housing, various tubular configurations are adoptable instead of the configuration using the second metal shell 80 and the third metal shell 35. For example, the entireties of the second metal shell 80 and the third metal shell 35 may be formed as one member. In addition, the entireties of the second metal shell 80 and the cap screw 32 may be formed as one member. Moreover, the second metal shell 80, the third metal shell 35, and the cap screw 32 may be formed as one member.

In any of the cases, the diaphragm may be connected to the housing by means of welding. As the type of the welding, laser welding may be adopted, or another type of welding (e.g., resistance welding) may be adopted instead. In any of the cases, a portion where the diaphragm and the housing are melted during welding forms a joint portion which joins the diaphragm to the housing. Such a joint portion is a portion where the diaphragm and the housing are integrated with each other. The joint portion includes a component of the diaphragm and a component of the housing. As the contour of the region corresponding to the effective area Sd, the contour of the inner peripheral side of the joint portion joining the housing to the diaphragm on the surface connected to the housing, of the surface of the diaphragm, is adoptable (e.g., the contours 45i of the joint portions 45 in FIG. 6(F) and FIG. 9(F)).

(7) As the configuration for introducing a signal from the element portion 50 to the outside of the pressure sensor, other various configurations are adoptable instead of the configuration using the cable 60. For example, a metal terminal may be disposed at the rear side of the pressure sensor 10, and the metal terminal and the terminal portion 56 of the element portion 50 may be connected to each other by a center rod. In this case, a signal from the element portion 50 can be obtained through the metal terminal and the first metal shell 20.

(8) In the fifth to eighth embodiments, as the configuration of the heat receiving portion, other various configurations are adoptable instead of the configurations in the above respective embodiments. For example, in the embodiment in FIG. 21(A) or FIG. 21(B), the angle Ah of the inner surface BS1 or BS2, at the front side, of the through hole 97d3 or 97d4 may be different from the angle Ah of the inner surface US1 or US2 at the rear side. The angle Ah of the inner surface US1 or US2 at the rear side may be within the above preferable range, and the angle Ah of the inner surface BS1 or BS2 at the front side may be out of the above preferable range. In any of the cases, the gas GS flowing along the surface 931d, at the front side, of the plate portion 93d toward the side wall portion 92d3 or 92d4 initially reaches the inner surface US1 or US2 at the rear side, not the inner surface BS1 or BS2 at the front side. Thus, the gas flowing from the through hole 97d3 or 97d4 to the outer peripheral side easily flows in the direction in which the inner surface US1 or US2 at the rear side extends (i.e., the direction of the angle Ah of the inner surface US1 or US2 at the rear side). Therefore, when the angle Ah of the inner surface US1 or US2 at the rear side is within the above preferable range, the carbon particles can be inhibited from moving at the outer peripheral side of the side wall portion 92d3 or 92d4 (e.g., in the gap 951d (FIG. 16)) toward the rear end direction Dr side. However, the angle Ah of the inner surface US1 or US2 at the rear side may be out of the above preferable range.

(9) In the fifth to eighth embodiments, as the cross-sectional shape of each through hole of the side wall portion (the cross-sectional shape perpendicular to the direction in which the through hole extends), any other shape is adoptable instead of the rectangular shape. For example, a circular shape may be adopted. In any of the cases, when the angle Ah of the inner surface, at the rear side, of the through hole is specified, the inner surface, at the rear side, of the through hole on a plane cross-section in which the distance between the inner surface at the rear side and the inner surface at the front side in the direction parallel to the axial line CL is the largest, among the plane cross-sections including the axial line CL, may be adopted.

In addition, the plurality of through holes may be different in shape from each other. Moreover, the plurality of through holes may be different in circumferential length from each other. Furthermore, the plurality of through holes may be different in axial size from each other. In any of the cases, the maximum values of the lengths, in the direction parallel to the axial line CL, of the plurality of through holes, that is, the largest size among the respective axial sizes of each of the plurality of through holes, is preferably within the above preferable range of the size H1. According to this configuration, the gas easily flows from the through holes of the side wall portion toward the outer peripheral side, so that the carbon particles can be inhibited from flowing at the outer peripheral side of the side wall portion into the gap between the heat receiving portion and the diaphragm.

(10) In the case where the wall length C2 described with reference to FIG. 15(D) changes in accordance with the position of the second cross-section CS2 in the direction parallel to the axial line CL, the minimum value may be adopted as the wall length C2. In addition, when the partial wall length C2a described with reference to FIG. 23 changes in accordance with the position of the partial cross-section CS3 in the direction parallel to the axial line CL, the minimum value may be adopted as the partial wall length C2a.

(11) The rounded connection portion 940d2 described with reference to FIG. 20 is applicable to other various configurations, instead of the configuration of the embodiment in FIG. 15. For example, the rounded connection portion 940d2 may be applied to the embodiments in FIG. 21(A) and FIG. 21(B).

(12) The preferable range of the ratio C2a/C1a described with reference to FIG. 23 is applicable to other various configurations, instead of the configuration of the embodiment in FIG. 15. For example, the preferable range of the ratio C2a/C1a may be applied to the embodiments in FIG. 20, FIG. 21(A), and FIG. 21(B). However, in the angle range AR in some directions, the ratio C2a/C1a may exceed the above upper limit.

(13) In the fifth to eighth embodiments, as shown in FIG. 14, the heat receiving portion (e.g., the heat receiving portions 90d, 90d2, 90d3, and 90d4) is disposed within the mounting hole 510 (specifically, the front end portion 530) in each of the above embodiments when the pressure sensor is mounted in the mounting hole 510 of the cylinder head 500. However, at least a part of the heat receiving portion may be disposed outside the mounting hole 510 (specifically, at the combustion chamber side with respect to an opening 510o, at the combustion chamber side, of the mounting hole). In this case as well, by the gas flowing from the through holes of the side wall portion of the heat receiving portion to the outer peripheral side, the carbon particles can be inhibited from flowing into the gap between the heat receiving portion and the diaphragm. For inhibiting inflow of the carbon particles, at least a part of the side wall portion of the heat receiving portion (particularly, a portion at the rear end direction Dr side) is preferably disposed within the mounting hole 510. According to this configuration, by the gas flowing out from the through holes, the carbon particles can be inhibited from flowing into the gap between the side wall portion and the mounting hole 510 (e.g., the gap 951d in FIG. 14).

(14) In the fifth to eighth embodiments, as the configuration for connecting the heat receiving portion to the diaphragm, various configurations are adoptable. For example, the leg portion 98d in FIG. 14 may be omitted, and the plate portion 93d may be connected directly to the diaphragm 42. In addition, the heat receiving portion may be connected to the diaphragm 42 via another member.

(15) In the fifth to eighth embodiments, as the configuration of the connection portion which connects the diaphragm 42 to the piezoelectric element 51, other various configurations are adoptable instead of the configuration of the connection portion 100d in FIG. 14. For example, the front side presser plate 54 may be omitted, and the rod 44 may be in contact with the front side electrode 52 among the components of the element portion 50. In addition, the front side presser plate 54 and the front side electrode 52 may be omitted, and the piezoelectric element 51 may be connected directly to the rod 44. In this case, the rod 44 serves as an electrode.

(16) In the fifth to eighth embodiments, as the configuration of the housing which houses the piezoelectric element 51, various tubular configurations are adoptable instead of the configuration of the front end metal shell 30d described with reference to FIG. 14. For example, the large inner diameter portion 35d and the small inner diameter portion 36d may be separate members which are separate from each other. In this case, for example, an internal thread may be formed on the inner peripheral surface of the large inner diameter portion 35d, an external thread may be formed on the outer peripheral surface of the small inner diameter portion 36d, and the small inner diameter portion 36d may be screwed into the large inner diameter portion 35d from the rear side of the large inner diameter portion 35d. In this case, a preload can be adjusted by adjusting the number of rotations of the small inner diameter portion 36d made when the small inner diameter portion 36d is screwed. In any of the cases, the diaphragm may be connected to the front side of the housing by means of welding.

Although the present invention has been described above on the basis of the embodiments and the modifications, the above-described embodiments of the invention are intended to facilitate understanding of the present invention, but not as limiting the present invention. The present invention can be changed and modified without departing from the gist thereof and the scope of the claims and equivalents thereof are encompassed in the present invention.

INDUSTRIAL APPLICABILITY

The present invention can be suitably used for a pressure sensor that includes a diaphragm and a heat receiving portion.

DESCRIPTION OF REFERENCE NUMERALS 10, 10a, 10b, 10c, 10d: pressure sensor
20: first metal shell
21: axial hole
22: screw portion
24: tool engagement portion
26, 26d: welded portion
30d: front end metal shell
31, 31d: axial hole
34, 34d: diameter-enlarged portion
35: third metal shell
35d: large inner diameter portion
36: axial hole
36d: small inner diameter portion
39: axial hole
39d: step portion
40, 40a: pressure receiving portion
41a: fixing portion
42, 42a: diaphragm
42f: pressure receiving surface
43, 43a: connection portion
44, 44a, 44c: rod
44c: rod
45: welded portion
48: small-diameter portion
49, 49a: rear end portion
49a: rear end portion
50: element portion
51: piezoelectric element
52: electrode
53: lead portion
54: presser plate
54h: through hole
55: insulating plate
55h: through hole
56: terminal portion
57: disc portion
60: cable
61: jacket
62: external conductor
63: conductive coating
64: insulator
65: internal conductor
72: heat-shrinkable tube
74: small-diameter conductor
75: plate conductor
76: grounding conductor
80: second metal shell
81: axial hole
89: welded portion
90, 90d, 90d2, 90d3, 90d4: heat receiving portion
91d: main portion
92d, 92d3, 92d4: side wall portion
93, 93a, 93b: connection portion
93d: plate portion
94, 94a, 94b: minimum inclusion region
94a: minimum inclusion region
94b: minimum inclusion region
95, 95a: gap
97d, 97d3, 97d4: through hole 97dE: edge
98d: leg portion
99, 99a, 99b, 99d: welded portion
100, 100a, 100c, 100d: connection portion
120: heat receiving rod
500: cylinder head
600: combustion chamber
940d, 940d2: connection portion

What is claimed is:

1. A pressure sensor comprising:
   a tubular housing;
   a diaphragm joined to a front side of the housing via a joint portion, spreading in a direction crossing an axial line of the housing, and configured to bend in accordance with a received pressure;
   a sensor portion disposed within the housing and having an electrical characteristic which changes in response to the pressure;
   a connection portion connecting the diaphragm to the sensor portion; and
   a heat receiving portion disposed at the front side of the diaphragm, connected directly or indirectly to the diaphragm, and configured to receive heat, wherein
   when a minimum value of an area of a minimum inclusion region that is a virtual region, which includes a cross-section of a portion from the heat receiving portion to the diaphragm and of which an overall length of a contour is the smallest, on a cross-section perpendicular to the axial line is defined as a connection area Sn, and
   an area of a region surrounded by the joint portion on a projection plane perpendicular to the axial line when the diaphragm and the heat receiving portion are projected onto the projection plane is defined as a diaphragm effective area Sd,
   $(Sn/Sd) \leq 0.25$ is satisfied.

2. A pressure sensor according to claim 1, wherein
   when an area of the heat receiving portion on the projection plane is defined as a heat receiving area Sn2,
   $(Sn2/Sd) \geq 0.8$ is satisfied.

3. A pressure sensor according to claim 2, wherein $(Sn2/Sd) \geq 1.0$ is satisfied.

4. A pressure sensor according to claim 2, wherein
   when a minimum distance of a gap between the heat receiving portion and the diaphragm in a direction parallel to the axial line is defined as a minimum distance d,
   $d \leq 0.5$ mm is satisfied.

5. A pressure sensor according to claim 2, wherein $(Sn/Sd) \leq 0.1$ is satisfied.

6. A pressure sensor according to claim 1, wherein
   the heat receiving portion includes a plate-like heat receiving plate, and
   when a thickness of the heat receiving plate is denoted by t,
   $t \geq 0.21$ mm is satisfied.

7. A pressure sensor according to claim 6, wherein
   an absolute value of an angle θ formed between a rear side surface of the heat receiving plate and a direction perpendicular to the axial line on a cross-section including the axial line is within 20 degrees.

8. A pressure sensor according to claim 1, wherein
   the heat receiving portion includes:
      a plate portion spreading in the direction crossing the axial line; and
      a side wall portion projecting from an edge of the plate portion to the front side,
   the side wall portion is formed over an entirety of the edge of the plate portion,
   the side wall portion has a plurality of through holes formed so as to be aligned along the edge of the plate portion,
   a maximum value of lengths, in a direction parallel to the axial line, of the plurality of through holes is not less than 0.3 mm, and
   when an outer peripheral length of the side wall portion on a cross-section of the side wall portion which is perpendicular to the axial line and does not pass through the plurality of through holes, is defined as an outer peripheral length C1, and
   a sum of lengths of portions corresponding to an outer peripheral surface of the side wall portion on a cross-section of the side wall portion which is perpendicular to the axial line and passes through the through holes, is defined as a wall length C2,
   $(C2/C1) \leq 0.6$ is satisfied.

9. A pressure sensor according to claim 8, wherein
   a connection portion between an inner peripheral surface of the side wall portion and a surface, at the front side, of the plate portion is rounded.

10. A pressure sensor according to claim 8, wherein
    when, within an angle range, in an arbitrary direction, which has a center on the axial line and has a central angle of 90 degrees,
    a length of a portion included within the angle range, of the outer peripheral length C1, is defined as a partial outer peripheral length C1a, and
    a length of a portion included within the angle range, of the wall length C2, is defined as a partial wall length C2a,
    $(C2a/C1a) \leq 0.6$ is satisfied.

11. A pressure sensor according to claim 8, wherein
    when, on a plane cross-section, of the side wall portion, including the axial line, among directions from an inner peripheral side toward an outer peripheral side, an angle of a direction perpendicular to the axial line is defined as zero degree, an angle of a direction tilted to the front side is defined as a positive angle, and an angle of a direction tilted to a rear side is defined as a negative angle,
    an angle of an inner surface, at the rear side, of the through hole is not less than −40 degrees and not greater than 20 degrees.

* * * * *